United States Patent
Zhang et al.

(10) Patent No.: US 11,265,058 B2
(45) Date of Patent: Mar. 1, 2022

(54) FEEDBACK METHOD AND ACQUISITION METHOD FOR GROUPING INDICATION INFORMATION AND DEVICE

(71) Applicant: XI'AN ZHONGXING NEW SOFTWARE CO., LTD., Xi'an (CN)

(72) Inventors: Shujuan Zhang, Guangdong (CN); Yijian Chen, Guangdong (CN); Yu Ngok Li, Guangdong (CN); Yuhong Gong, Guangdong (CN); Zhaohua Lu, Guangdong (CN)

(73) Assignee: XI'AN ZHONGXING NEW SOFTWARE CO., LTD., Xi'an Shaanxi (CN)

( * ) Notice: Subject to any disclaimer, the term of this patent is extended or adjusted under 35 U.S.C. 154(b) by 0 days.

(21) Appl. No.: 16/324,062

(22) PCT Filed: Feb. 4, 2017

(86) PCT No.: PCT/CN2017/072915
§ 371 (c)(1),
(2) Date: Apr. 26, 2019

(87) PCT Pub. No.: WO2018/028158
PCT Pub. Date: Feb. 15, 2018

(65) Prior Publication Data
US 2019/0260452 A1     Aug. 22, 2019

(30) Foreign Application Priority Data

Aug. 11, 2016  (CN) .......................... 201610665321.2
Sep. 23, 2016  (CN) .......................... 201610848897.2

(51) Int. Cl.
*H04B 7/06*     (2006.01)
*H04B 7/08*     (2006.01)
*H04L 5/00*     (2006.01)

(52) U.S. Cl.
CPC .......... *H04B 7/0639* (2013.01); *H04B 7/063* (2013.01); *H04B 7/066* (2013.01); *H04B 7/0695* (2013.01);
(Continued)

(58) Field of Classification Search
CPC .................................................. H04B 7/0639
(Continued)

(56) References Cited

U.S. PATENT DOCUMENTS

2009/0141648 A1*  6/2009  Imamura ............... H04L 1/0026
                                                                    370/252
2010/0008400 A1*  1/2010  Chari ....................... H04L 1/06
                                                                      375/137
(Continued)

FOREIGN PATENT DOCUMENTS

CN    103179664 A    6/2013
CN    103188710 A    7/2013
(Continued)

OTHER PUBLICATIONS

International Search Report dated Apr. 27, 2017 for International Application No. PCT/CN2017/072915, 5 pages.
(Continued)

*Primary Examiner* — Lihong Yu
(74) *Attorney, Agent, or Firm* — Knobbe, Martens, Olson & Bear, LLP

(57) ABSTRACT

The present invention provides a method and device for feeding back grouping indication information and a method and device for acquiring grouping indication information. The method for feeding back grouping indication information includes: determining M resources from a candidate resource set and dividing the M resources into N first-type resource groups, where M is an integer greater than or equal to 1 and N is a positive integer less than or equal to M; and
(Continued)

Determine M resources from a candidate resource set and divide the M resources into N first-type resource groups, where M is an integer greater than or equal to 1 and N is a positive integer less than or equal to M — S202

Feed back indication information for indicating the M resources and first-type grouping indication information for indicating that the M resources are divided into the N first-type resource groups to a first communication node — S204 feeding back indication information for indicating the M resources and first-type grouping indication information for indicating that the M resources are divided into the N first-type resource groups to a first communication node. Resources in the candidate resource set include at least one of: a transmission beam resource, a transmission antenna resource, a transmission port resource, a transmission frequency domain resource, a transmission sequence resource and a transmission time domain resource.

20 Claims, 26 Drawing Sheets

(52) U.S. Cl.
CPC ........... *H04B 7/088* (2013.01); *H04B 7/0848* (2013.01); *H04L 5/00* (2013.01)

(58) Field of Classification Search
USPC ......................................................... 375/262
See application file for complete search history.

(56) References Cited

U.S. PATENT DOCUMENTS

| | | | | |
|---|---|---|---|---|
| 2011/0034198 A1* | 2/2011 | Chen | ................... | H04L 25/0202 455/509 |
| 2012/0114060 A1* | 5/2012 | Zangi | ................... | H04B 7/0691 375/285 |
| 2013/0223251 A1 | 8/2013 | Li et al. | | |
| 2015/0043474 A1 | 2/2015 | Takeda | | |
| 2015/0098453 A1* | 4/2015 | Han | ...................... | H04L 1/0028 370/336 |
| 2015/0282122 A1 | 10/2015 | Kim | | |
| 2015/0373711 A1* | 12/2015 | Narathong | .............. | H04J 4/005 370/280 |
| 2018/0006703 A1 | 4/2018 | Kim | | |
| 2019/0335471 A1* | 10/2019 | Kim | ......................... | H04L 5/00 |

FOREIGN PATENT DOCUMENTS

| | | |
|---|---|---|
| CN | 104205695 A | 12/2014 |
| CN | 105743552 A | 7/2016 |
| WO | 2016089122 A1 | 6/2016 |

OTHER PUBLICATIONS

Written Opinion of the International Searching Authority dated Apr. 27, 2017 for International Application No. PCT/CN2017/072915, 3 pages.
Partial Supplementary European Search Report of corresponding European Patent Application No. 17838295.8—16 pages (dated Feb. 14, 2020).
First Search Report for CN 201610848897.2 dated Aug. 20, 2021.
First Office Action for CN 201610848897.2 dated Aug. 30, 2021.

* cited by examiner

FEEDBACK METHOD AND ACQUISITION METHOD FOR GROUPING INDICATION INFORMATION AND DEVICE

CROSS REFERENCE TO RELATED APPLICATIONS

This is a U.S. National Phase Application, filed under 35 U.S.C. 371, of International Patent Application No. PCT/CN2017/072915, filed on Feb. 4, 2017, which claims priority to Chinese patent application No. 201610665321.2 filed on Aug. 11, 2016, and claims priority to Chinese patent application No. 201610848897.2 filed on Sep. 23, 2016, contents of which are incorporated herein by reference in their entireties.

TECHNICAL FIELD

The present invention relates to the field of wireless communications and, in particular, to a method and device for feeding back grouping indication information and a method and device for acquiring grouping indication information.

BACKGROUND

As an important candidate technology for the 5th generation (5G) mobile communication technology in the future, high frequency techniques have available wide bandwidths to provide high-rate data communications. However, the high frequency techniques have unique transmission characteristics compared with low frequency carriers used in Long-Term Evolution (LTE) in the existing art. A remarkable characteristic of the high frequency is big path losses, which greatly affects a communication distance of the high frequency techniques. However, since the high-frequency signal has a relatively short wavelength, many antenna elements may be arranged in a small area, and accordingly a multi-antenna technology is adopted to obtain high gains and narrow beams to reduce the path losses and increase cell coverage, enabling high frequencies to be used for cellular communications.

However, different beams have different transmission characteristics, such as different receiving manners, different receiving performance, different transmission paths, different related characteristics and different multiplexing manners. In the existing art, transmission beams cannot be reasonably and flexibly managed and scheduled.

For example, beam training needs to be performed between two nodes performing beam communications so that a transmitting end (corresponding to a first communication node in the present invention) and a receiving end (corresponding to a second communication node in the present invention) may perform transmission based on aligned beams. If there are multiple aligned pairs of transmission and receiving beams between the transmitting end and the receiving end, the transmitting end schedules one or more beams from multiple aligned beams based on system performance. The transmitting end needs to inform the receiving end of the transmission beam used for transmitting data, such that the receiving end can receive the data with an appropriate receiving beam. In this case, the beam used for transmitting data needs to have a high correlation with the transmission beam used in the beam training phase, especially when multiple transmission beams correspond to one receiving beam, such as a downlink case. Big restrictions are imposed on the transmitting end to flexibly adjust the transmission beams. Moreover, how to perform spatial division multiplexing transmission according to feedback information in the beam training phase is also an urgent problem to be solved.

No effective solution has been provided to solve the problem in the existing art that reasonable and flexible management and scheduling of transmission beams and/or receiving beams cannot be implemented.

SUMMARY

Embodiments of the present invention provide a method and device for feeding back grouping indication information and a method and device for acquiring grouping indication information to solve at least the problem in the existing art that transmission beams and/or receiving beams cannot be reasonably and flexibly managed and scheduled.

An embodiment of the present invention provides a signal receiving method. The method includes: determining M resources from a candidate resource set and dividing the M resources into N first-type resource groups, where M is an integer greater than or equal to 1 and N is a positive integer less than or equal to M; and feeding back indication information for indicating the M resources and first-type grouping indication information for indicating that the M resources are divided into the N first-type resource groups to a first communication node. Resources in the candidate resource set include at least one of: a transmission beam resource, a transmission antenna resource, a transmission port resource, a transmission frequency domain resource, a transmission sequence resource and a transmission time domain resource.

In an alternative embodiment, the determining M resources from a candidate resource set includes: determining the candidate resource set, receiving a transmission signal transmitted on the candidate resource set, and determining the M resources from the candidate resource set according to the received transmission signal. The candidate resource set includes Q second-type resource groups, where Q is an integer greater than or equal to 1.

In an alternative embodiment, the Q second-type resource groups in the candidate resource set are divided according to at least one of the following resource types: a beam resource, an antenna resource, a port resource, a frequency domain resource, a transmission sequence resource and a time domain resource.

In an alternative embodiment, the determining M resources from a candidate resource set includes: determining the M resources from the candidate resource set according to a channel quality and/or a signal quality of each resource in the candidate resource set.

In an alternative embodiment, at least one of the following is included: resources in a same first-type resource group belong to one or more of the Q second-type resource groups; resources in a same second-type resource group belong to one or more of the N first-type resource groups; and an intersection set of the N first-type resource groups is not an empty set.

In an alternative embodiment, the dividing the M resources into N first-type resource groups includes at least one of the following: dividing the M resources into the N first-type resource groups according to receiving resources corresponding to the M resources; dividing the M resources into the N first-type resource groups according to a signal quality on each of the M resources or a channel quality corresponding to the each of the M resources; dividing the M resources into the N first-type resource groups according to a predetermined multiplexing manner; dividing the M resources into the N first-type resource groups according to a timing advance (TA) parameter; dividing the M resources into the N first-type resource groups according to a length of a cyclic prefix (CP); dividing the M resources into the N first-type resource groups according to a quasi-co-location relationship; dividing the M resources into the N first-type resource groups according to grouping configuration information; and dividing the M resources into the N first-type resource groups according to a channel characteristic.

In an alternative embodiment, the dividing the M resources into the N first-type resource groups according to a predetermined multiplexing manner includes: dividing the M resources into the N first-type resource groups according to a space division multiplexing manner, where resources not supporting space division multiplexing are grouped into a same first-type resource group, resources supporting the space division multiplexing are grouped into different first-type resource groups, and a number of first-type resource groups is greater than or equal to a maximum number of space division multiplexing layers; or the resources supporting the space division multiplexing are grouped into a same first-type resource group, the resources not supporting the space division multiplexing are grouped into different first-type resource groups, and a number of space division multiplexing layers of the resources in the same first-type resource group is less than or equal to a number of resources in the same first-type resource group.

In an alternative embodiment, one or more types of receiving resources corresponding to resources in a same first-type resource group are the same, or one or more types of receiving resources corresponding to the resources have a difference less than a predetermined threshold. The receiving resources include at least one of: a receiving antenna resource, a receiving port resource, a receiving weight resource, a receiving sector resource, a receiving sequence resource, a receiving time domain resource, a receiving frequency-domain resource and a receiving beam resource; channel qualities corresponding to the resources in the same first-type resource group have a difference less than or equal to a threshold R1, and channel qualities corresponding to resources in different first-type resource groups have a difference greater than a threshold R2, where R1 or R2 is pre-agreed with the first communication node or configured by signaling from the first communication node; receiving signal qualities corresponding to the resources in the same first-type resource group have a difference less than or equal to a threshold r1, and receiving signal qualities corresponding to the resources in different first-type resource groups have a difference greater than a threshold r2, where r1 or r2 is pre-agreed with the first communication node or configured by signaling from the first communication node; a multiplexing manner set used for transmitting signals on the resources in the same first-type resource group is a set A, and a multiplexing manner set used for transmitting the signals on the resources in different first-type resource groups is a set B, where the set B is a true subset of the set A or the set A is a true subset of the set B; TA parameters used for transmitting the signal on the resources in the same first-type resource group have a difference less than or equal to a threshold T1, and TA parameters used for transmitting the signal on the resources in different first-type resource groups have a difference greater than a threshold T2, where T1 or T2 is pre-agreed with the first communication node or configured by signaling from the first communication node or determined according to a configuration of the CP; the CP length used for transmitting the signal on the resources in the same first-type resource group is less than or equal to t1, and the CP length used for transmitting the signal on the resources in different first-type resource groups is greater than t2, where t1 or t2 is pre-agreed with the first communication node or configured by signaling from the first communication node; the resources in different first-type resource groups correspond to different CP lengths; the resources in the same first-type resource group correspond to a same CP length; transmission signals corresponding to the resources in the same first-type resource group are not allowed to be space division multiplexed; transmission signals corresponding to the resources in different first-type resource groups are allowed to be space division multiplexed; a number of first-type resource groups is equal to a maximum number of transmission layers in space division multiplexing; the transmission signals corresponding to the resources in the same first-type resource group are quasi-co-located; the resources in the same first-type resource group have a same channel characteristic; and a channel characteristic of a resource in the N first-type resource groups is acquirable according to a channel characteristic of another resource in the same first-type resource group.

In an alternative embodiment, at least one of the following is included: the grouping configuration information includes at least one of: grouping restriction indication information, a threshold parameter for determining groups and a parameter for determining a grouping rule, where the grouping configuration information is configured by signaling from the first communication node or pre-agreed with the first communication node; transmission signals corresponding to resources in a same first-type resource group are allowed to be space division multiplexed; transmission signals corresponding to resources in different first-type resource groups are not allowed to be space division multiplexed; and a number of space division multiplexing layers of the transmission signals corresponding to the resources in the same first-type resource group is less than or equal to a number of resources in the same first-type resource group.

In an alternative embodiment, the grouping restriction indication information includes the following: a number of resources in a same first-type resource group is less than or equal to a, and a number N of first-type resource groups is less than or equal to b, where both a and b are natural numbers greater than or equal to 1; or a number of resources in a same first-type resource group is a fixed number a, and a number N of first-type resource groups is a fixed number b, where both a and b are natural numbers greater than or equal to 1.

In an alternative embodiment, the method further includes: agreeing with the first communication node that the N first-type resource groups have at least one of the following characteristics: a same first-type resource group corresponds to a same set of timing advance (TA) parameters; the same first-type resource group corresponds to a same set of cyclic prefix (CP) parameters; when different resources are transmitted simultaneously, CP lengths corresponding to the different resources are determined according to a maximum value of absolute values of differences of resource group indexes of first-type resource groups corresponding to the different resources; different first-type resource groups correspond to different CP parameters; resources in the same first-type resource group corresponds to a same receiving resource; different first-type resource groups correspond to different receiving resources, and the different receiving resources are generated in a time division manner; at least one type of channel or signal state parameter corresponding to the same first-type resource group is the same; resources in the same first-type resource group are allowed to be frequency division multiplexed and/or space division multiplexed and/or time division multiplexed; resources in the different first-type resource groups do not support frequency division multiplexing or space division multiplexing, and only support time division multiplexing; and the resources in the same first-type resource group correspond to a same index indication parameter.

In an alternative embodiment, channel parameters being the same or signal state parameters being the same includes at least one of: rank indicators (RI) being the same; reference signal received powers (RSRP) being the same; channel quality indications (CQI) being the same; receiving signal-to-noise ratios (SNR) being the same; precoding matrix indicators (PMI) being the same; and channel reference signals (CRI) being the same, and/or a same index corresponding to the resources in the same first-type resource group includes at least one of: a receiving beam index, a receiving sector index, a receiving antenna index, a receiving sequence index, a receiving port index and a receiving beam combination index.

In an alternative embodiment, the method further includes: agreeing with the first communication node on the following characteristic: a capability of simultaneously generating receiving manners corresponding to all the N first-type resource groups is possessed.

In an alternative embodiment, the method further includes: agreeing with the first communication node that the N first-type resource groups have one of the following characteristics: resources in a same first-type resource group are not allowed to be space division multiplexed, resources in different first-type resource groups are allowed to be space division multiplexed, and a maximum number of space division multiplexing layers is less than or equal to a number of first-type resource groups; and the resources in the same first-type resource group are allowed to be space division multiplexed, the resources in different first-type resource groups are not allowed to be space division multiplexed, and a number of space division multiplexing layers of the resources in the same first-type resource group is less than or equal to a number of resources in the same first-type resource group.

In an alternative embodiment, at least one of the following is included: in the first-type grouping indication information, resources in each of the N first-type resource groups are sequentially arranged according to receiving qualities of the resources; the first-type grouping indication information includes at least one of: a number of the first-type resource groups, indication on the resources in each of the N first-type resource groups, information on a number of resources in each of the N first-type resource groups, grouping manner indication information, group index information and information on a common parameter corresponding to each of the N first-type resource groups; the first-type grouping indication information includes a plurality of levels of groups; and the first-type grouping indication information includes two levels of groups, where one first-level group includes a plurality of second-level groups, where a second communication node configured to divide the M resources into the N first-type resource groups has a capability of simultaneously generating receiving resources corresponding to different first-level groups or all first-level groups and generating, in a time division manner, different receiving resources corresponding to the plurality of second-level groups in a same first-level group, or a capability of generating, in the time division manner, receiving resources corresponding to resources in the different first-level groups and simultaneously generating receiving resources correspond to different second-level groups or all second-level groups included in the same first-level group.

In an alternative embodiment, at least one of the following is included: the number of the first-type resource groups has a mapping relationship with information on resources for transmitting the indication information and the first-type grouping indication information; the information on the resources in each of the N first-type resource groups, where the information on the resources includes at least one of: index information of the resources in the candidate resource set and channel quality indication (CQI) information corresponding to each of the resources; the common parameter corresponding to each of the N first-type resource groups includes at least one of the following parameters: a cyclic prefix (CP) length corresponding to each of the N first-type resource groups, a precoding matrix indicator (PMI) corresponding to each of the N first-type resource groups, a rank indicator (RI) corresponding to each of the N first-type resource groups, a channel quality indication (CQI) corresponding to each of the N first-type resource groups, a timing advance (TA) parameter corresponding to each of the N first-type resource groups, a quasi-co-location parameter corresponding to each of the N first-type resource groups, and a receiving resource corresponding to each of the N first-type resource groups; and a resource index set of resources in a j-th first-type resource group in the first-type grouping indication information is $\{b_{i,j}-1, i=0, 1, \ldots, Lj-1\}$, where $1 \leq b_{i,j} \leq TBN$, $b_{i,j} < b_{i+1,j}$, the resource index set is denoted with $$\left\lceil \log 2 \binom{TBN}{Lj} \right\rceil$$

bits, a value of the $$\left\lceil \log 2 \binom{TBN}{Lj} \right\rceil$$

bits is $$abbi = \sum_{i=0}^{Lj-1} \left\{ \binom{TBN - b_i}{Lj - i} \right\},$$

where $$\left\{ \begin{matrix} x \\ y \end{matrix} \right\} = \begin{cases} \binom{x}{y}, & x \geq y \\ 0, & x < y \end{cases},$$

TBN is a total number of resources in the candidate resource set, $0 \leq j \leq N-1$, N is a number of first-type resource groups, Lj is a number of resources in the j-th first-type resource group and $$\binom{A}{B}$$

denotes a number of different combinations of selecting B numbers from A number.

In an alternative embodiment, N satisfies one of the following characteristics: N is a first agreed value; and N is less than or equal to N_max, where N_max is a second agreed value.

In an alternative embodiment, the method further includes: feeding back a maximum number of simultaneously generatable different receiving resources corresponding to different first-type resource groups to the first communication node.

In an alternative embodiment, the resources in the candidate resource set are used for at least one of: receiving and/or transmitting a synchronization signal; receiving and/or transmitting a data signal; receiving and/or transmitting a control signal; and receiving and/or transmitting a pilot signal.

In an alternative embodiment, different first-type resource groups include a same number of resources or different numbers of resources.

In an alternative embodiment, one of the following is included: resources in a same first-type resource group are not allowed to be space division multiplexed and resources in different first-type resource groups are allowed to be space division multiplexed; and the resources in the same first-type resource group are allowed to be space division multiplexed and the resources in different first-type resource groups are not allowed to be space division multiplexed.

In an alternative embodiment, one of the following is included: a maximum number of space division multiplexing layers available to resources in a same first-type resource group is less than or equal to a maximum number of space division multiplexing layers available to resources in different first-type resource groups; the maximum number of space division multiplexing layers available to the resources in the same first-type resource group is greater than or equal to the maximum number of space division multiplexing layers available to the resources in different first-type resource groups; the maximum number of space division multiplexing layers available to the resources in the same first-type resource group is less than the maximum number of space division multiplexing layers available to the resources in different first-type resource groups; and the maximum number of space division multiplexing layers available to the resources in the same first-type resource group is greater than the maximum number of space division multiplexing layers available to the resources in different first-type resource groups.

In an alternative embodiment, one of the following is included: resources in a same first-type resource group support simultaneous reception; resources in different first-type resource groups do not support simultaneous reception; the resources in the same first-type resource group support simultaneous reception and the resources in different first-type resource groups do not support simultaneous reception; and the resources in the same first-type resource group support simultaneous reception and the resources in different first-type resource groups support simultaneous reception.

In an alternative embodiment, one of the following is included: resources in different first-type resource groups support simultaneous reception; resources in a same first-type resource group do not support simultaneous reception; the resources in different first-type resource groups support simultaneous reception and the resources in the same first-type resource group do not support simultaneous reception; and the resources in different first-type resource groups support simultaneous reception and the resources in the same first-type resource group support simultaneous reception.

In an alternative embodiment, at least one of the following is included: the N first-type resource groups are associated with a channel measurement related process; and the N first-type resource groups are associated with a channel measurement related set.

In an alternative embodiment, the channel measurement related process is a channel state information (CSI) process; and the channel measurement related set includes at least one of a CSI reporting set (CSI reporting settings), a resource set (Resource settings), a CSI measurement set (CSI measurement settings), a link set (link settings), and a reference signal, RS, set (RS settings), where the CSI measurement set includes one or more links, each of which is used for establishing a relationship between the resource set and the CSI reporting set.

Another embodiment of the present invention provides a method for acquiring grouping indication information. The method includes: acquiring second-type grouping indication information, where the second-type grouping indication information includes at least one of: information on a group index set, grouping manner indication information, information on resources in a group, where the group index set includes at least one group index.

In an alternative embodiment, the method further included: determining a transmission parameter and/or a reception parameter of a signal corresponding to the second-type grouping indication information according to the second-type grouping indication information.

In an alternative embodiment, the signal includes at least one of a control channel signal, a data channel signal and a reference signal.

In an alternative embodiment, the acquiring second-type grouping indication information includes at least one of the following: acquiring the second-type grouping indication information according to a rule agreed with a first communication node; receiving semi-static signaling and acquiring the second-type grouping indication information from the semi-static signaling; receiving dynamic signaling and acquiring the second-type grouping indication information from the dynamic signaling; and receiving a system message and acquiring the second-type grouping indication information from the system message.

In an alternative embodiment, the determining a transmission parameter and/or a reception parameter of a signal corresponding to the second-type grouping indication information according to the second-type grouping indication information includes: determining a correspondence pre-agreed with a first communication node, where the correspondence is a correspondence between the second-type grouping indication information and the transmission parameter and/or the reception parameter; and determining the transmission parameter and/or the reception parameter according to the correspondence and the second-type grouping indication information.

In an alternative embodiment, the correspondence between the second-type grouping indication information and the transmission parameter and/or the reception parameter is included in first-type grouping indication information fed back to the first communication node.

In an alternative embodiment, the transmission parameter includes at least one of: a modulation and coding scheme (MCS) set corresponding to the signal, a multiplexing manner used by the signal, a length of a cyclic prefix (CP) corresponding to the signal, a number of space division multiplexing layers used by the signal, demodulation reference signal port information used by the signal, quasi-co-located reference signal resource information corresponding to the signal, structural information corresponding to the signal, a channel characteristic reference signal corresponding to the signal and a transmission manner corresponding to the signal; where the structural information includes at least one of: a CP length of a start symbol of a time unit, information indicating whether the start symbol of the time unit includes a synchronization signal, and a CP length of a last symbol of the time unit; and/or the reception parameter includes a receiving resource for receiving the signal.

In an alternative embodiment, a grouping manner indicated by the second-type grouping indication information includes at least one of: grouping according to a receiving resource corresponding to each of resources in a candidate resource set, grouping according to a channel quality corresponding to each of the resources in the candidate resource set, grouping according to a predetermined multiplexing manner, grouping according to a timing advance (TA) parameter, grouping according to a cyclic prefix (CP) length, grouping according to a space division multiplexing manner, grouping according to a quasi-co-location relationship, grouping according to a transmitted measurement reference signal, and grouping according to a channel characteristic.

In an alternative embodiment, the receiving resource includes at least one of: a receiving beam, a receiving antenna, a receiving port, a receiving precoding matrix, receiving time, receiving frequency-domain resource, a receiving sector and a receiving sequence.

In an alternative embodiment, the information on the resources in the group includes resource information of a reference signal, where the reference signal includes at least one of: a demodulation reference signal and a measurement reference signal.

In an alternative embodiment, resources in a same group have a same channel characteristic and/or quasi-co-location information.

In an alternative embodiment, a correspondence exists between the at least one group index and port information of a measurement reference signal transmitted by a second communication node, where the second communication node acquires the second-type grouping information.

Another embodiment of the present invention provides a signal receiving method. The method includes: acquiring third-type grouping indication information; and receiving a demodulation reference signal and/or a control channel according to the third-type grouping indication information.

In an alternative embodiment, the third-type grouping indication information includes at least one of: the number of the groups, indication on resources in each group, information on a number of resources in each group, grouping manner indication information and group index information.

In an alternative embodiment, the acquiring third-type grouping indication information includes at least one of the following: acquiring feedback information according to a signal transmitted by a first communication node, where the feedback information includes the third-type grouping indication information; acquiring the third-type grouping indication information according to a rule agreed with the first communication node; and receiving signaling information, where the signaling information includes the third-type grouping indication information.

In an alternative embodiment, the receiving a demodulation reference signal and/or a control channel according to the third-type grouping indication information includes: receiving, according to the third-type grouping indication information, the demodulation reference signal and/or the control channel on time division multiplexed N1 resources, where N1=x×N or N1 is less than or equal to N, where N1 is an integer greater than 0, N is a number of third-type groups included in the third-type grouping indication information and x is an integer greater than or equal to 1.

In an alternative embodiment, the method includes: receiving the demodulation reference signal and/or the control channel on the N1 resources for transmitting the demodulation reference signal by using a receiving resource in a receiving resource set; and/or selecting one or more receiving resources from the receiving resource set according to a certain rule, and receiving data and/or a control signal and/or a reference signal subsequent to the demodulation reference signal according to the selected one or more receiving resources.

In an alternative embodiment, the method further includes: obtaining the receiving resource set in at least one of the following manners: the receiving resource set includes receiving resources corresponding to all groups indicated by the third-type grouping indication information; the receiving resource set includes receiving resources corresponding to N2 group indexes agreed with a first communication node, where N2 is an integer greater than or equal to 1; and the receiving resource set is determined by acquiring signaling indication information.

In an alternative embodiment, the receiving resource includes at least one of: a receiving beam, a receiving antenna, a receiving port, a receiving precoding matrix, receiving time, receiving frequency-domain resource, a receiving sector and a receiving sequence.

In an alternative embodiment, before the receiving, according to the third-type grouping indication information, the demodulation reference signal and/or the control channel on time division multiplexed N1 resources, the method further includes: acquiring x and/or N1. The acquiring x and/or N1 includes at least one of the following: acquiring x and/or N1 in a manner agreed with a first communication node; acquiring x and/or N1 in a semi-static signaling configuration manner; and acquiring x and/or N1 in a dynamic signaling configuration manner.

In an alternative embodiment, the receiving a demodulation reference signal and/or a control channel according to the third-type grouping indication information includes: receiving, according to the third-type grouping indication information, the demodulation reference signal and/or the control channel on an agreed time unit, and receiving the demodulation reference signal and/or the control channel on only one time division multiplexed resource on a non-agreed time unit.

Another embodiment of the present invention provides a method for receiving feedback information. The method includes: receiving the feedback information from a second communication node, where the feedback information includes indication information for indicating M resources selected by the second communication node and first-type grouping indication information for indicating that the second communication node divides the M resources into N first-type resource groups; and performing resource scheduling and/or signal transmission according to the feedback information; where both N and M are integers, N is less than or equal to M, and the M resources are selected from a candidate resource set.

In an alternative embodiment, before the receiving the feedback information from a second communication node, the method further includes at least one of the following: transmitting signals corresponding to all or part of resources in the candidate resource set to the second communication node; and transmitting information for determining the first-type grouping indication information to the second communication node, where the information includes at least one of: grouping restriction indication information, a parameter for determining a grouping rule, a threshold parameter for determining groups, configuration indication information of the candidate resource set and grouping manner indication information.

In an alternative embodiment, a grouping manner indicated by the first-type grouping indication information includes at least one of: grouping according to a receiving resource corresponding to each resource; grouping according to a channel quality corresponding to each resource; grouping according to a predetermined multiplexing manner; grouping according to a timing advance (TA) parameter; grouping according to a cyclic prefix (CP) length; grouping according to a space division multiplexing manner; and grouping according to a quasi-co-location relationship.

In an alternative embodiment, the grouping according to a predetermined multiplexing manner includes the grouping according to a space division multiplexing manner. The receiving resource includes at least one of: a receiving beam, a receiving antenna, a receiving port, a receiving precoding matrix, receiving time, receiving frequency-domain resource, a receiving sector and a receiving sequence.

In an alternative embodiment, the N first-type resource groups have at least one of the following characteristics: a same first-type resource group corresponds to a same timing advance (TA); different first-type resource groups correspond to different TAs; resources in the same first-type resource group are allowed to be scheduled in a same time unit; all or part of the resources in the same first-type resource group are allowed to be scheduled in the same time unit; the different first-type resource groups are scheduled in different time units and not schedulable in the same time unit;

a multiplexing manner set of the resources in the same first-type resource group is a set A, and a multiplexing manner set of resources in the different first-type resource groups is a set B, where the set B is a true subset of the set A or the set A is a true subset of the set B; the resources in the same first-type resource group are not allowed to be space division multiplexed in the same time unit, the resources in the different first-type resource groups are allowed to be space division multiplexed in the same time unit, where a number of space division multiplexing layers is less than or equal to a number of first-type resource groups; a first cyclic prefix (CP) length is adopted when the resources in the same first-type resource group are simultaneously scheduled in the same time unit or switched between different time units; a second CP length is adopted when the resources in the different first-type resource groups are scheduled in the same time unit; when scheduled resources switch between the different first-type resource groups or combination of first-type resource groups, a switching start orthogonal frequency division multiplexing (OFDM) symbol uses a third CP length, and/or a switching start position has a synchronization signal used for a reception timing of the second communication node, and/or a last OFDM symbol before switching uses the third CP length; and the same first-type resource group has a same quasi-co-location and all the resources in the same first-type resource group share a quasi-co-located reference signal.

In an alternative embodiment, at least one of the following is included: resources in a same first-type resource group are allowed to be space division multiplexed in a same time unit, where a number of space division multiplexing layers is less than or equal to a number of resources in each of the N first-type resource groups; and resources in different first-type resource groups are not allowed to be space division multiplexed in the same time unit; and cyclic prefix (CP) lengths corresponding to the resources in different first-type resource groups scheduled in the same time unit is obtained according to differences of resource group indexes of the different first-type resource groups where the resources are located.

In an alternative embodiment, the third CP length is greater than the first CP length and the second CP length.

In an alternative embodiment, one of the following is included: resources in a same first-type resource group are not space division multiplexed and resources in different first-type resource groups are space division multiplexed; and the resources in the same first-type resource group are space division multiplexed and the resources in different first-type resource groups are not space division multiplexed.

In an alternative embodiment, one of the following is included: a maximum number of space division multiplexing layers available to resources in a same first-type resource group is less than or equal to a maximum number of space division multiplexing layers available to resources in different first-type resource groups; the maximum number of space division multiplexing layers available to the resources in the same first-type resource group is greater than or equal to the maximum number of space division multiplexing layers available to the resources in different first-type resource groups; the maximum number of space division multiplexing layers available to the resources in the same first-type resource group is less than the maximum number of space division multiplexing layers available to the resources in different first-type resource groups; and the maximum number of space division multiplexing layers available to the resources in the same first-type resource group is greater than the maximum number of space division multiplexing layers available to the resources in different first-type resource groups.

In an alternative embodiment, the method further include: agreeing with the second communication node on one of the following: the second communication node is capable of simultaneously receiving resources in a same first-type resource group; the second communication node is incapable of simultaneously receiving resources in different first-type resource groups; the second communication node is capable of simultaneously receiving the resources in the same first-type resource group and the second communication node is incapable of simultaneously receiving the resources in different first-type resource groups; and the second communication node is capable of simultaneously receiving the resources in the same first-type resource group and the second communication node is capable of simultaneously receiving the resources in different first-type resource groups.

In an alternative embodiment, the method further include: agreeing with the second communication node on one of the following: the second communication node is capable of simultaneously receiving resources in different first-type resource groups; the second communication node is incapable of simultaneously receiving resources in a same first-type resource group; the second communication node is capable of simultaneously receiving the resources in different first-type resource groups and the second communication node is incapable of simultaneously receiving the resources in the same first-type resource group; and the second communication node is capable of simultaneously receiving the resources in different first-type resource groups and the second communication node is capable of simultaneously receiving the resources in the same first-type resource group.

In an alternative embodiment, at least one of the following is included: the N first-type resource groups are associated with a channel measurement related process; and the N first-type resource groups are associated with a channel measurement related set.

In an alternative embodiment, the channel measurement related process is a channel state information (CSI) process; and the channel measurement related set includes at least one of a CSI reporting set (CSI reporting settings), a resource set (Resource settings), a CSI measurement set (CSI measurement settings), a link set (link settings), and a reference signal, RS, set (RS settings), where the CSI measurement set includes one or more links, each of which is used for establishing a relationship between the resource set and the CSI reporting set.

Another embodiment of the present invention provides a method for notifying grouping indication information. The method includes: determining second-type grouping indication information; and notifying a second communication node of the second-type grouping indication information, where the second-type grouping indication information includes at least one of: information on a group index set, grouping manner indication information, information on resources in a group, where the group index set includes at least one group index.

In an alternative embodiment, the notifying a second communication node of the second-type grouping indication information includes at least one of the following: agreeing with the second communication node on the second-type grouping indication information; transmitting the second-type grouping indication information to the second communication node by semi-static signaling; transmitting the second-type grouping indication information to the second communication node by dynamic signaling; and transmitting the second-type grouping indication information to the second communication node through a system message.

In an alternative embodiment, at least one of the following is included: the second-type grouping indication information is used by the second communication node to determine a transmission parameter and/or a reception parameter of a signal corresponding to the second-type grouping indication information; the transmission parameter includes at least one of: an MCS set corresponding to the signal, a multiplexing manner used by the signal, a length of a cyclic prefix (CP) corresponding to the signal, a number of space division multiplexing layers used by the signal, demodulation reference signal port information used by the signal, quasi-co-located reference signal resource information corresponding to the signal, structural information corresponding to the signal, a channel characteristic reference signal corresponding to the signal and a transmission manner of the signal; where the structural information includes at least one of: a CP length of a start symbol of a time unit, information indicating whether the start symbol of the time unit includes a synchronization signal, and a CP length of a last symbol of the time unit; and the reception parameter includes a receiving resource for receiving the signal.

In an alternative embodiment, the signal includes at least one of a control channel signal, a data channel signal and a reference signal.

In an alternative embodiment, before transmitting the second-type grouping indication information to the second communication node, the method further includes: determining a correspondence between the second-type grouping indication information and a parameter, where the parameter includes the transmission parameter and/or the reception parameter.

In an alternative embodiment, the determining a correspondence between the second-type grouping indication information and a parameter includes at least one of the following: determining the correspondence between the second-type grouping indication information and the parameter in an agreed manner with the second communication node; determining the correspondence between the second-type grouping indication information and the parameter by receiving first-type grouping indication information fed back by the second communication node; and transmitting the correspondence to the second communication node.

In an alternative embodiment, the determining the correspondence between the second-type grouping indication information and the parameter in an agreed manner with the second communication node includes: obtaining the correspondence between the second-type grouping indication information and the parameter according to a measurement reference signal transmitted by the second communication node.

In an alternative embodiment, the first-type grouping indication information includes at least one of: the number of the groups, indication on the resources in each group, information on a number of resources in each group, grouping manner indication information, group index information and information on a common parameter corresponding to each group.

In an alternative embodiment, the common parameter corresponding to each group includes at least one of the following parameters: a CP length corresponding to each group, a precoding matrix indicator (PMI) corresponding to each group, a rank indicator (RI) corresponding to each group, a channel quality indication (CQI) corresponding to each group, a timing advance (TA) parameter corresponding to each group, a quasi-co-location parameter corresponding to each group, and a receiving resource corresponding to each group.

In an alternative embodiment, a grouping manner indicated by the second-type grouping indication information includes at least one of: grouping according to a receiving resource corresponding to a transmission resource, grouping according to a channel quality corresponding to the transmission resource, grouping according to a predetermined multiplexing manner, grouping according to a timing advance (TA) parameter, grouping according to a cyclic prefix (CP) length, grouping according to a space division multiplexing manner, grouping according to a quasi-co-location relationship, grouping according to a measurement reference signal transmitted by the second communication node, and grouping according to a channel characteristic. The transmission resource includes at least one of: a transmission beam resource, a transmission antenna resource, a transmission port resource, a transmission frequency domain resource, a transmission sequence resource and a transmission time domain resource.

In an alternative embodiment, the receiving resource includes at least one of: a receiving beam, a receiving antenna, a receiving port, a receiving precoding matrix, receiving time, receiving frequency-domain resource, a receiving sector and a receiving sequence.

In an alternative embodiment, the information on the resources in the group includes resource information of a reference signal, where the reference signal includes at least one of: a demodulation reference signal and a measurement reference signal.

In an alternative embodiment, resources in a same group have a same channel characteristic and/or quasi-co-location information.

In an alternative embodiment, a correspondence exists between the at least one group index and port information of a measurement reference signal transmitted by the second communication node.

Another embodiment of the present invention provides a signal transmission method. The method includes: determining third-type grouping indication information; and transmitting a demodulation reference signal and/or a control channel according to the third-type grouping indication information.

In an alternative embodiment, the third-type grouping indication information includes at least one of: the number of the groups, indication on resources in each group, information on a number of resources in each group, grouping manner indication information and group index information.

In an alternative embodiment, the determining third-type grouping indication information includes at least one of the following: determining the third-type grouping indication information according to first-type grouping indication information received from a second communication node; and determining the third-type grouping indication information according to a rule agreed with the second communication node.

In an alternative embodiment, the transmitting a demodulation reference signal and/or a control channel according to the third-type grouping indication information includes: transmitting, according to the third-type grouping indication information, the demodulation reference signal and/or the control channel on time division multiplexed N1 resources, where N1=x×N or N1 is less than or equal to N, where N1 is an integer greater than 0, N is a number of groups and x is an integer greater than or equal to 1.

In an alternative embodiment, before the transmitting a demodulation reference signal and/or a control channel according to the third-type grouping indication information, the method further includes: notifying a second communication node of x and/or N1.

In an alternative embodiment, the notifying a second communication node of x and/or N1 includes at least one of the following: notifying the second communication node of x and/or N1 in an agreed manner with the second communication node; notifying the second communication node of x and/or N1 by semi-static signaling; and notifying the second communication node of x and/or N1 by dynamic signaling.

In an alternative embodiment, the demodulation reference signal is transmitted on the N1 resources in a same transmission manner, where a transmission manner of the demodulation reference signal includes at least one of: a transmission beam, a transmission port, a transmission antenna, a transmission precoding matrix and a transmission frequency domain resource.

In an alternative embodiment, the demodulation reference signal and/or the control channel transmitted on the N1 resources have a same transmission manner as data and/or a control signal and/or a reference signal transmitted subsequent to the demodulation reference signal and/or the control channel, where a transmission manner of the demodulation reference signal includes at least one of: a transmission beam, a transmission port, a transmission antenna, a transmission precoding matrix and a transmission frequency domain resource.

In an alternative embodiment, the transmitting a demodulation reference signal and/or a control channel according to the third-type grouping indication information includes: transmitting, according to the third-type grouping indication information, the demodulation reference signal and/or the control channel on an agreed time unit, and transmitting the demodulation reference signal and/or the control channel on only one time division multiplexed resource on a non-agreed time unit.

Another embodiment of the present invention provides a device for feeding back grouping indication information. The device includes a first determining module and a first transmitting module. The first determining module is configured to determine M resources from a candidate resource set and divide the M resources into N first-type resource groups, where M is an integer greater than or equal to 1 and N is a positive integer less than or equal to M. The first transmitting module is configured to feed back indication information for indicating the M resources and first-type grouping indication information for indicating that the M resources are divided into the N first-type resource groups to a first communication node. Resources in the candidate resource set include at least one of: a transmission beam resource, a transmission antenna resource, a transmission port resource, a transmission frequency domain resource, a transmission sequence resource and a transmission time domain resource.

In an alternative embodiment, the first determining module determines the M resources from the candidate resource set in the following manners: determining the candidate resource set, where the candidate resource set includes Q second-type resource groups, where Q is an integer greater than or equal to 1; receiving a transmission signal transmitted on the candidate resource set; and determining the M resources from the candidate resource set according to the received transmission signal.

In an alternative embodiment, the first determining module divides the M resources into the N first-type resource groups in at least one of the following manners: dividing the M resources into the N first-type resource groups according to receiving resources corresponding to the M resources; dividing the M resources into the N first-type resource groups according to a signal quality on each of the M resources or a channel quality corresponding to the each of the M resources; dividing the M resources into the N first-type resource groups according to a predetermined multiplexing manner; dividing the M resources into the N first-type resource groups according to a timing advance (TA) parameter; dividing the M resources into the N first-type resource groups according to a length of a cyclic prefix (CP); dividing the M resources into the N first-type resource groups according to a quasi-co-location relationship; dividing the M resources into the N first-type resource groups according to grouping configuration information; and dividing the M resources into the N first-type resource groups according to a channel characteristic.

In an alternative embodiment, the first determining module divides the M resources into the N first-type resource groups according to the predetermined multiplexing manner in the following manner: dividing the M resources into the N first-type resource groups according to a space division multiplexing manner, where resources not supporting space division multiplexing are grouped into a same first-type resource group, resources supporting the space division multiplexing are grouped into different first-type resource groups, and a number of first-type resource groups is greater than or equal to a maximum number of space division multiplexing layers; or the resources supporting the space division multiplexing are grouped into a same first-type resource group, the resources not supporting the space division multiplexing are grouped into different first-type resource groups, and a number of space division multiplexing layers of the resources in the same first-type resource group is less than or equal to a number of resources in the same first-type resource group.

Another embodiment of the present invention provides a device for acquiring grouping indication information. The device includes a first acquisition module. The first acquisition module is configured to acquire second-type grouping indication information. The second-type grouping indication information includes at least one of: information on a group index set, grouping manner indication information, information on resources in a group, where the group index set includes at least one group index.

In an alternative embodiment, the device further includes a first processing module. The first processing module is configured to determine a transmission parameter and/or a reception parameter of a signal corresponding to the second-type grouping indication information according to the second-type grouping indication information.

In an alternative embodiment, the first processing module determines the transmission parameter and/or the reception parameter of the signal corresponding to the second-type grouping indication information in the following manners: determining a correspondence pre-agreed with a first communication node, where the correspondence is a correspondence between the second-type grouping indication information and the transmission parameter and/or the reception parameter; and determining the transmission parameter and/or the reception parameter according to the correspondence and the second-type grouping indication information.

In an alternative embodiment, the correspondence between the second-type grouping indication information and the transmission parameter and/or the reception parameter is included in first-type grouping indication information fed back to the first communication node.

Another embodiment of the present invention provides a signal receiving device. The device includes a second acquisition module and a first receiving module. The second acquisition module is configured to acquire third-type grouping indication information. The first receiving module is configured to receive a demodulation reference signal and/or a control channel according to the third-type grouping indication information.

In an alternative embodiment, the third-type grouping indication information includes at least one of: the number of the groups, indication on resources in each group, information on a number of resources in each group, grouping manner indication information and group index information.

In an alternative embodiment, the second acquisition module acquires the third-type grouping indication information in at least one of the following manners: acquiring feedback information according to a signal transmitted by a first communication node, where the feedback information includes the third-type grouping indication information; acquiring the third-type grouping indication information according to a rule agreed with the first communication node; and receiving signaling information, where the signaling information includes the third-type grouping indication information.

In an alternative embodiment, the first receiving module receives the demodulation reference signal and/or the control channel in the following manner: receiving, according to the third-type grouping indication information, the demodulation reference signal and/or the control channel on time division multiplexed N1 resources, where N1=x×N or N1 is less than or equal to N, where N1 is an integer greater than 0, N is a number of third-type groups included in the third-type grouping indication information and x is an integer greater than or equal to 1.

Another embodiment of the present invention provides a device for receiving feedback information. The device includes a second receiving module and a second transmitting module. The second receiving module is configured to receive the feedback information from a second communication node. The feedback information includes indication information for indicating M resources selected by the second communication node and first-type grouping indication information for indicating that the second communication node divides the M resources into N first-type resource groups. The second transmitting module is configured to perform resource scheduling and/or signal transmission according to the feedback information; where both N and M are integers, N is less than or equal to M, and the M resources are selected from a candidate resource set.

In an alternative embodiment, a grouping manner indicated by the first-type grouping indication information includes at least one of: grouping according to a receiving resource corresponding to each resource; grouping according to a channel quality corresponding to each resource; grouping according to a predetermined multiplexing manner; grouping according to a timing advance (TA) parameter; grouping according to a cyclic prefix (CP) length; grouping according to a space division multiplexing manner; and grouping according to a quasi-co-location relationship.

Another embodiment of the present invention provides a device for notifying grouping indication information. The device includes a second determining module and a third transmitting module. The second determining module is configured to determine second-type grouping indication information. The third transmitting module is configured to notify a second communication node of the second-type grouping indication information. The second-type grouping indication information includes at least one of: information on a group index set, grouping manner indication information, information on resources in a group, where the group index set includes at least one group index.

In an alternative embodiment, the third transmitting module notifies the second communication node of the second-type grouping indication information in at least one of the following manners: agreeing with the second communication node on the second-type grouping indication information; transmitting the second-type grouping indication information to the second communication node by semi-static signaling; transmitting the second-type grouping indication information to the second communication node by dynamic signaling; and transmitting the second-type grouping indication information to the second communication node through a system message.

Another embodiment of the present invention provides a signal transmission device. The device includes a third determining module and a fourth transmitting module. The third determining module is configured to determine third-type grouping indication information. The fourth transmitting module is configured to transmit a demodulation reference signal and/or a control channel according to the third-type grouping indication information.

In an alternative embodiment, the third-type grouping indication information includes at least one of: the number of the groups, indication on resources in each group, information on a number of resources in each group, grouping manner indication information and group index information.

Another embodiment of the present invention provides a storage medium. The storage medium is configured to store program codes for executing one of the steps or a combination of the steps in the method embodiments described above.

In the present invention, a receiving end groups transmission resources and feeds back the information to a transmitting end, the resources in the same group have certain common characteristics, and the resources in different groups have different characteristics. With a limited feedback information, more information is provided to the transmitting end, so that the transmitting end has the improved scheduling flexibility and can reasonably and effectively manage the resources. Therefore, the present invention may solve the problem in the existing art that the transmission beams cannot be reasonably and flexibility managed and scheduled, and achieve flexibly managing and scheduling the transmission beams.

BRIEF DESCRIPTION OF DRAWINGS

The drawings described herein are used to provide a further understanding of the present invention and form a part of the present application. The exemplary embodiments and descriptions thereof in the present invention are used to explain the present invention and not to limit the present invention in any improper way. In the drawings.

DETAILED DESCRIPTION

Hereinafter the present invention will be described in detail with reference to the drawings in conjunction with embodiments. It is to be noted that if not in collision, the embodiments and features therein in the present application may be combined with each other.

It is to be noted that the terms "first", "second" and the like in the description, claims and drawings of the present invention are used to distinguish between similar objects and are not necessarily used to describe a particular order or sequence.

Figure 1:
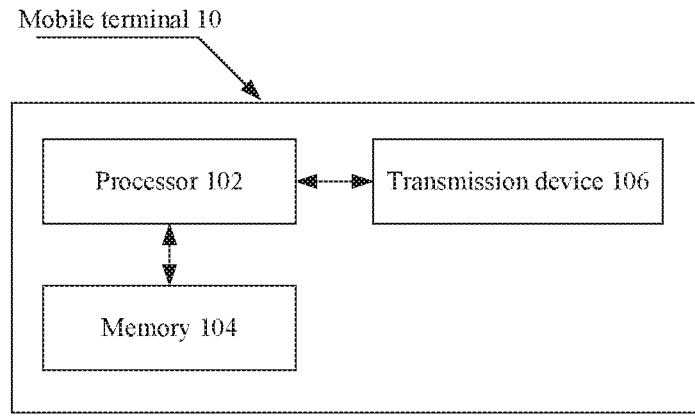
FIG. 1 is a block diagram of a hardware configuration of a mobile terminal for receiving a signal according to an embodiment of the present invention.

Method embodiments provided by the present application may be executed in a mobile terminal, a computer terminal or other similar computing devices. Taking the method embodiments to be executed in the mobile terminal as an example, FIG. 1 is a block diagram of hardware of a mobile terminal for receiving a signal (or a mobile terminal for acquiring a signal parameter) according to an embodiment of the present invention. As shown in FIG. 1, a mobile terminal 10 may include one or more (only one processor is shown in FIG. 1) processors 102 (the processors 102 may include, but are not limited to, a processing device such as a microcontroller unit (MCU) and a field programmable gate array (FPGA)), a memory 104 for storing data and a transmission device 106 for a communication function. It should be understood by those skilled in the art that the structure shown in FIG. 1 is merely illustrative and not intended to limit the structure of the electronic device described above. For example, the mobile terminal 10 may further include more or fewer components than the components shown in FIG. 1 or may have a configuration different from the configuration shown in FIG. 1.

The memory 104 may be used for storing software programs and modules of application software, such as program instructions/modules corresponding to the signal receiving method in the embodiments of the present invention. The processor 102 executes the software programs and modules stored in the memory 104 so as to perform various function applications and data processing, that is, to implement the method described above. The memory 104 may include a high-speed random access memory, and may further include a nonvolatile memory, such as one or more magnetic storage devices, flash memories or other nonvolatile solid-state memories. In some examples, the memory 104 may further include memories that are remotely disposed with respect to the processor 102. These remote memories may be connected to the mobile terminal 10 via a network. Examples of the network described above include, but are not limited to, the Internet, an intranet, a local area network, a mobile communication network and a combination thereof.

The transmission device 106 is configured to receive and transmit data via a network. Specific examples of the network described above may include a wireless network provided by a communication provider of the mobile terminal 10. In one example, the transmission device 106 includes a network interface controller (NIC), which may be connected to other network devices via a base station, thereby communicating with the Internet. In one example, the transmission device 106 may be a radio frequency (RF) module, which is configured to communicate with the Internet wirelessly.

Figure 2:
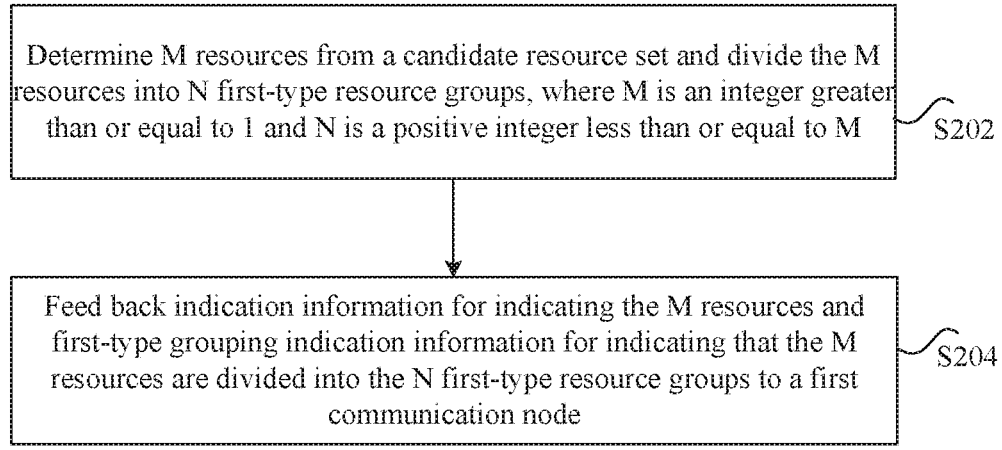
FIG. 2 is a flowchart of a method for feeding back grouping indication information according to an embodiment of the present invention.

A method for feeding back grouping indication information is provided in the embodiment. FIG. 2 is a flowchart of a method for feeding back grouping indication information according to an embodiment of the present invention. As shown in FIG. 2, the method includes the steps described below.

In step S202, M resources are determined from a candidate resource set and divided into N first-type resource groups, where M is an integer greater than or equal to 1 and N is a positive integer less than or equal to M.

In step S204, indication information for indicating the M resources and first-type grouping indication information for indicating that the M resources are divided into the N first-type resource groups are fed back to a first communication node.

Resources in the candidate resource set include at least one of: a transmission beam resource, a transmission antenna resource, a transmission port resource, a transmission frequency domain resource, a transmission sequence resource and a transmission time domain resource.

The above operations may be performed by a second communication node (such as a user equipment (UE) which may be referred to as a terminal). The first communication node may be a base station.

In the above steps, transmission resources may be grouped and the grouping information is fed back to the first communication node, resources in a same group have certain common characteristics, and resources in different groups have different characteristics. In this way, with limited feedback information, more information is provided to the transmitting end, so that the first communication node has improved scheduling flexibility and can reasonably and effectively manage the resources. Therefore, the method may solve the problem in the existing art that the transmission beams and/or receiving beams cannot be reasonably and flexibly managed and scheduled, and achieve an effect of flexibly managing and scheduling the transmission beams and/or the receiving beams.

In an alternative embodiment, the second communication node may determine the M resources from the candidate resource set through the steps described below. The candidate resource set is determined, where the candidate resource set includes Q second-type resource groups, where Q is an integer greater than or equal to 1. A transmission signal transmitted on the candidate resource set is received. The M resources are determined from the candidate resource set according to the received transmission signal.

In an alternative embodiment, the Q second-type resource groups in the candidate resource set are divided according to at least one of the following resource types: a beam resource, an antenna resource, a port resource, a frequency domain resource, a transmission sequence resource and a time domain resource. In the embodiment, different beam resources may be divided into different second-type resource groups; different port resources may be divided into different second-type resource groups; or different time/frequency resources may be divided into different second-type resource groups; different sequence resources may be divided into different second-type resource groups; different beam and port resources may be divided into different second-type resource groups; or different beam and time/frequency resources may be divided into different second-type resource groups. Optionally, the above resources are used for at least one of: receiving/transmitting a synchronization signal, receiving/transmitting a data signal, receiving/transmitting a control signal and receiving/transmitting a pilot signal.

In an alternative embodiment, the step in which the M resources are determined from the candidate resource set includes determining the M resources from the candidate resource set according to a channel quality and/or a signal quality of each resource in the candidate resource set.

In an alternative embodiment, resources in a same first-type resource group belong to one or more second-type resource groups of the Q second-type resource groups. For example, one Channel State Information-Reference Signal (CSI-RS) resource corresponds to one second-type resource group and multiple ports in the one CSI-RS resource correspond to resources included in the one second-type resource group, and the resources in the same first-type resource group may be composed of ports in one or more CSI-RS resources. Preferably, different CSI-RS resources correspond to different transmission nodes and different ports in a same CSI-RS resource may correspond to different transmission beams of the transmission node. Resources in a same second-type resource group belong to one or more of the N first-type resource groups. For example, transmission beams {1, 2, 3, 4, 5} constitute the candidate resource set, each transmission beam is one second-type resource group. When the transmission beams are divided into two first-type resource groups, transmission beams {1, 2, 3} may be one first-type resource group and transmission beams {1, 4, 5} may be the other first-type resource group. In this case, the transmission beam 1 may correspond to multiple first-type resource groups. An intersection set of different resource groups among the N first-type resource groups is not an empty set.

In an alternative embodiment, the M resources are divided into the N first-type resource groups in at least one of the following manners: dividing the M resources into the N first-type resource groups according to receiving resources corresponding to the M resources; dividing the M resources into the N first-type resource groups according to a signal quality on each of the M resources or a channel quality corresponding to the each of the M resources; dividing the M resources into the N first-type resource groups according to a predetermined multiplexing manner; dividing the M resources into the N first-type resource groups according to a timing advance (TA) parameter; dividing the M resources into the N first-type resource groups according to a length of a cyclic prefix (CP); dividing the M resources into the N first-type resource groups according to a quasi-co-location relationship; dividing the M resources into the N first-type resource groups according to grouping configuration information; and dividing the M resources into the N first-type resource groups according to a channel characteristic (which may also be referred to as a quasi-co-beam or a quasi-co-channel or another equivalent noun). In the embodiment, the predetermined multiplexing manner may include a recommended multiplexing manner, may also include a general multiplexing manner, and may also include a space multiplexing manner.

In an alternative embodiment, the step of dividing the M resources into the N first-type resource groups according to the predetermined multiplexing manner includes dividing the M resources into the N first-type resource groups according to the space division multiplexing manner. Resources not supporting space division multiplexing are grouped into a same first-type resource group, resources supporting the space division multiplexing are grouped into different first-type resource groups, and a number of first-type resource groups is greater than or equal to a maximum number of space division multiplexing layers. Alternatively, the resources supporting the space division multiplexing are grouped into a same first-type resource group, the resources not supporting the space division multiplexing are grouped into different first-type resource groups, and a number of space division multiplexing layers of the resources in the same first-type resource group is less than or equal to a number of resources in the same first-type resource group. In the embodiment, two resources supporting space division multiplexing means that the two resources support multi-stream transmission, and different resources transmit different data information. Alternatively, two resources supporting space division multiplexing means that the two resources have a low channel response correlation. The two resources may be used for transmitting same data to increase data robustness (if the data transmission on one resource fails, the same data may be transmitted correctly on a channel of the other resource). Alternatively, the two resources may be used for transmitting different data to increase a channel capacity. In a subsequent transmission phase in which resources supporting the space division multiplexing are used, the first communication node may transmit data to the second communication node using different resources in the space division multiplexing manner. In a subsequent transmission phase in which resources not supporting the space division multiplexing are not used, the first communication node may not transmit data to the second communication node using different resources in the space division multiplexing manner. However, when the first communication node transmits information to the second communication node and one or more third communication nodes by using the different resources, there are no such limitations.

In an alternative embodiment, the method includes at least one of the characteristics described below. Resources in a same first-type resource group have same one or more types of receiving resources, or one or more types of receiving resources corresponding to the resources have a difference less than a predetermined threshold (the difference of the receiving resources indicates that the receiving resources are different and have overlapping, or for example, a distance between the receiving resources such as a distance between vectors of receiving weights is less than the threshold) (for example, a correlation between receiving sequences is less than an agreed threshold and/or a correlation between receiving beams is less than the agreed threshold). The receiving resources include at least one of: a receiving antenna resource, a receiving port resource, a receiving weight resource, a receiving sector resource, a receiving sequence resource, a receiving time domain resource, a receiving frequency domain resource and a receiving beam resource (all receiving resources involved in the present invention may include at least one of the resource types above). Channel qualities corresponding to the resources in the same first-type resource group have a difference less than or equal to a threshold R1 (the different of the channel qualities denotes an absolute value of a difference of measurement values of channel qualities corresponding to different resources), and channel qualities corresponding to resources in different first-type resource groups have a difference greater than a threshold R2, where R1 or R2 is pre-agreed with the first communication node (R1 or R2 may be pre-agreed by the first communication node and the second communication node) or configured by signaling from the first communication node (R1 and R2 may be the same). Receiving signal qualities corresponding to the resources in the same first-type resource group have a difference less than or equal to a threshold r1 (the different of the receiving signal qualities denotes an absolute value of a difference of measurement values of receiving signal qualities corresponding to different resources), and receiving signal qualities corresponding to the resources in different first-type resource groups have a difference greater than a threshold r2, where r1 or r2 is pre-agreed with the first communication node or configured by signaling from the first communication node (r1 and r2 may be the same). A multiplexing manner set used for transmitting signals on the resources in the same first-type resource group is a set A, and a multiplexing manner set used for transmitting the signals on the resources in different first-type resource groups is a set B, where the set B is a true subset of the set A or the set A is a true subset of the set B (the set A and the set B are different sets). TA parameters used for transmitting the signal on the resources in the same first-type resource group have a difference less than or equal to a threshold T1, and TA parameters used for transmitting the signal on the resources in different first-type resource groups have a difference greater than a threshold T2, where T1 or T2 is pre-agreed with the first communication node or configured by signaling from the first communication node or determined according to a configuration of the CP (T1 and T2 may be the same). The CP length used for transmitting the signal on the resources in the same first-type resource group is less than or equal to t1, and the CP length used for transmitting the signal on the resources in different first-type resource groups is greater than t2, where t1 or t2 is pre-agreed with the first communication node or configured by signaling from the first communication node (t1 and t2 may be the same). The resources in different first-type resource groups correspond to different CP lengths. The resources in the same first-type resource group correspond to a same CP length. Transmission signals corresponding to the resources in the same first-type resource group are not allowed to be space division multiplexed. Transmission signals corresponding to the resources in different first-type resource groups are allowed to be space division multiplexed. The number of first-type resource groups is equal to a maximum number of transmission layers in space division multiplexing. The transmission signals corresponding to the resources in the same first-type resource group are quasi-co-located. The resources in the same first-type resource group have a same channel characteristic. A channel characteristic of a resource in each of the N first-type resource groups is acquirable according to a channel characteristic of another resource in the each of the N first-type resource groups.

In an alternative embodiment, the method includes at least one of the characteristics described below. The grouping configuration information includes at least one of: grouping restriction indication information, a threshold parameter for determining groups and a parameter for determining a grouping rule; and the grouping configuration information is configured by signaling from the first communication node or pre-agreed with the first communication node. The transmission signals corresponding to the resources in the same first-type resource group are allowed to be space division multiplexed. The transmission signals corresponding to the resources in different first-type resource groups are not allowed to be space division multiplexed. A number of space division multiplexing layers of the transmission signals corresponding to the resources in the same first-type resource group is less than or equal to a number of resources in the same first-type resource group.

In an alternative embodiment, the grouping restriction indication information includes the following: the number of resources in one first-type resource group is less than or equal to a, and the number N of first-type resource groups is less than or equal to b, where both a and b are natural numbers greater than or equal to 1. Alternatively, the number of resources in the same first-type resource group is a fixed number a, and the number N of first-type resource groups is a fixed number b, where both a and b are the natural numbers greater than or equal to 1.

In an alternative embodiment, the method includes agreeing with the first communication node that the N first-type resource groups have at least one of the characteristics described below. The resources in the same first-type resource group correspond to a same set of TA parameters. The resources in the same first-type resource group correspond to a same set of CP parameters. When different resources are transmitted simultaneously, CP lengths corresponding to the different resources are determined according to a maximum value of absolute values of differences of resource group indexes of first-type resource groups corresponding to the different resources. Different first-type resource groups correspond to different CP parameters. Resources in the same first-type resource group corresponds to a same receiving resource. Different first-type resource groups correspond to different receiving resources, and the different receiving resources are generated in a time division manner (the different receiving resources corresponding to the different first-type resource groups are generated in the time division manner by the second communication node which may perform the steps of determining the M resources and feeding back the indication information for indicating the M resources and the first-type grouping indication information for indicating that the M resources are divided into the N first-type resource groups to the first communication node). At least one type of channel or signal state parameter corresponding to the same first-type resource group is the same. The resources in the same first-type resource group are allowed to be frequency division multiplexed and/or space division multiplexed and/or time division multiplexed (a time division multiplexing manner is preferable for the same first-type resource group). The resources in different first-type resource groups do not support frequency division multiplexing or space division multiplexing and only support time division multiplexing. The resources in the same first-type resource group correspond to a same index indication parameter.

The limitation expression about the multiplexing mode "supporting (allowing) the space division multiplexing" and "not supporting the space division multiplexing" are used for limiting the data transmission stage after the feedback in which the first communication node transmits data to the second communication node. If the first communication node transmits information to the second communication node and the one or more third communication nodes by using the different resources, there are no such limitations. Specifically, for example, the limitation may be only imposed on two time division multiplexed resources. If one resource is sent to the second communication node and the other resource is sent to the third communication node, the two resources may be space division multiplexed and frequency division multiplexed.

In an alternative embodiment, channel parameters being the same or signal state parameters being the same includes at least one of: rank indicators (RI) being the same; reference signal received powers (RSRP) being the same; channel quality indications (CQI) being the same; receiving signal-to-noise ratios (SNR) being the same; precoding matrix indicators (PMI) being the same; and channel reference signals (CRI) being the same, and/or a same index corresponding to the resources in the same first-type resource group includes at least one of: a receiving beam index, a receiving sector index, a receiving antenna index, a receiving sequence index, a receiving port index and a receiving beam combination index.

In an alternative embodiment, the method further includes agreeing with the first communication node on the following characteristic: a capability of simultaneously generating receiving manners corresponding to all the N first-type resource groups is possessed. In the embodiment, the second communication may agree with the first communication node on the following characteristic: the second communication node processes the capability of simultaneously generating the receiving manners corresponding to all the N first-type resource groups. The second communication node may perform the steps of determining the M resources and feeding back the indication information for indicating the M resources and the first-type grouping indication information for indicating that the M resources are divided into the N first-type resource groups to the first communication node.

In an alternative embodiment, the method includes agreeing with the first communication node that the N first-type resource groups have one of the characteristics described below. The resources in the same first-type resource group are not allowed to be space division multiplexed, the resources in different first-type resource groups are allowed to be space division multiplexed, and the maximum number of space division multiplexing layers is less than or equal to the number of first-type resource groups. The resources in the same first-type resource group are allowed to be space division multiplexed, the resources in different first-type resource groups are not allowed to be space division multiplexed, and the number of space division multiplexing layers of the resources in the same first-type resource group is less than or equal to the number of resources in the same first-type resource group.

In an alternative embodiment, the method includes at least one of the characteristics described below. In the first-type grouping indication information, resources in each of the N first-type resource groups are sequentially arranged according to receiving qualities of the resources. The first-type grouping indication information includes at least one of: the number of the groups, indication on resources in each of the N first-type resource groups, information on a number of resources in each of the N first-type resource groups, grouping manner indication information, group index information and information on a common parameter corresponding to each of the N first-type resource groups. The first-type grouping indication information includes a plurality of levels of groups. The first-type grouping indication information includes two levels of groups and one first-level group includes a plurality of second-level groups, where the second communication node configured to divide the M resources into the N first-type resource groups has a capability of simultaneously generating receiving resources corresponding to different first-level groups or all first-level groups and generating, in a time division manner, different receiving resources corresponding to the plurality of second-level groups in a same first-level group, or a capability of generating, in the time division manner, receiving resources corresponding to resources in the different first-level groups and simultaneously generating receiving resources correspond to different second-level groups or all second-level groups included in the same first-level group.

In an alternative embodiment, the method includes at least one of the characteristics described below. The number of the groups has a mapping relationship with information on resources for transmitting the indication information and the first-type grouping indication information. The information on the resources in each of the N first-type resource groups, where the information on the resources includes at least one of: index information of the resources in the candidate resource set and CQI information corresponding to each of the resources. The common parameter corresponding to each of the N first-type resource groups includes at least one of the following parameters: a CP length corresponding to each of the N first-type resource groups, a PMI corresponding to each of the N first-type resource groups, an RI corresponding to each of the N first-type resource groups, a CQI corresponding to each of the N first-type resource groups, a TA parameter corresponding to each of the N first-type resource groups, a quasi-co-location parameter corresponding to each of the N first-type resource groups, and a receiving resource corresponding to each of the N first-type resource groups. A resource index set of resources in a j-th first-type resource group in the first-type grouping indication information is $\{b_{i,j}-1, i=0, 1, \ldots, Lj-1\}$, where $1 \leq b_{i,j} \leq TBN$, $b_{i,j} < b_{i+1,j}$, the resource index set is denoted with $$\left\lceil \log 2 \binom{TBN}{Lj} \right\rceil$$

bits, a value of the $$\left\lceil \log 2 \binom{TBN}{Lj} \right\rceil$$

bits is $$abbi = \sum_{i=0}^{Lj-1} \binom{TBN - b_i}{Lj - i},$$

where $$\binom{x}{y} = \begin{cases} \binom{x}{y}, & x \geq y \\ 0, & x < y \end{cases},$$

TBN is a total number of resources in the candidate resource set, $0 \leq j \leq N-1$, N is a number of first-type resource groups, Lj is a number of resources in the j-th first-type resource group and $$\binom{A}{B}$$

denotes a number of different combinations of selecting B numbers from A number.

In an alternative embodiment, N satisfies one of the following characteristics: N is a first agreed value; and N is less than or equal to N_max, where N_max is a second agreed value (which may a value agreed by the first communication node and the second communication node).

In an alternative embodiment, the method further includes feeding back a maximum number of simultaneously generatable different receiving resources corresponding to different first-type resource groups to the first communication node. In the embodiment, the different receiving resources may be generated by the second communication node which may perform the steps of determining the M resources and feeding back the indication information for indicating the M resources and the first-type grouping indication information for indicating that the M resources are divided into the N first-type resource groups to the first communication node.

In an alternative embodiment, the resources in the candidate resource set are used for at least one of: receiving and/or transmitting the synchronization signal; receiving and/or transmitting the data signal; receiving and/or transmitting the control signal; and receiving and/or transmitting the pilot signal.

In an alternative embodiment, different first-type resource groups include a same number of resources or different numbers of resources.

In an alternative embodiment, the method includes one of the characteristics described below. The resources in the same first-type resource group are not allowed to be space division multiplexed and the resources in different first-type resource groups are allowed to be space division multiplexed. The resources in the same first-type resource group are allowed to be space division multiplexed and the resources in different first-type resource groups are not allowed to be space division multiplexed.

In an alternative embodiment, the method includes one of the characteristics described below. A maximum number of space division multiplexing layers available to the resources in the same first-type resource group is less than or equal to a maximum number of space division multiplexing layers available to the resources in different first-type resource groups. The maximum number of space division multiplexing layers available to the resources in the same first-type resource group is greater than or equal to the maximum number of space division multiplexing layers available to the resources in different first-type resource groups. The maximum number of space division multiplexing layers available to the resources in the same first-type resource group is less than the maximum number of space division multiplexing layers available to the resources in different first-type resource groups. The maximum number of space division multiplexing layers available to the resources in the same first-type resource group is greater than the maximum number of space division multiplexing layers available to the resources in different first-type resource groups.

In an alternative embodiment, the method includes agreeing with the first communication node on one of the characteristics described below. The resources in the same first-type resource group support simultaneous reception. The resources in different first-type resource groups do not support simultaneous reception. The resources in the same first-type resource group support simultaneous reception and the resources in different first-type resource groups do not support simultaneous reception. The resources in the same first-type resource group support simultaneous reception and the resources in different first-type resource groups support simultaneous reception. That is, the resources in different first-type resource groups may not be simultaneously receivable by the terminal.

In an alternative embodiment, the method includes agreeing with the first communication node on one of the characteristics described below. The resources in different first-type resource groups support simultaneous reception. The resources in the same first-type resource group support simultaneous reception. The resources in different first-type resource groups may not be simultaneously receivable by the terminal, and the resources in the same first-type resource group do not support simultaneous reception. The resources in different first-type resource groups support simultaneous reception and the resources in the same first-type resource group support simultaneous reception. That is, the resources in the same first-type resource group may not be simultaneously receivable by the terminal.

In an alternative embodiment, the method includes at least one of the following: the N first-type resource groups are associated with a channel measurement related process; and the N first-type resource groups are associated with a channel measurement related set.

In an alternative embodiment, the channel measurement related process is a channel state information (CSI) process; and the channel measurement related set includes at least one of a CSI reporting set (CSI reporting settings), a resource set (Resource settings), a CSI measurement set (CSI measurement settings), a link set (link settings), and a reference signal (RS) set (RS settings), where the CSI measurement set includes one or more links, each of which is used for establishing a relationship between the resource set and the CSI reporting set.

Figure 3:
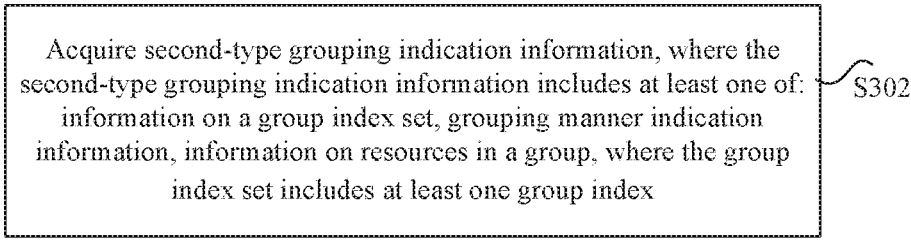
FIG. 3 is a flowchart of a method for acquiring grouping indication information according to an embodiment of the present invention.

A method for acquiring grouping indication information is further provided in the embodiment. FIG. 3 is a flowchart of a method for acquiring grouping indication information according to an embodiment of the present invention. As shown in FIG. 3, the method includes the steps described below.

In step S302, second-type grouping indication information is acquired. The second-type grouping indication information includes at least one of: information on a group index set, grouping manner indication information, information on resources in a group, where the group index set includes at least one group index.

The above operation may be performed by a second communication node.

In the above steps, the second communication node may acquire the second-type grouping indication information (which may be transmitted by a first communication node).

In an alternative embodiment, the method further includes determining a transmission parameter and/or a reception parameter of a signal corresponding to the second-type grouping indication information according to the second-type grouping indication information.

In an alternative embodiment, the signal includes at least one of a control channel signal, a data channel signal and a reference signal.

In an alternative embodiment, the step in which the second-type grouping indication information is acquired includes at least one of the steps described below. The second-type grouping indication information is acquired according to a rule agreed with the first communication node. Semi-static signaling is received and the second-type grouping indication information is acquired from the semi-static signaling. Dynamic signaling is received and the second-type grouping indication information is acquired from the dynamic signaling. A system message is received and the second-type grouping indication information is acquired from the system message. It is to be noted that the above acquisition manners are several preferred manners and the second-type grouping indication information may be acquired in other manners.

In an alternative embodiment, the step of determining the transmission parameter and/or the reception parameter of the signal corresponding to the second-type grouping indication information according to the second-type grouping indication information includes the steps described below. A correspondence pre-agreed with the first communication node is determined. The correspondence is a correspondence between the second-type grouping indication information and the transmission parameter and/or the reception parameter. The transmission parameter and/or the reception parameter are determined according to the correspondence and the second-type grouping indication information.

In an alternative embodiment, the correspondence between the second-type grouping indication information and the transmission parameter and/or the reception parameter is included in first-type grouping indication information fed back to the first communication node. The first-type grouping indication information is fed back by the second communication node to the first communication node. The second communication node may perform the above step of acquiring the second-type grouping indication information.

In an alternative embodiment, the transmission parameter includes at least one of: a modulation and coding scheme (MCS) set corresponding to the signal, a multiplexing manner used by the signal, a length of a cyclic prefix (CP) corresponding to the signal, a number of space division multiplexing layers used by the signal, demodulation reference signal port information used by the signal, quasi-co-located reference signal resource information corresponding to the signal, structural information corresponding to the signal, a channel characteristic reference signal corresponding to the signal and a transmission manner corresponding to the signal; where the structural information includes at least one of: a CP length of a start symbol of a time unit, information indicating whether the start symbol of the time unit includes a synchronization signal, and a CP length of a last symbol of the time unit; and/or the reception parameter includes a receiving resource for receiving the signal. Optionally, the receiving resource includes at least one of: a receiving port, a receiving antenna, a receiving beam, a receiving precoding weight, receiving time, receiving frequency-domain resource, a receiving sector and a receiving sequence.

In an alternative embodiment, a grouping manner indicated by the second-type grouping indication information includes at least one of: grouping according to a receiving resource corresponding to each of resources in a candidate resource set, grouping according to a channel quality corresponding to each of the resources in the candidate resource set, grouping according to a predetermined multiplexing manner, grouping according to a timing advance (TA) parameter, grouping according to a cyclic prefix (CP) length, grouping according to a space division multiplexing manner, grouping according to a quasi-co-location relationship, grouping according to a transmitted measurement reference signal, and grouping according to a channel characteristic. In the embodiment, before a terminal receives the second-type grouping indication information, an uplink measurement reference signal may be sent to a base station to notify the base station of the grouping according to the uplink measurement reference signal.

In an alternative embodiment, the receiving resource includes at least one of: the receiving beam, the receiving antenna, the receiving port, a receiving precoding matrix, the receiving time, the receiving frequency-domain resource, the receiving sector and the receiving sequence.

In an alternative embodiment, the information on the resources in the group includes resource information of the reference signal. The reference signal includes at least one of: a demodulation reference signal and a measurement reference signal.

In an alternative embodiment, resources in a same group have a same channel characteristic and/or quasi-co-location information.

In an alternative embodiment, a correspondence exists between the at least one group index and port information of the measurement reference signal transmitted by the second communication node. The second communication node acquires the second-type grouping information.

Figure 4:
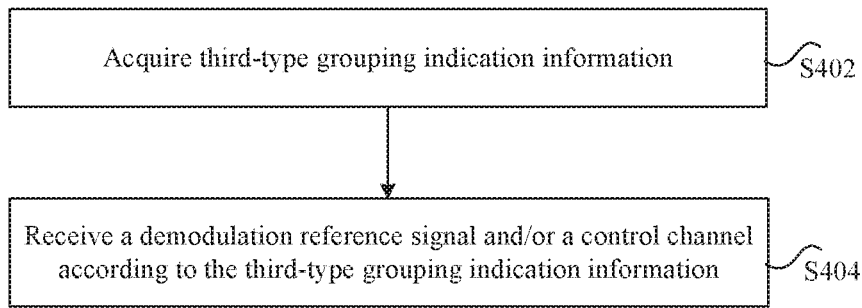
FIG. 4 is a flowchart of a signal receiving method according to an embodiment of the present invention.

A signal receiving method is further provided in the embodiment. FIG. 4 is a flowchart of a signal receiving method according to an embodiment of the present invention. As shown in FIG. 4, the method includes the steps described below.

In step S402, third-type grouping indication information is acquired.

In step S404, a demodulation reference signal and/or a control channel are received according to the third-type grouping indication information.

The above operations may be performed by a second communication node and the third-type grouping indication information may be from a first communication node.

In an alternative embodiment, the third-type grouping indication information includes at least one of: the number of the groups, indication on resources in each group, information on a number of resources in each group, grouping manner indication information and group index information.

In an alternative embodiment, the third-type grouping indication information is acquired in at least one of the manners described below. Feedback information is acquired according to a signal transmitted by the first communication node, where the feedback information includes the third-type grouping indication information. The second communication node may receive the signal transmitted by the first communication node, acquire the feedback information and feed back the feedback information to the first communication node. The third-type grouping indication information is acquired according to a rule agreed with the first communication node. Signaling information is received, where the signaling information includes the third-type grouping indication information. The receiving the signaling information may include receiving the third-type grouping indication information transmitted by semi-static signaling, receiving the third-type grouping indication information transmitted by dynamic signaling, and receiving the third-type grouping indication information transmitted through a system message.

In an alternative embodiment, the step in which the demodulation reference signal and/or the control channel are received according to the third-type grouping indication information includes the step described below. According to the third-type grouping indication information, the demodulation reference signal and/or the control channel are received on time division multiplexed N1 resources, where N1=x×N or N1 is less than or equal to N, where N1 is an integer greater than 0, N is a number of third-type groups included in the third-type grouping indication information and x is an integer greater than or equal to 1.

In an alternative embodiment, the demodulation reference signal and/or the control channel are received on the N1 resources for transmitting the demodulation reference signal by using a receiving resource in a receiving resource set.

In an alternative embodiment, one or more receiving resources are selected from the receiving resource set according to a certain rule, and data and/or a control signal and/or a reference signal subsequent to the demodulation reference signal are received according to the selected one or more receiving resources.

In an alternative embodiment, the method further includes obtaining the receiving resource set in at least one of the manners described below. The receiving resource set includes receiving resources corresponding to all groups indicated by the third-type grouping indication information. The receiving resource set includes receiving resources corresponding to N2 group indexes agreed with the first communication node, where N2 is an integer greater than or equal to 1. The receiving resource set is determined by acquiring signaling indication information.

In an alternative embodiment, the receiving resource includes at least one of: a receiving beam, a receiving antenna, a receiving port, a receiving precoding matrix, receiving time, receiving frequency-domain resource, a receiving sector and a receiving sequence.

In an alternative embodiment, before the demodulation reference signal and/or the control channel are received on the time division multiplexed N1 resources according to the third-type grouping indication information, the method further include acquiring x and/or N1.

In an alternative embodiment, x and/or N1 are acquired in at least one of the manners described below. x and/or N1 are acquired in a manner agreed with the first communication node. x and/or N1 are acquired in a semi-static signaling configuration manner. x and/or N1 are acquired in a dynamic signaling configuration manner.

In an alternative embodiment, the step in which the demodulation reference signal and/or the control channel are received according to the third-type grouping indication information includes the step described below. The demodulation reference signal and/or the control channel are received on an agreed time unit according to the third-type grouping indication information, and the demodulation reference signal and/or the control channel are received on only one time division multiplexed resource on a non-agreed time unit.

Figure 5:
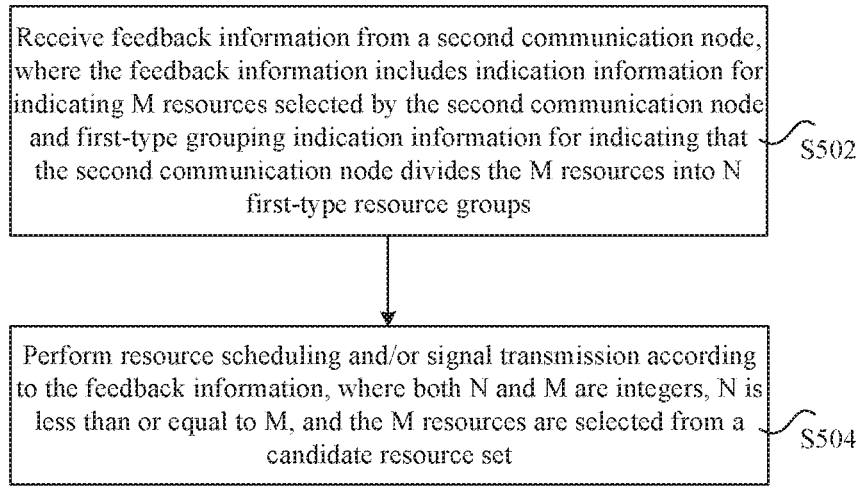
FIG. 5 is a flowchart of a method for receiving feedback information according to an embodiment of the present invention.

A method for receiving feedback information is further provided in the embodiment. FIG. 5 is a flowchart of a method for receiving feedback information according to an embodiment of the present invention. As shown in FIG. 5, the method includes the steps described below.

In step S502, the feedback information is received from a second communication node. The feedback information includes indication information for indicating M resources selected by the second communication node and first-type grouping indication information for indicating that the second communication node divides the M resources into N first-type resource groups.

In step S504, resource scheduling is performed according to the feedback information, and/or signal transmission is performed according to the feedback information. Both N and M are integers, N is less than or equal to M, and the M resources are selected from a candidate resource set.

The above operations may be performed by a first communication node (such as a base station).

In the above steps, the second communication node groups transmission resources and feedback the information to the first communication node, resources in a same group have certain common characteristics, and resources in different groups have different characteristics; limited feedback information is used to provide the first communication node with more information so that the first communication node has improved scheduling flexibility and can reasonably and effectively manage the resources. Therefore, the method may solve the problem in the existing art that the transmission beams and/or receiving beams cannot be reasonably and flexibly managed and scheduled and achieve an effect of flexibly managing and scheduling the transmission beams and/or the receiving beams.

In an alternative embodiment, before the feedback information is received from the second communication node, the method further includes at least one of the steps described below. Signals corresponding to all or part of resources in the candidate resource set are transmitted to the second communication node. Information for determining the first-type grouping indication information is transmitted to the second communication node, where the information includes at least one of: grouping restriction indication information, a parameter for determining a grouping rule, a threshold parameter for determining groups, configuration indication information of the candidate resource set and grouping manner indication information.

A number of resources in a same first-type resource group is less than or equal to a, and a number N of first-type resource groups is less than or equal to b; or the number of resources in the same first-type resource group is a fixed number a, and the number N of first-type resource groups is a fixed number b where both a and b are natural numbers greater than or equal to 1.

In an alternative embodiment, a grouping manner indicated by the first-type grouping indication information includes at least one of: grouping according to a receiving resource corresponding to each resource; grouping according to a channel quality corresponding to each resource; grouping according to a predetermined multiplexing manner; grouping according to a timing advance (TA) parameter; grouping according to a cyclic prefix (CP) length; grouping according to a space division multiplexing manner; and grouping according to a quasi-co-location relationship.

In an alternative embodiment, the grouping according to a predetermined multiplexing manner includes the grouping according to a space division multiplexing manner.

In an alternative embodiment, the receiving resource includes at least one of: a receiving beam, a receiving antenna, a receiving port, a receiving precoding matrix, receiving time, receiving frequency-domain resource, a receiving sector and a receiving sequence.

In an alternative embodiment, the N first-type resource groups have at least one of the characteristics described below. A same first-type resource group corresponds to a same TA. Different first-type resource groups correspond to different TAs. Resources in the same first-type resource group are allowed to be scheduled in a same time unit. All or part of the resources in the same first-type resource group are allowed to be scheduled in the same time unit. The different first-type resource groups are scheduled in different time units and not schedulable in the same time unit. A multiplexing manner set of the resources in the same first-type resource group is a set A, and a multiplexing manner set of resources in the different first-type resource groups is a set B, where the set B is a true subset of the set A or the set A is a true subset of the set B. The resources in the same first-type resource group are not allowed to be space division multiplexed in the same time unit, the resources in the different first-type resource groups are allowed to be space division multiplexed in the same time unit, where a number of space division multiplexing layers is less than or equal to the number of first-type resource groups. A first CP length is adopted when the resources in the same first-type resource group are simultaneously scheduled in the same time unit or switched between different time units. A second CP length is adopted when the resources in the different first-type resource groups are scheduled in the same time unit. When scheduled resources switch between the different first-type resource groups or combination of first-type resource groups, a switching start orthogonal frequency division multiplexing (OFDM) symbol uses a third CP length, and/or a switching start position has a synchronization signal used for a reception timing of the second communication node, and/or a last OFDM symbol before switching uses the third CP length. The same first-type resource group has a same quasi-co-location and all the resources in the same first-type resource group share a quasi-co-located reference signal.

In an alternative embodiment, the resources in the same first-type resource group are allowed to be space division multiplexed in a same time unit, where the number of space division multiplexing layers is less than or equal to a number of resources in the first-type resource group; and the resources in different first-type resource groups are not allowed to be space division multiplexed in the same time unit; and/or CP lengths corresponding to the resources in different first-type resource groups scheduled in the same time unit is obtained according to differences of resource group indexes of the different first-type resource groups where the resources are located.

In an alternative embodiment, the third CP length is greater than the first CP length and the second CP length.

In an alternative embodiment, one of the characteristics described below is included. The resources in the same first-type resource group are not space division multiplexed and the resources in different first-type resource groups are space division multiplexed. The resources in the same first-type resource group are space division multiplexed and the resources in different first-type resource groups are not space division multiplexed.

In an alternative embodiment, one of the characteristics described below is included. A maximum number of space division multiplexing layers available to the resources in the same first-type resource group is less than or equal to a maximum number of space division multiplexing layers available to the resources in different first-type resource groups. The maximum number of space division multiplexing layers available to the resources in the same first-type resource group is greater than or equal to the maximum number of space division multiplexing layers available to the resources in different first-type resource groups. The maximum number of space division multiplexing layers available to the resources in the same first-type resource group is less than the maximum number of space division multiplexing layers available to the resources in different first-type resource groups. The maximum number of space division multiplexing layers available to the resources in the same first-type resource group is greater than the maximum number of space division multiplexing layers available to the resources in different first-type resource groups.

In an alternative embodiment, the method further includes agreeing with the second communication node on one of the characteristics described below. The second communication node is capable of simultaneously receiving the resources in the same first-type resource group. The second communication node is incapable of simultaneously receiving the resources in different first-type resource groups. The second communication node is capable of simultaneously receiving the resources in the same first-type resource group and the second communication node is incapable of simultaneously receiving the resources in different first-type resource groups. The second communication node is capable of simultaneously receiving the resources in the same first-type resource group and the second communication node is capable of simultaneously receiving the resources in different first-type resource groups.

In an alternative embodiment, the method further includes agreeing with the second communication node on one of the characteristics described below. The second communication node is capable of simultaneously receiving the resources in different first-type resource groups. The second communication node is incapable of simultaneously receiving the resources in the same first-type resource group. The second communication node is capable of simultaneously receiving the resources in different first-type resource groups and the second communication node is incapable of simultaneously receiving the resources in the same first-type resource group. The second communication node is capable of simultaneously receiving the resources in different first-type resource groups and the second communication node is capable of simultaneously receiving the resources in the same first-type resource group.

In an alternative embodiment, the method includes at least one of the following: the N first-type resource groups are associated with a channel measurement related process; and the N first-type resource groups are associated with a channel measurement related set.

In an alternative embodiment, the channel measurement related process is a channel state information (CSI) process; and the channel measurement related set includes at least one of a CSI reporting set (CSI reporting settings), a resource set (Resource settings), a CSI measurement set (CSI measurement settings), a link set (link settings), and a reference signal (RS) set (RS settings), where the CSI measurement set includes one or more links, each of which is used for establishing a relationship between the resource set and the CSI reporting set.

Figure 6:
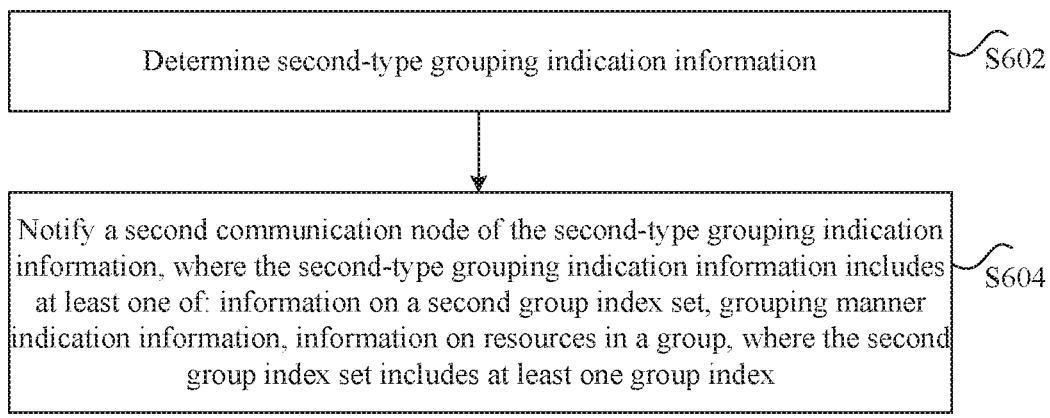
FIG. 6 is a flowchart of a method for notifying grouping indication information according to an embodiment of the present invention.

A method for notifying grouping indication information is further provided in the embodiment. FIG. 6 is a flowchart of a method for notifying grouping indication information according to an embodiment of the present invention. As shown in FIG. 6, the method includes the steps described below.

In step S602, second-type grouping indication information is determined.

In step S604, a second communication node is notified of the second-type grouping indication information. The second-type grouping indication information includes at least one of: information on a group index set, grouping manner indication information, information on resources in a group, where the group index set includes at least one group index.

The above operations may be performed by a first communication node.

In an alternative embodiment, the step in which the second communication node is notified of the second-type grouping indication information includes at least one of the steps described below. The second-type grouping indication information is agreed with the second communication node. The second-type grouping indication information is transmitted to the second communication node by semi-static signaling. The second-type grouping indication information is transmitted to the second communication node by dynamic signaling. The second-type grouping indication information is transmitted to the second communication node through a system message.

In an alternative embodiment, the second-type grouping indication information is used by the second communication node to determine a transmission parameter and/or a reception parameter of a signal corresponding to the second-type grouping indication information.

In an alternative embodiment, the transmission parameter includes at least one of: an MCS set corresponding to the signal, a multiplexing manner used by the signal, a length of a cyclic prefix (CP) corresponding to the signal, a number of space division multiplexing layers used by the signal, demodulation reference signal port information used by the signal, quasi-co-located reference signal resource information corresponding to the signal, structural information corresponding to the signal, a channel characteristic reference signal corresponding to the signal and a transmission manner corresponding to the signal. The structural information includes at least one of: a CP length of a start symbol of a time unit, information indicating whether the start symbol of the time unit includes a synchronization signal, and a CP length of a last symbol of the time unit. The reception parameter includes a receiving resource for receiving the signal. Optionally, the receiving resource includes at least one of: a receiving port, a receiving antenna, a receiving beam, a receiving precoding weight, receiving time, receiving frequency-domain resource, a receiving sector and a receiving sequence.

In an alternative embodiment, the signal includes at least one of a data channel signal, a control channel signal and a reference signal.

In an alternative embodiment, before the second-type grouping indication information is transmitted to the second communication node, the method further includes determining a correspondence between the second-type grouping indication information and a parameter, where the parameter includes the transmission parameter and/or the reception parameter.

In an alternative embodiment, the step of determining the correspondence between the second-type grouping indication information and the transmission parameter and/or the reception parameter includes at least one of the steps described below. The correspondence between the second-type grouping indication information and the parameter is determined in an agreed manner with the second communication node. The correspondence between the second-type grouping indication information and the parameter is determined by receiving first-type grouping indication information fed back by the second communication node. The correspondence is transmitted to the second communication node.

In an alternative embodiment, the step in which the correspondence between the second-type grouping indication information and the parameter is determined in the agreed manner with the second communication node includes obtaining the correspondence between the second-type grouping indication information and the parameter according to a measurement reference signal transmitted by the second communication node.

In an alternative embodiment, the first-type grouping indication information includes at least one of: information on the number of the groups, indication on resources in each group, information on a number of resources in each group, grouping manner indication information, group index information and information on a common parameter corresponding to each group.

In an alternative embodiment, the common parameter corresponding to each group includes at least one of the following parameters: a CP length corresponding to each group, a precoding matrix indicator (PMI) corresponding to each group, a rank indicator (RI) corresponding to each group, a channel quality indication (CQI) corresponding to each group, a timing advance (TA) parameter corresponding to each group, a quasi-co-location parameter corresponding to each group, and a receiving resource corresponding to each group.

In an alternative embodiment, a grouping manner indicated by the second-type grouping indication information includes at least one of: grouping according to a receiving resource corresponding to a transmission resource, grouping according to a channel quality corresponding to the transmission resource, grouping according to a predetermined multiplexing manner, grouping according to the timing advance (TA) parameter, grouping according to a cyclic prefix (CP) length, grouping according to a space division multiplexing manner, grouping according to a quasi-co-location relationship, grouping according to a measurement reference signal transmitted by the second communication node, and grouping according to a channel characteristic. The transmission resource includes at least one of: a transmission beam resource, a transmission antenna resource, a transmission port resource, a transmission frequency domain resource, a transmission sequence resource and a transmission time domain resource.

In an alternative embodiment, the receiving resource includes at least one of: a receiving beam, a receiving antenna, a receiving port, a receiving precoding matrix, receiving time, receiving frequency-domain resource, a receiving sector and a receiving sequence.

In an alternative embodiment, the information on the resources in the group includes resource information of the reference signal. The reference signal includes at least one of: a demodulation reference signal and a measurement reference signal.

In an alternative embodiment, resources in a same group have a same channel characteristic and/or quasi-co-location information.

In an alternative embodiment, a correspondence exists between the at least one group index and port information of the measurement reference signal transmitted by the second communication node.

Figure 7:
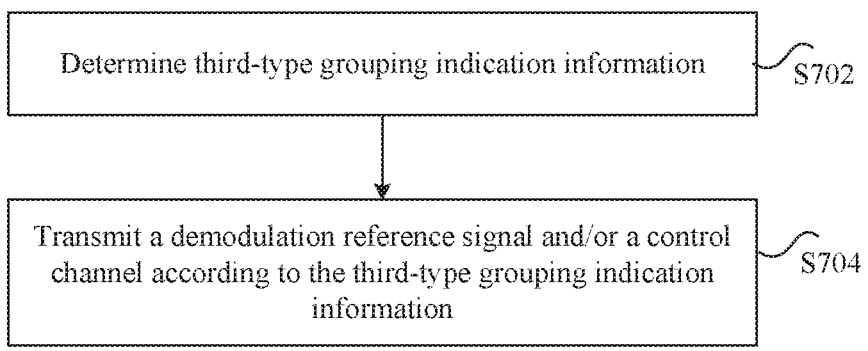
FIG. 7 is a flowchart of a signaling transmission method according to an embodiment of the present invention.

A signal transmission method is further provided in the embodiment. FIG. 7 is a flowchart of a signal transmission method according to an embodiment of the present invention. As shown in FIG. 7, the method includes the steps described below.

In step S702, third-type grouping indication information is determined.

In step S704, a demodulation reference signal and/or a control channel are transmitted according to the third-type grouping indication information.

The above operations may be performed by a first communication node. The demodulation reference signal and/or the control channel may be transmitted to the second communication node.

In the above steps, the first communication node may notify the second communication node of grouping indication information so that the second communication node receives the demodulation reference signal and/or the control channel according to the third-type grouping indication information.

In an alternative embodiment, the third-type grouping indication information includes at least one of: information on the number of the groups, indication on resources in each group, information on a number of resources in each group, grouping manner indication information and group index information.

In an alternative embodiment, the step in which the third-type grouping indication information is determined includes at least one of the steps described below. The third-type grouping indication information is determined according to first-type grouping indication information received from the second communication node. The third-type grouping indication information is determined according to a rule agreed with the second communication node.

In an alternative embodiment, the step in which the demodulation reference signal and/or the control channel are transmitted according to the third-type grouping indication information includes the step described below. According to the third-type grouping indication information, the demodulation reference signal and/or the control channel are transmitted on time division multiplexed N1 resources, where N1=x×N or N1 is less than or equal to N, where N1 is an integer greater than 0, N is a number of groups included in the third-type grouping indication information and x is an integer greater than or equal to 1.

In an alternative embodiment, before the demodulation reference signal and/or the control channel are transmitted according to the third-type grouping indication information, the method further include configuring x and/or N1 for the second communication node.

In an alternative embodiment, a step of notifying the second communication node of x and/or N1 includes at least one of notifying the second communication node of x and/or N1 in an agreed manner with the second communication node; notifying the second communication node of x and/or N1 by semi-static signaling; and notifying the second communication node of x and/or N1 by dynamic signaling.

In an alternative embodiment, the demodulation reference signal is transmitted on the N1 resources in a same transmission manner, where a transmission manner of the demodulation reference signal includes at least one of: a transmission beam, a transmission port, a transmission antenna, a transmission precoding matrix and a transmission frequency domain resource.

In an alternative embodiment, the demodulation reference signal and/or the control channel transmitted on the N1 resources have a same transmission manner as data and/or a control signal and/or a reference signal transmitted subsequent to the demodulation reference signal and/or the control channel. The transmission manner of the demodulation reference signal includes at least one of: the transmission beam, the transmission port, the transmission antenna, the transmission precoding matrix and the transmission frequency domain resource.

In an alternative embodiment, the step in which the demodulation reference signal and/or the control channel are transmitted according to the third-type grouping indication information includes the step described below. The demodulation reference signal and/or the control channel are transmitted on an agreed time unit according to the third-type grouping indication information, and the demodulation reference signal and/or the control channel are transmitted on only one time division multiplexed resource on a non-agreed time unit.

It is to be noted that characteristics in the various embodiment described above may be used as cross-references of each other.

The present invention will be described below in conjunction with specific embodiments.

Figure 8:
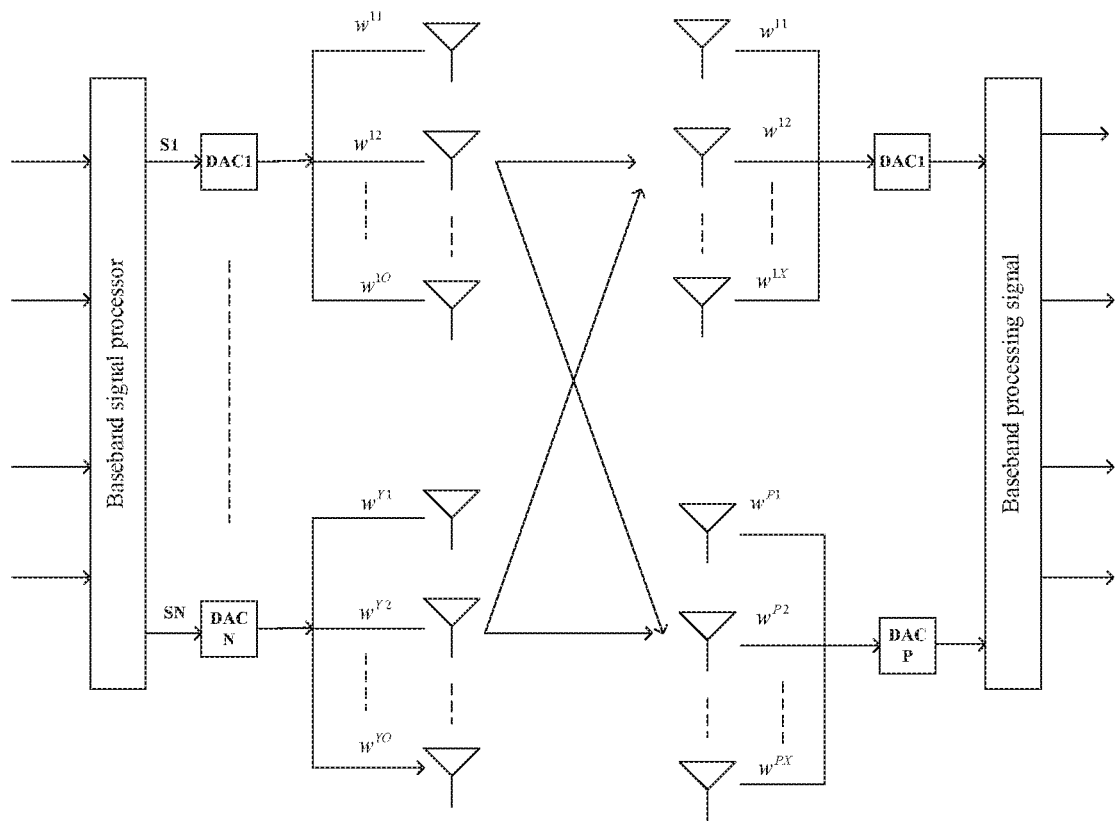
FIG. 8 is a diagram illustrating a hybrid beamforming example according to an embodiment of the present invention.

FIG. 8 is a diagram of a hybrid beamforming communication model according to an embodiment of the present invention. As shown in FIG. 8, a transmitting end has Y RF links, and each RF link is connected to 0 antenna elements. In an n-th RF link, RF beamforming is performed on a digital baseband signal, that is, the signal is multiplied by $W_n=[w_{n1} \ w_{n2} \ \ldots \ w_{nO}]^T$ and then transmitted by the O antenna elements connected to the n-th RF link. In the embodiment, assuming that the signals from the transmitting end to the RF links via the digital baseband signal processor are time domain signals, that is, sequences S1, S2, . . . , and SY in FIG. 8 are all time domain signals, the RF beamforming is performed on each time domain signal, which is equivalent to RF beamforming on a full bandwidth signal, that is, one RF link can only generate one RF beam on one OFDM symbol.

In FIG. 8, the Y RF links correspond to different antenna elements, that is, the antenna elements are multiplexed in a grouping manner. In another embodiment, the antenna elements may be shared by multiple RF links.

Similarly, a receiving end has P RF links, and each RF link corresponds to X antenna elements. The signals are received by the antenna elements, each antenna element signal is multiplied by a weight, and the weighted values are summed on the RF links to form baseband signals corresponding to the RF links. The baseband signals are outputted to a baseband processing unit for processing.

In FIG. 8, each RF link of the transmitting end corresponds to a same number of antenna elements. A case where different RF links correspond to different numbers of antenna elements is not excluded in the embodiments of the present invention. Similarly, a case where different RF links of the receiving end correspond to different numbers of antenna elements is not excluded in the embodiments of the present invention.

In the embodiments of the present invention, one antenna may correspond to only one RF link, or one antenna may correspond to multiple RF links.

Specific Embodiment 1

In the embodiment, a receiving end may determine resource selection information through the steps described below and feed back the resource selection information to a transmitting end.

In step 1, the receiving end determines configuration information of a candidate resource set. The candidate resource set includes Q second-type resource groups, where Q is an integer greater than or equal to 1.

In step 2, the receiving end receives a signal transmitted on the Q second-type resource groups.

In step 3, the receiving end selects M resources from the candidate resource set, where M is integer greater than or equal to 1. When M>1, the receiving end divides the M resources into N first-type resource groups, where N≤M.

In step 4, the receiving end feeds back indication information of the selected M resources and grouping indication information of the first-type resource groups to the transmitting end.

In step 1, the second-type resource groups may be divided according to at least one of the following resource types: a beam resource, an antenna resource, a port resource, a frequency domain resource, a transmission sequence resource and a time domain resource. One second-type resource group includes one or more resources.

Figure 9:
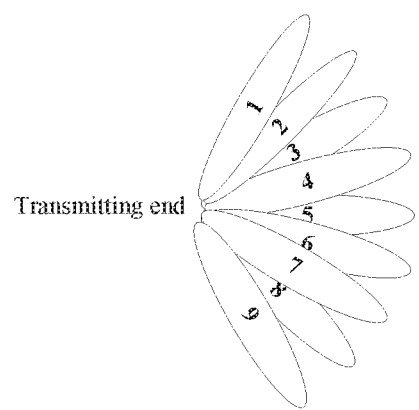
FIG. 9 is a diagram illustrating an example 1 of a second-type resource group according to an embodiment of the present invention.

In an alternative embodiment, for the division of the second-type resource groups, a first implementation mode is that different beams are different groups. As shown in FIG. 9, the transmitting end has a total of 9 transmission beams, so Q=9. The different beams may be different RF beams or different hybrid beams. The hybrid beam is composed of an RF beam and a baseband beam. That is, when the transmitting end has multiple antennas and each antenna corresponds to one RF beam, the hybrid beam is formed by pre-coding on a baseband side.

Figure 10:
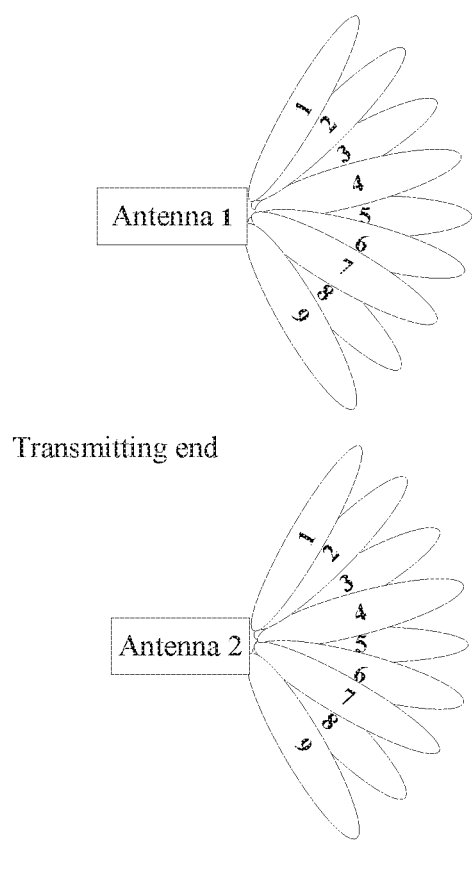
FIG. 10 is a diagram illustrating an example 2 of a second-type resource group according to an embodiment of the present invention.

In an alternative embodiment, for the division of the second-type resource groups, a second implementation mode is that different antennas are different groups. As shown in FIG. 10, the transmitting end has two transmission antennas and each transmission antenna corresponds to 9 RF beams, at this time, Q=2 and each second-type resource group includes 9 resources. In the present embodiment, different antennas correspond to a same number of RF beams. Of course, a case where different antennas correspond to different numbers of RF beams is not excluded in the embodiment. Strictly speaking, if one antenna corresponds to multiple RF links in FIG. 8, different beams corresponding to the one antenna should also be the hybrid beam.

In an alternative embodiment, for the division of the second-type resource groups, a third implementation mode is that different ports are different second-type resource groups. For example, if there are Q ports, there are Q second-type resource groups.

Figure 13:
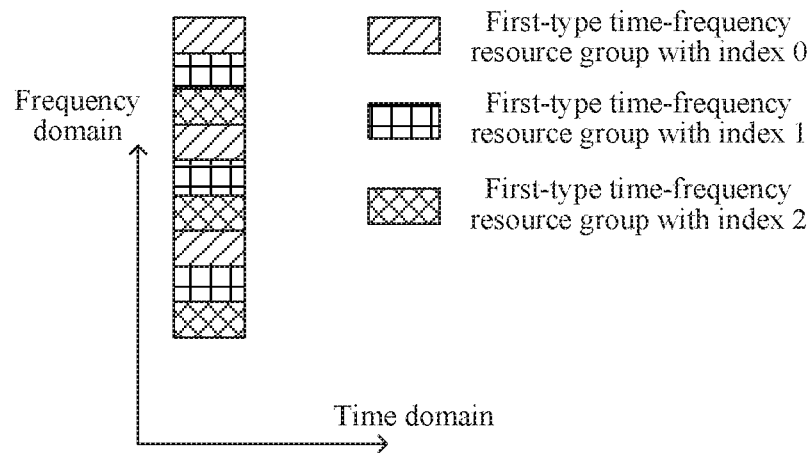
FIG. 13 is a diagram illustrating an example 5 of a second-type resource group according to an embodiment of the present invention.

In an alternative embodiment, for the division of the second-type resource groups, a fourth implementation mode is that different time domain resources are different second-type resource groups. For example, if there are Q time domain resources, there are Q second-type resource groups. One time domain resource may include one or more resources. For example, one time domain resource includes multiple reference signal ports. As shown in FIG. 13, there are a total of Q=3 second-type resource groups, each second-type resource group corresponds to one type of time-frequency resource and may further include multiple resources. For example, the multiple resources are included in a code division/frequency division manner. The time-frequency resources occupied by different time-frequency resource groups in FIG. 13 are merely examples, and other cases are not excluded. Moreover, the 3 second-type resource groups in FIG. 13 are also only examples, and other group numbers are not excluded.

Figure 11:
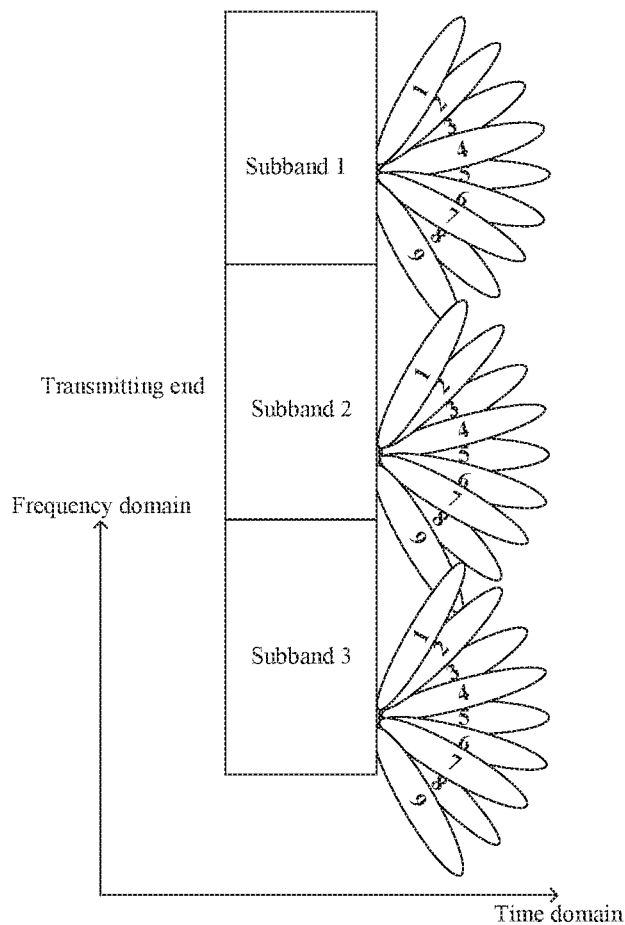
FIG. 11 is a diagram illustrating an example 3 of a second-type resource group according to an embodiment of the present invention.

Specifically, for the division of the second-type resource groups, a fifth implementation mode is that different frequency domain resources are different second-type resource groups. As shown in FIG. 11, different subbands correspond to different second-type resource groups. There are 3 subbands in FIG. 11, so Q=3. The subband is a continuous frequency domain resource, similar to a definition of the subband in the existing LTE or a definition of a measurement subband in the existing LTE. Each subband resource group in FIG. 11 includes 9 transmission beams. In this implementation mode, different subbands correspond to a same number of beams. Of course, in another implementation mode of the embodiment, a case where each subband includes different numbers of beams is not excluded. In this example, different beams corresponding to the same subband may be transmitted in a time division manner. As shown in FIG. 11, each subband needs 9 time-division multiplexed resources. For example, the transmitting end has one transmission antenna and only one beam can be transmitted in each time unit, so the one beam may correspond to each subband, that is, one RF link beam in the time domain may correspond to the three subbands. Therefore, 9 transmission beam measurement signals in the three subbands may be transmitted on only 9 time-division multiplexed resources. The 9 transmission beams may also be sent in a time division and code division/frequency division manner. In this case, $$\left\lceil \frac{9}{L} \right\rceil$$

time-division multiplexed resources are required to send 9 beam measurement resources, where L represents a number of resources which can be transmitted in one time division multiplexed resource. For example, L is the number of transmission antennas. At this time, L beams are sent within one subband on one time-division multiplexed resource by a combination of any two or three of time division, code division and frequency division manners. In short, L RF beams may only be sent on L RF links and each RF beam may correspond to a full bandwidth.

Figure 12:
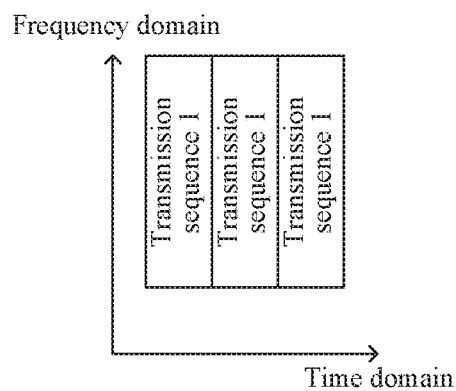
FIG. 12 is a diagram illustrating an example 4 of a second-type resource group according to an embodiment of the present invention.

Specifically, for the division of the second-type resource groups, a sixth implementation mode is that different transmission sequences correspond to different second-type resource groups. For example, there are 5 transmission sequences, so Q=5. A same transmission sequence may be sent on different time-frequency resources. When the same transmission sequence is sent on the different time-frequency resources, it may be considered that the second-type resource group includes one resource or may also include multiple resources. As shown in FIG. 12, a same transmission sequence 1 is transmitted on three time-division multiplexed resources. In this case, one opinion is that the first-type resource group corresponding to the transmission sequence 1 includes one resource and the receiving end obtains performance of the one resource based on integrated receiving performance of the transmission sequence transmitted on the three time-division multiplexed resources. The other opinion is that the first-type resource group corresponding to the transmission sequence 1 includes three resources and the receiving end may select a resource from the three resources. In FIG. 12, the three time-division multiplexed resources corresponding to the same transmission sequence are continuous in the time domain. A case where the three time-division multiplexed resources are discontinuous in the time domain is not excluded in the embodiment.

Specifically, for the division of the second-type resource groups, a seventh implementation mode is that different QCL information corresponds to different second-type resource groups. Resources in a same second-type resource group are quasi co-located. Two resources with the same quasi co-location information are similar to quasi co-located resources in the existing LTE, that is, large-scale information related to a channel or signal of one resource may be derived from large-scale information related to a channel or signal of the other resource.

The QCL information may also be channel characteristic information or other equivalent nouns. The channel characteristic information includes at least one of the following information of a reference signal: Doppler spread, Doppler shift, an average gain, an average delay, average angle spread, an azimuth angle of arrival (AOA), a zenith angle of arrival (ZOA), a azimuth angle of departure (AOD) and a zenith angle of departure (ZOD). The above six second-type resource grouping manners are only examples, other second-type resource grouping manners are not excluded. In short, there are Q second-type resource groups, each of which includes one or more resources. Furthermore, the Q second-type resource groups correspond to Q reference signal resources (such as CSI-RS resources and may be other names), and each reference signal resource includes one or more ports (similar to CSI-RS ports), corresponding to one or more resources in each second-type resource group.

In step 3, the receiving end selects M resources from the Q second-type resource groups. Furthermore, the selected M resources are from all resources in the Q second-type resource groups. For example, each second-type resource group includes M1 resources and the selected M resources are from Q×M1 resources. The receiving end may select the M resources from the Q second-type resource groups based on a certain rule. For example, the M resources are selected from the candidate resource set based on a channel quality and/or a signal quality corresponding to the resources, where the signal is a receiving signal on each resource and a channel is obtained by dividing the receiving signal on each resource by a reference signal transmitted on each resource.

In step 3, when M>1, the M resources are divided into the N first-type resource groups, and resources in the first-type resource groups satisfy one or more of the following characteristics: resources in a same first-type resource group belong to one or more second-type resource groups. For example, the resources in the same first-type resource group are from more than one of the Q second-type resource groups. Resources in a same second-type resource group belong to one or more first-type resource groups. For example, resources in one second-type resource group exist in more than one first-type resource groups.

In the above implementation modes, the above resources are used for at least one of: receiving/transmitting a synchronization signal, receiving/transmitting a data signal, receiving/transmitting a control signal and receiving/transmitting a pilot signal. The receiving/transmitting refers to that the resources are used for transmitting the signals and/or receiving the signals. For example, the resources are used for receiving/transmitting the pilot signal, so the resources may be beam training signals. The beam training signals may be used for training the transmitting end to transmit a transmission beam of the transmitting end corresponding to a communication link of the receiving end, may also be used for training the transmitting end to transmit a receiving beam of the receiving end corresponding to the communication link of the receiving end. Of course, the beam training signals may also be a transmission manner signal and/or a receiving manner signal. The transmission manner is one or more of a transmission beam, a transmission port, a transmission precoding matrix, a transmission time domain resource, a transmission frequency domain resource and a transmission sequence resource used by a communication node to transmit signals. The receiving manner is one or more of a receiving beam, a receiving port, a receiving precoding matrix, a receiving time domain resource, a receiving frequency domain resource, a receiving sequence resource and a receiving sector resource used by the communication node to transmit the signals.

In the above implementation modes, preferably, the receiving end determines the candidate resource set according to previously obtained configuration information or determines the candidate resource set according to a rule agreed with the transmitting end and previous beam training results.

Preferably, the receiving end divides the selected M resources according to the configuration information. The configuration information includes grouping restriction indication information. In an alternative embodiment, the grouping restriction indication information may include at least one of: a maximum number of resources in each first-type resource group, a number of feedback bits for each first-type resource group, whether each first-type resource group has the same resource quantity, a total number of feedback bits for all the first-type resource groups, a maximum number of feedback bits for all the first-type resource groups and a maximum number of first-type resource groups. The configuration information may also include a parameter for determining thresholds and/or a parameter for determining a grouping rule. For example, when there are multiple grouping rules, the configuration information indicates which rule is currently used for grouping. The configuration information may be obtained by using signaling information of the transmitting end and/or a rule agreed with the transmitting end.

In the above embodiment, step 2 and step 3 are separate steps. In another embodiment, the execution order of step 2 and step 3 is not limited to a particular order, but is determined by the receiving end according to a comprehensive selection. That is, the receiving end obtains the N first-type resource groups from a set of Q second-type resource groups. The N first-type resource groups include M resources, where M is greater than or equal to 1 and N is less than or equal to M.

Specific Embodiment 2

The steps in the present embodiment are similar to those in the specific embodiment 1. A grouping rule for first-type resource groups in step 3 is specifically described in the embodiment. In the embodiment, the M selected resources are divided into groups according to the receiving resources of the M selected resources. The receiving resources are receiving antennas and/or receiving ports and/or receiving weights (beams) and/or receiving sectors and/or receiving sequences and/or receiving time domain resources and/or receiving frequency domain resources.

Figure 14:
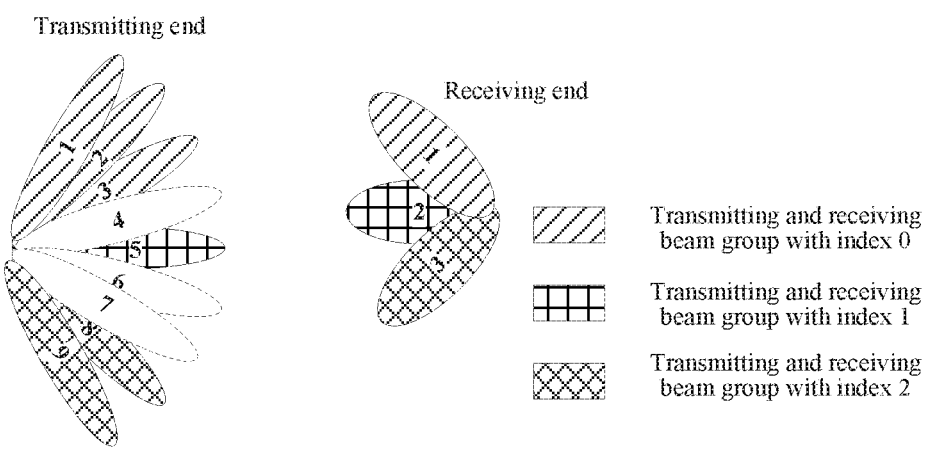
FIG. 14 is a diagram illustrating an example 1 of a grouping manner of first-type resource groups according to an embodiment of the present invention.

The selected resources are grouped according to the receiving resources into N first-type resource groups. In a first implementation mode of the embodiment, as shown in FIG. 14, for Q=9 transmission beams, a receiving end selects six transmission beams {1, 2, 3, 5, 8, 9}, where transmission beams {1, 2, 3} correspond to a same receiving beam 1, transmission beam {5} corresponds to a receiving beam 2, transmission beams {8, 9} correspond to a same receiving beam 3. The receiving end divides the selected six transmission beams into three groups, as shown in Table 1.

TABLE 1

| First-type Resource Group No. | Second-type predetermined resource (transmission beam )in the first-type resource group |
|---|---|
| 0 | 1, 2, 3 |
| 1 | 5 |
| 2 | 8, 9 |

The receiving end needs to feed back the group information to a transmitting end. In a grouping manner in Table 1, each group includes different resources, that is, the intersection set of different first-type resource groups is empty. A case where the intersection set of different groups is not empty is not excluded in this embodiment. In the present embodiment, different groups include different numbers of resources. A case where the transmitting end and the receiving end agree that each group includes a same number of resources is not excluded in the embodiment.

Figure 15A:
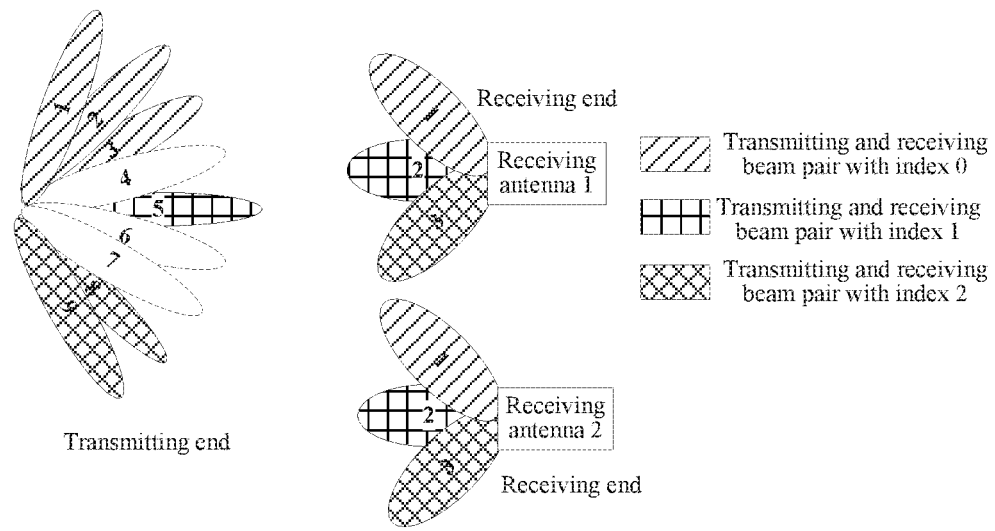
FIG. 15a is a diagram illustrating an example 1 of a grouping manner and receiving resources of first-type resource groups according to an embodiment of the present invention.
Figure 15B:
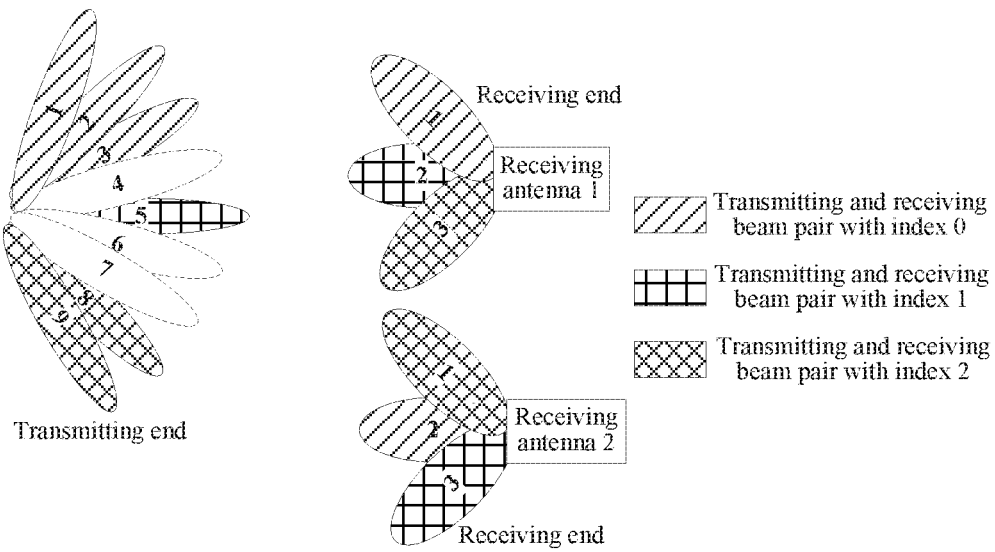
FIG. 15b is a diagram illustrating an example 2 of a grouping manner and receiving resources of first-type resource groups according to an embodiment of the present invention.
Figure 16A:
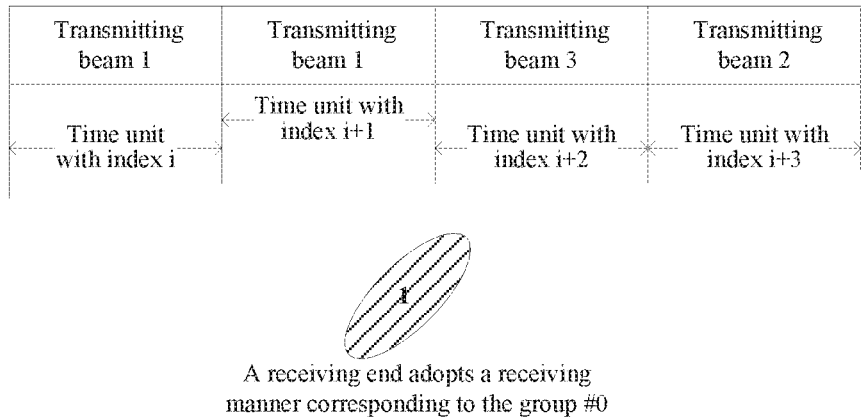
FIG. 16a is a schematic diagram illustrating that transmission beams in a same group are freely switched in a transmission phase after feedback according to an embodiment of the present invention.

In FIG. 14, each group has only one receiving beam. A case where one group corresponds to multiple receiving beams is not excluded in the embodiment. That is, one receiving beam is composed of receiving beams of multiple RF links at the receiving end and each RF link corresponds to one receiving beam. As shown in FIG. 15*a* and FIG. 15*b*, the corresponding receiving beams of all transmission beams in a same group are a combination of receiving beams, (composed of a receiving beam of a receiving antenna 1 and a receiving beam of a receiving antenna 2). In FIG. 15*a*, different receiving antennas correspond to a same beam direction. Specifically, for example, the transmission beams {1, 2, 3} correspond to a receiving combination (a receiving beam 1 of the receiving antenna 1 and a receiving beam 1 of the receiving antenna 2) of the receiving end; the transmission beam {5} corresponds to a receiving combination (a receiving beam 2 of the receiving antenna 1 and a receiving beam 2 of the receiving antenna 2) of the receiving end; and the transmission beams {8, 9} correspond to a receiving combination (a receiving beam 3 of the receiving antenna 1 and a receiving beam 3 of the receiving antenna 2) of the receiving end. In FIG. 15*b*, different receiving antennas may correspond to different receiving beam directions. For example, the transmission beams {1, 2, 3} correspond to a receiving combination (the receiving beam 1 of the receiving antenna 1 and the receiving beam 2 of the receiving antenna 2) of the receiving end. The transmission beam {5} corresponds to a receiving combination of (the receiving beam 2 of the receiving antenna 1 and the receiving beam 3 of the receiving antenna 2) the receiving end. The transmission beams {8, 9} correspond to a receiving combination (the receiving beam 3 of the receiving antenna 1 and the receiving beam 1 of the receiving antenna 2) of the receiving end. In the above implementation mode, the transmitting end may flexibly switch and/or combine the transmission beams in the same group in a subsequent transmission process according to the feedback information of the receiving end, without affecting reception of the receiving end. For example, in FIG. 16*a*, the transmitting end notifies the receiving end to receive a signal in a receiving manner corresponding to a transmission beams group 0. The transmitting end may flexibly select one of the transmission beams {1, 2, 3} for transmission in different time units. Preferably, the transmission beams are RF beams and the transmitting end has only one RF link. As shown in FIG. 16*a*, in time units with index i to index i+3, the receiving end receives the signal in the receiving manner corresponding to the group 0. The transmitting end may freely switch between the transmission beams {1, 2, 3}, which is transparent to the receiving end.

Figure 16B:
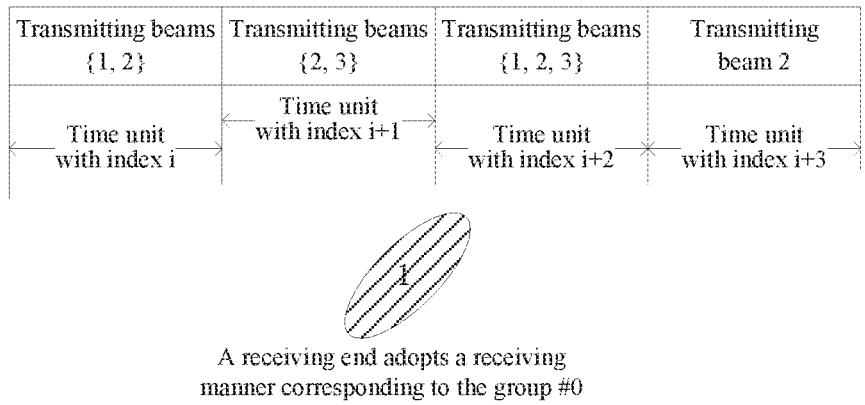
FIG. 16b is a schematic diagram illustrating that combinations of transmission beams in a same group are freely switched in a transmission phase after feedback according to an embodiment of the present invention.

In another implementation mode of the embodiment, the transmitting end has multiple RF links and the above transmission beams {1, 2, 3} are different RF beams or different hybrid beams, the transmitting end notifies the receiving end to receive the signal in the receiving manner corresponding to the group 0. At this time, the transmitting end may transmit signals to the receiving end by using different transmission beam combinations at different time instants. As shown in FIG. 16*b*, if the transmitting end has three RF links, with considering the system performance, in a time unit with index i, three radio frequencies may be sequentially directed to the transmission beams {1, 2, 6} (in this case, a transmission beam 6 is for another receiving end). At this time, transmission beams 1 and 2 may be used to simultaneously transmit the signal to the receiving end, or transmission beams at each instant is a combined weight of the transmission beams {1, 2, 3}. For example, the transmission beams {1, 2, 3} are transmitted by three different RF links, the final transmission beam is a hybrid beam of a weighted combination of the transmission beams {1, 2, 3} according to different baseband weights at different time instants. The different hybrid beams are transparent to the receive end.

Figure 17:
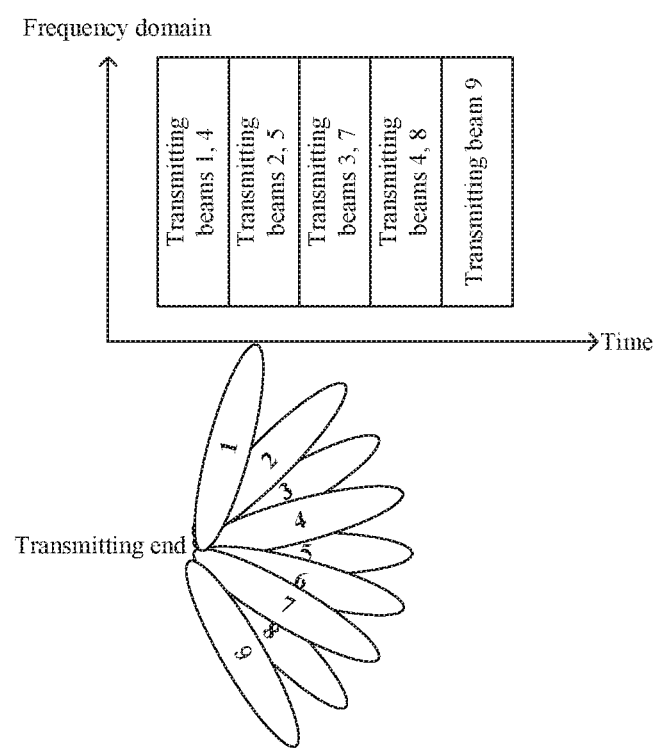
FIG. 17 is a diagram illustrating that transmission manners of different resources in a candidate resource set according to an embodiment of the present invention.

In the above implementation mode, preferably, in the first implementation mode, the Q=9 transmission beams are sent in a time division manner on one RF link and Q time division multiplexed units are required. In the second implementation mode, the Q=9 transmission beams are sent in the time division plus frequency division/code division manner. When the Q transmission beams are RF beams and the transmitting end has 2 RF links, each RF link transmits one transmission beam at each time instant. As shown in FIG. 17, the Q=9 transmission beams may be transmitted at only 5 time instants. Alternatively, two transmission beams in each time division multiplexed unit may be further transmitted in one or more of time division, frequency division and code division manners. If the time division manner is further used in each time division multiplexed unit, the each time division multiplexed unit further includes a smaller time unit. The Q different beams may be from a same transmission node or may be from multiple different transmission nodes, and the different transmission nodes correspond to different base stations or RF transmission devices at different physical positions of the same base station.

In the above implementation mode, the receiving end can only generate a receiving manner corresponding to one group at each time instant and receiving manners of different groups can only be generated in the time division manner. The transmission beams in the same group may be transmitted to the receiving end in one or more of the time division/frequency division/space division manners. However, transmission beams in different groups can only be transmitted to the receiving end in the time division manner and cannot be transmitted to the receiving end in the frequency division or space division manner. That is, a set of multiplexing manners of the transmission beams in different groups is a true subset of a set of multiplexing manners of the transmission beams in the same group. Equivalently, group indexes of the first-type resource groups have a one-to-one correspondence to receiving modes of the receiving end, and different receiving modes of the receiving end can only be generated in the time division manner. The group indexes of the first-type resource groups will be indicated in a subsequent data transmission or measurement phase, and the receiving end receives the signal in a receiving mode corresponding to the group index. At this time, one receiving mode corresponds to one receiving beam set (for example, the receiving beam set is composed of receiving beam sets corresponding to part or all of RF links of the receiving end and each RF link corresponds to one RF beam).

In this case, a terminal only notifies a base station that if the transmission beams in different groups are simultaneously sent, the receiving end has poor receiving performance (specifically, the poor receiving performance indicates that the terminal has poor receiving performance for some of the transmission beams), but a case where the base station simultaneously transmits the transmission beams in different groups to the terminal based on other considerations is not excluded.

In this case, to further reduce implementation complexity, the transmitting end and the receiving end may agree that the receiving end only feeds back one group, that is, an agreed value of N is 1. In the subsequent data transmission phase, the receiving end receives the signal in the receiving manner corresponding to the one group and the transmitting end flexibly changes the transmission beam. The reception of the receiving end and the transmission of the transmitting end may be transparent to each other.

In FIG. 15a and FIG. 15b, receiving resources of different groups only correspond to different combinations of RF receiving beams. A case where the receiving resources of different groups correspond to a same combination of RF beams is not excluded in the embodiment. But the hybrid beams are different. The hybrid beam is composed of a baseband beam and the RF beam. The receiving end may also generate receiving manners corresponding to different groups at the same time instant. Preferably, the grouping indication information includes a first-level group and a second-level group, and the first-level group includes multiple second-level groups. The receiving end can only generate resources in different first-level groups in the time division manner and may generate receiving manners corresponding to the multiple second-level groups in the first-level group at the same time instant.

The selected resources are divided into the N first-type resource groups according to the receiving resources. In a second implementation mode of the embodiment, as shown in FIG. 11, each subband corresponds to 9 transmission beams and accordingly, each subband may correspond to different receiving beams; but the receiving end can generate only one receiving manner at one time instant. Therefore, subbands need to be grouped, subbands in the same subband group correspond to a same receiving manner, and different subband groups correspond to different receiving manners.

Figure 18A:
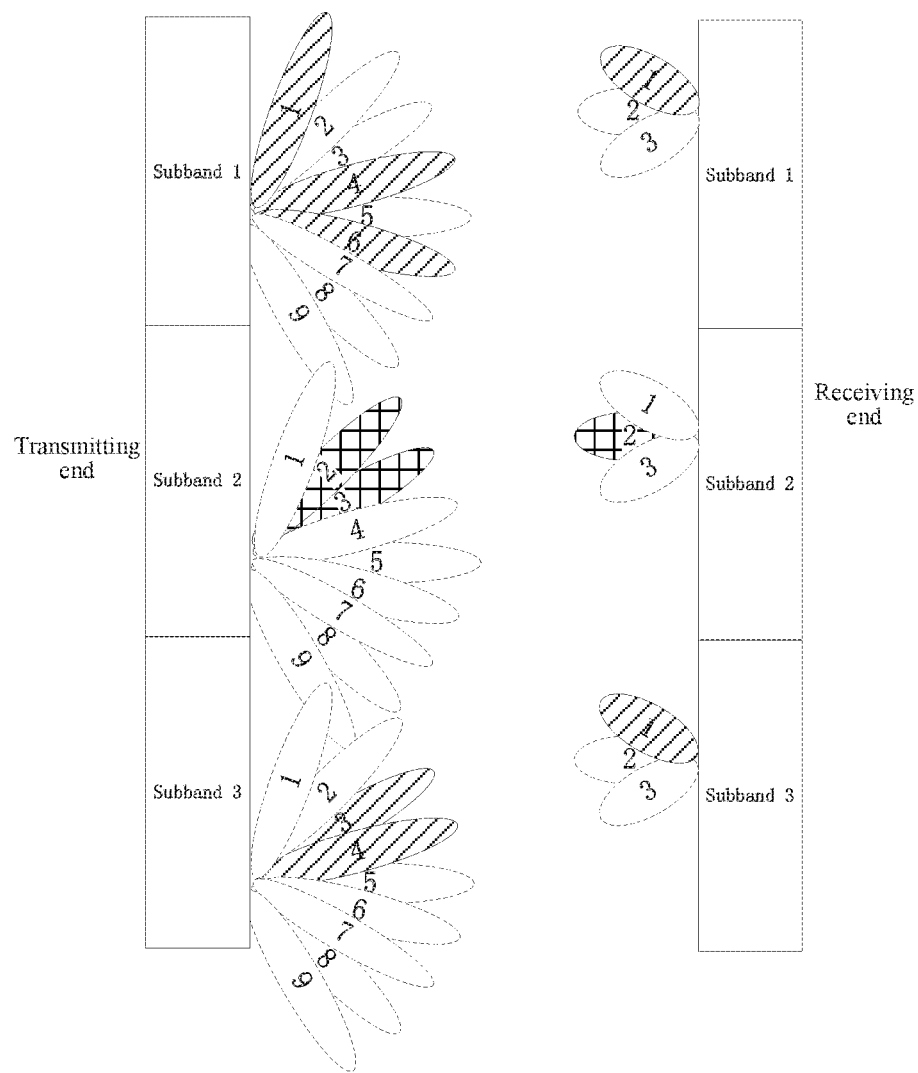
FIG. 18a is a diagram illustrating an example 1 in which subbands with a same receiving manner are divided into a same first-type resource group according to an embodiment of the present invention.

As shown in FIG. 18a, the subbands are divided into two groups according to receiving manners, as shown in table 2.

TABLE 2

| First-type Resource Group No. | Included Second-type Predetermined Resource (Subband No. and Transmission Beam No.) |
|---|---|
| 0 (corresponding to receiving beam 1) | (Subband 1, transmission beam 1), (subband 1, transmission beam 4), (subband 1, transmission beam 6), (subband 3, transmission beam 3), (subband 3, transmission beam 4) |
| 1 (corresponding to receiving beam 2) | (Subband 2, transmission beam 2), (subband 2, transmission beam 3) |

Figure 18B:
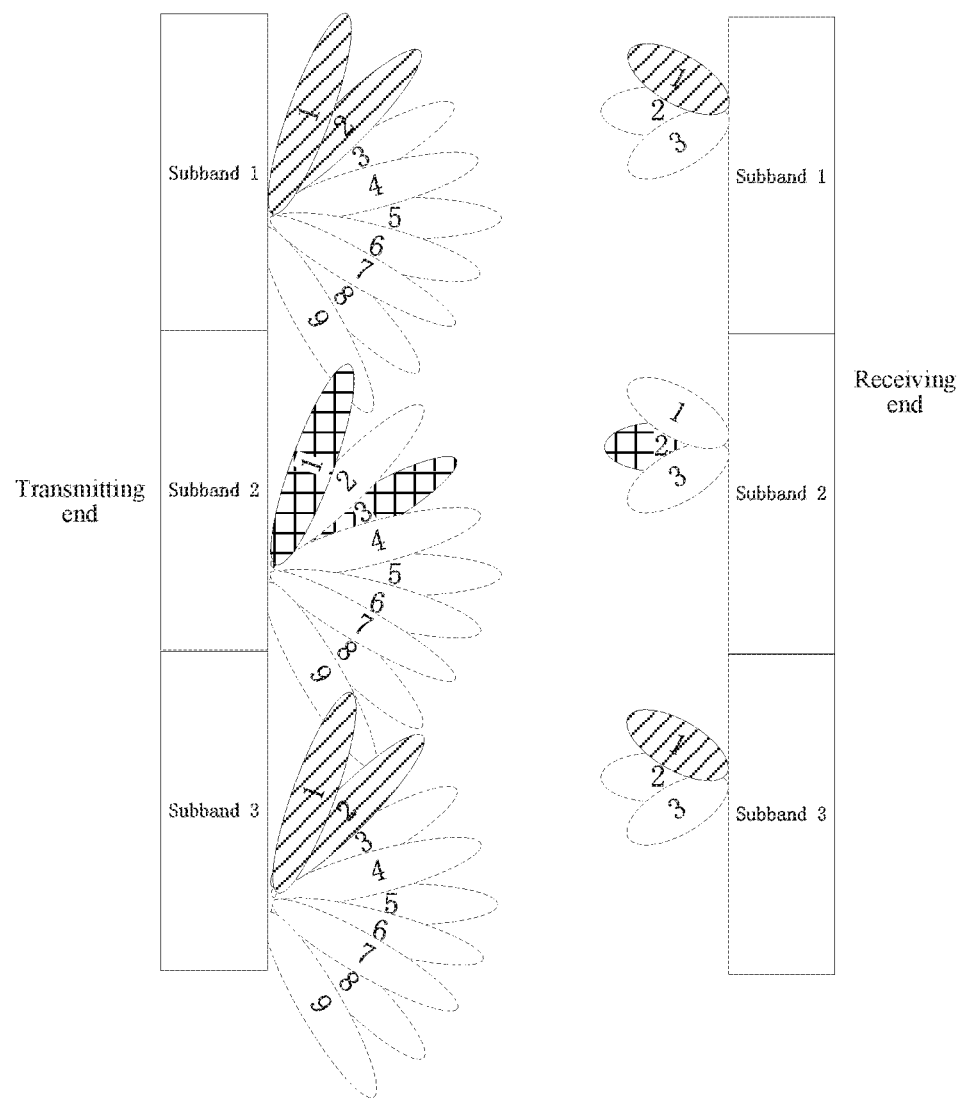
FIG. 18b is a diagram illustrating an example 2 in which subbands with a same receiving manner are divided into a same first-type resource group according to an embodiment of the present invention.

In the subsequent transmission phase, the subbands in the same group in table 2 may be simultaneously scheduled to the receiving end or only part of the subbands may be scheduled to the receiving end, and subbands in different groups may not be simultaneously scheduled to the receiving end. That is because different groups correspond to different receiving manners and the receiving end can generate only one receiving manner at one time instant. For example, receiving beams 1, 2 and 3 in FIG. 18a are RF receiving beams and the receiving end has only one RF link, the receiving end can receive the signal by using only one of the receiving beams 1, 2 and 3 at one time instant. Different subbands in the same group in FIG. 18a may have different transmission beam sets, and even an intersection set of the transmission beam sets of the different subbands may be the empty set. In this case, assuming that the transmitting end may simultaneously generate multiple transmission beams at the same time instant, for example, there are multiple RF links and/or the transmission beams are hybrid beams, the transmission beams {1, 2, ..., 9} in FIG. 18a are all RF beams and the above feedback manner needs at least four RF links at the transmitting end. In the second implementation mode of the embodiment, the transmitting end can simultaneously generate all transmission beam sets corresponding to different subbands in the same group, that is, a number of all different transmission beams corresponding to the same group is less than or equal to a number of transmission antennas, or the number of all the different transmission beams corresponding to the same group is less than or equal to a number of transmission antennas allocated to the receive end. In a third implementation mode of the embodiment, the transmission beams corresponding to the subbands in the same group are the same or have an intersection. As shown in FIG. 18b, the subbands are grouped as shown in table 3. At this time, it is assumed that the transmitting end can simultaneously generate a limited number of beams. For example, the transmitting end can only generate two transmission beams among the beams 1 to 9 in each time unit.

Figure 18C:
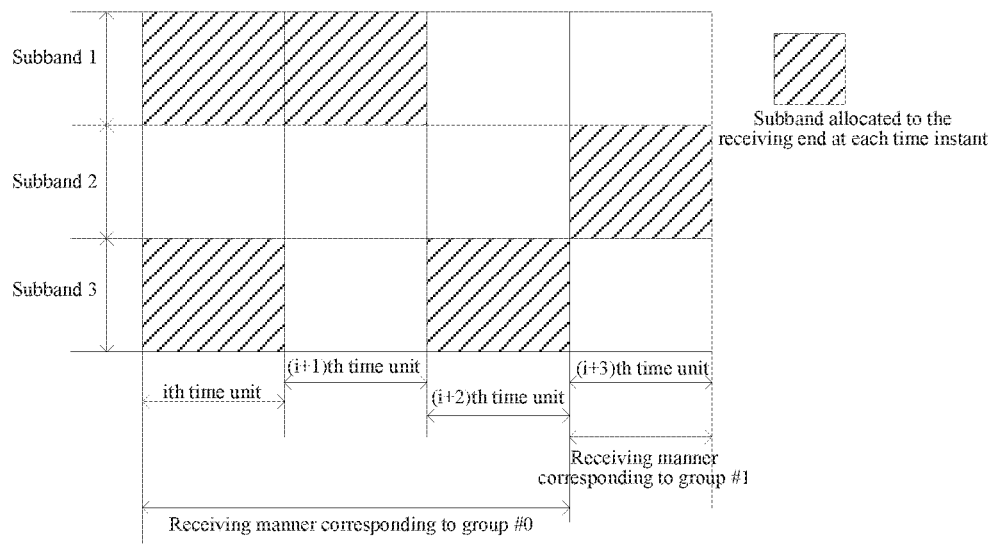
FIG. 18c is a diagram illustrating an example in which subbands in a sane group are freely scheduled and subbands in different groups are not simultaneously schedulable in a transmission phase after feedback according to an embodiment of the present invention.

In the above subband grouping manner, if the transmitting end instructs the receiving end to use the receiving manner corresponding to the group 0 in the subsequent transmission phase, the transmitting end may freely schedule between subbands {1, 3} in different time units. The transmitting end may schedule only one subband or simultaneously schedule two subbands. If a subband 2 is to be scheduled, the transmitting end notifies the receiving end that the receiving end uses the receiving manner corresponding to the group 1 and schedules only the subband 2 in one time unit and cannot simultaneously schedule two different resources in a subband group {1, 3} and a group {2}, as shown in FIG. 18c. In the embodiment, each subband may correspond to multiple transmission beams. Of course, each subband only needs to feed back one transmission beam. In a manner of this example, the transmitting end may also indicate the receiving manner of the receiving end by using a subband scheduling situation. If the scheduled subband in transmission phase notified via signaling is one or two of the subbands {1, 3}, the receiving manner is the receiving beam 1. If the scheduled subband in the transmission phase notified via signaling is the sub-band {2}, the receiving manner is the receiving beam 2. At the same time, a number of bits in a resource allocation field in the signaling in the transmission phase may be determined by a number of subbands in each group. For example, the receiving beam notified via signaling corresponds to the group 0 in table 2 or table 3, the number of bits of the resource allocation field is obtained according to a resource allocation manner corresponding to at most two subbands. For example, the receiving beam notified via signaling corresponds to the group 1 in table 2 or table 3, the number of bits of the resource allocation field in the subsequent signaling information is obtained according to a resource allocation manner corresponding to at most one subband. In this case, the number of bits of a time-frequency resource allocation field is obtained according to the group index. Specifically, the group index may be previously notified, and the number of bits of the time-frequency resource field in dynamic signaling may be obtained according to the group index.

TABLE 3

| First-type Resource Group No. | Included Second-type Resource (Subband No. and Transmission Beam No.) |
|---|---|
| 0 (corresponding to receiving beam 1) | (Subband 1, transmission beam 1), (subband 1, transmission beam 2), (subband 3, transmission beam 1), (subband 3, transmission beam 2) |
| 1 (corresponding to receiving beam 2) | (Subband 2, transmission beam 1), (subband 2, transmission beam 3) |

In the above implementation mode, the receiving end cannot generate different receiving manners corresponding to the different first-type resource groups at the same time instant, that is, the receiving end can only generate the receiving manner corresponding to one first-type resource group at each time instant. The receiving manners of different first-type resource groups may only be generated in the time division manner.

Figure 19:
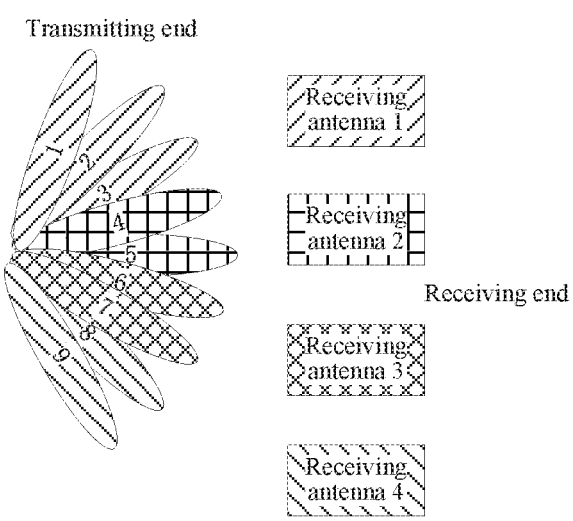
FIG. 19 is a diagram illustrating an example 1 of first-type resource groups according to an embodiment of the present invention.

The selected resources are divided according to the receiving resources into the N first-type resource groups. In a third implementation mode of the embodiment, the receiving end divides the transmission beams according to receiving antennas. The number of first-type resource groups is less than or equal to a number of antennas at the receiving end. As shown in FIG. 19, four antennas at the receiving end have different physical positions and different receiving antennas receive different transmission beams. In this implementation mode, the transmission beams are grouped according to the antennas. Referring to FIG. 19, the transmission beams are divided into different groups as shown in table 4.

TABLE 4

| First-type Resource Group No. | Included Second-type Resource (Transmission Beam No.) |
|---|---|
| 0 (corresponding to receiving beam 1) | 1, 2, 3 |
| 1 (corresponding to receiving beam 2) | 4, 5 |
| 2 (corresponding to receiving beam 3) | 6, 7 |
| 3 (corresponding to receiving beam 4) | 8, 9 |

Each antenna of the receiving end show in FIG. 19 has corresponding transmission beams, that is, for each receiving antenna, there are some transmission beams whose receiving performances exceed a predetermined threshold. A case where for some receiving antennas, all transmission beams have a receiving performance lower than the predetermined threshold is not excluded in the embodiment, that is, the number of first-type resource groups is less than or equal to the number of receiving antennas. In the example in table 4, the intersection set of transmission beam sets corresponding to different receiving antennas is empty, and a case where the intersection set of the transmission beam sets corresponding to different receiving antennas is not empty is not excluded in the embodiment. The transmitting end indicates the group index or combinations of the group indexes in the subsequent transmission phase. For example, the transmitting end instructs the receiving end to use receiving manners corresponding to the groups {0, 1} and the receiving end may use the receiving antennas {1, 2} corresponding to the groups {0, 1} to receives the signal. At this time, the receiving end may generate the receiving manners of all the groups at the same time instant. That is, the transmission beams in different groups may be simultaneously sent to the terminal, but different transmission beams in the same group may not be simultaneously sent to the terminal. For example, different transmission beams in a group corresponding to the receiving antenna corresponds to different RF receiving beams of the receiving antenna, and one receiving antenna generates only receiving beam at one time instant.

The above embodiment describes an example of grouping the receiving antennas of the terminal. A case where the grouping is according to panels (one panel may corresponding to one or more receiving antennas) or a subset of receiving antennas at the receiving end is not excluded in the embodiment. In short, the achieved effect is that the terminal feeds back to the base station that the transmission beams in different groups may be simultaneously transmitted to the terminal and the transmission beams in the same group may not be transmitted to the terminal, or the terminal notifies the base station that the terminal has poor receiving performance for some transmission beams when the transmissions beams in the same group are simultaneously sent to the terminal. Alternatively, the terminal notifies the base station that the terminal cannot simultaneously receive the transmission beams in the same group when they are simultaneously sent to the terminal.

At this time, the transmitting end may agree with the receiving end that in the subsequent transmission, the resources in the same group cannot be transmitted to the receiving end in a space division multiplexing manner and the resources in different groups may be transmitted to the receiving end in the space division multiplexing manner. Preferably, a maximum number of space division multiplexing layers is less than or equal to the number of first-type resource groups.

Figure 20:
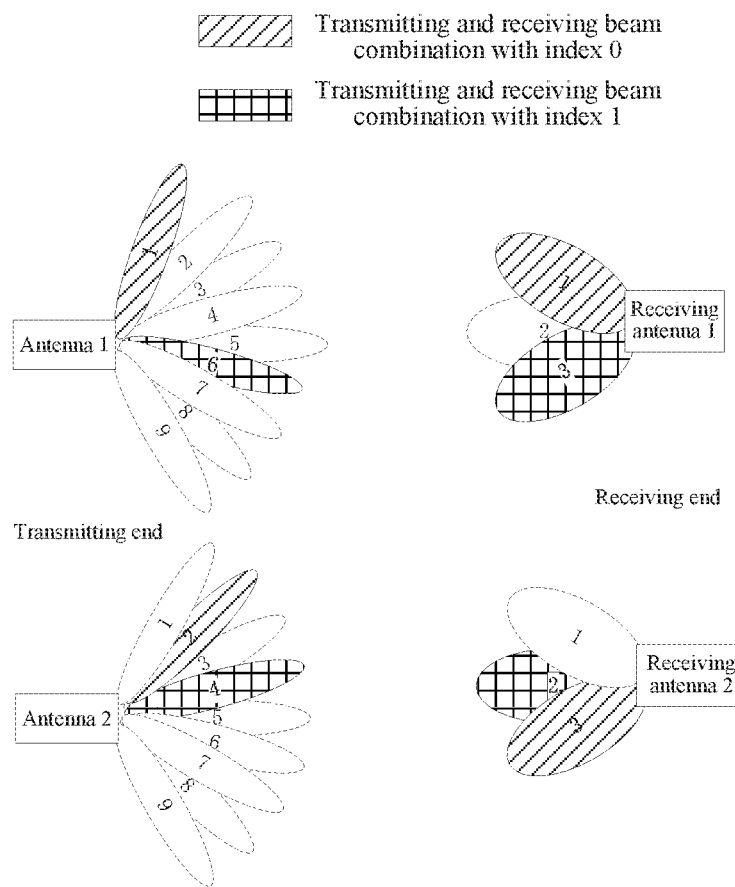
FIG. 20 is a diagram illustrating an example 2 of first-type resource groups according to an embodiment of the present invention.

The selected resources are divided according to the receiving resources into the N first-type resource groups. In a fourth implementation mode of the embodiment, as shown in FIG. 20, the transmission antennas are spaced apart by a relatively large distance and same beam directions from different transmission antennas to a same receiving end have different receiving performance. At this time, the receiving end needs to obtain combinations of transmission beams of each transmission antenna according to an equivalent channel. As shown in FIG. 20, the transmitting end has 2 transmission antennas, the receiving end has 2 receiving antennas, each transmission antenna of the transmitting end corresponds to 9 transmission beams, and each receiving antenna of the receiving end corresponds to 3 receiving beams. If each antenna can only generate one beam at one time instant, 9×3=27 time units are needed to obtain a channel response between each transmission beam of each transmission antenna and each receiving beam of each receiving antenna. When each transmission antenna uses one transmission beam and each receiving antenna uses one receiving beam, 2×2 equivalent channels are obtained.

$$H_{\text{eff}} = \begin{bmatrix} W^R_{1,1*X} & 0 \\ 0 & W^R_{2,1*X} \end{bmatrix} H_{2X*2O} \begin{bmatrix} W^T_{1,O*1} & 0 \\ 0 & W^T_{2,O*1} \end{bmatrix} = W^R H_{2X*2O} W^T \quad (1)$$

Assuming that each antenna corresponds to one RF link, refer to FIG. 8, P=Y=2, $H_{2X*2O}$ corresponds to the channel response between a transmission element and a receiving element, $W^R_{i,1*X}$ is an X-dimensional row vector corresponding to a weight of an X receiving elements corresponding to an i-th receiving antenna and a receiving beam of the i-th receiving antenna, $W^R_{i,O*X}$ is an O-dimensional column vector denoting a RF weight on an antenna element corresponding to a j-th transmission antenna and corresponding to a transmission beam of the j-th transmission antenna. The transmitting end $W^T$ has $9^2$=81 combinations. Each combination includes a transmission beam of the transmission antenna 1 and a transmission beam of the transmission antenna 2. The receiving end $W^R$ has $3^2$=9 combinations. Each combination includes a transmission beam of the receiving antenna 1 and a transmission beam of the receiving antenna 2. There are a total of 9×81=729 combinations and the receiving end obtains a preferred ($W_{opt}^W$, $W_{opt}^R$) combination based on a certain criterion. For example, the preferred ($W_{opt}^W$, $W_{opt}^R$) combination is obtained according to a maximized channel capacity of the equivalent channel in the formula (1) or a pair of transmission and receiving beams ($W_{opt}^W$, $W_{opt}^R$) is obtained based on a simple criterion. The receiving end feeds back an index corresponding to $W_{opt}^T$ to the receiving end, where $W_{opt}^T$ is composed of the transmission beam of the transmission antenna 1 and the transmission beam of the transmission antenna 2 and fed back in a group manner. At this time, a transmission beam of one transmission antenna is allowed to be empty. The feedback information needs to further include transmission antenna information corresponding to each transmission beam or an indication that the transmission beam of the transmission antenna is empty. When there are multiple combinations of transmission and receiving beams, different $W_{opt}^T$ is fed back in groups. For example, each group includes one or two transmission beam indexes corresponding to transmission beam indexes of the two transmission antennas at the transmitting end. As shown in FIG. 20, two groups are as shown in table 5. The receiving end cannot simultaneously generate combination of the receiving modes corresponding to different groups. In the subsequent transmission, beam combinations corresponding to different groups can only be used to send information to the receiving end in the time division multiplexing manner. In the above manner, the receiving end may further send, to the transmitting end, RI information transmittable when if the transmission beam combinations are used to send information to the receiving end. There are no intersection sets between different transmission beam combinations in FIG. 20, and a case where there is an intersection set between different transmission beam combinations is not excluded in the embodiment. There is no intersection sets between different receiving beams in FIG. 21, and a case where there are intersection sets between different receiving beams is not excluded in the embodiment, but the different receiving beam combinations cannot overlap completely. The transmitting end may send data to the receiving end by using all transmission antennas in one group in the subsequent transmission according to the feedback information of the receiving end, or may send the data to the receiving end by using part of the transmission antennas in the combination and the remaining antennas in the combination are used to serve other users. If information of the other users served by the remaining antennas and the receiving end is transmitted in a MU-MIMO transmission manner on a same time-frequency resource, then the transmission beams in the combination are avoided to be used by the a transmission beam on the remaining antennas to avoid large multi-user interference. For example, the receiving end is instructed to use the receiving manner corresponding to the group 0 and the transmitting end only uses the transmission antenna 1 to send the data to the receiving end, and the transmission beam 2 is avoided when the transmission antenna 2 is used for sending data of other users which occupies the same time-frequency resource with the receiving end.

TABLE 5

| First-type Resource Group No. | Included Second-type Resource (Beam of Transmission Antenna 1, Beam of Transmission Antenna 2) |
|---|---|
| 0 (Combination of receiving beams 1 and 3 of two receiving antennas) | (1, 2) |
| 1 (Combination of receiving beams 3 and 2 of two receiving antennas) | (6, 4) |

Figure 21:
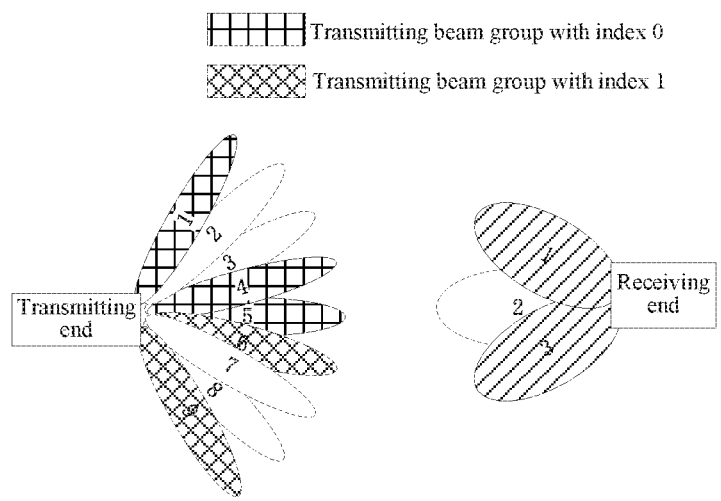
FIG. 21 is a diagram illustrating an example 3 of first-type resource groups according to an embodiment of the present invention.

The selected resources are divided according to the receiving resources into the N first-type resource groups. In a fifth implementation mode of the embodiment, more types of receiving resources of the resources in the same first-type resource group have a difference less than an agreed threshold. As shown in FIG. 21, the receiving end uses receiving beams {1, 3} for simultaneous reception (for example, the receiving end has 2 receiving antennas or the receiving end has more than 2 receiving antennas). When two or three transmission beams among the transmission beams {1, 4, 5} are simultaneously transmitted, a similar equivalent channel obtained with the formula (1) has a rank equal to 1. When two transmission beams {6, 9} are simultaneously transmitted, a similar equivalent channel obtained with the formula (1) has a rank equal to 1. When any one of the transmission beam group {1, 4, 5} and any one of the transmission beam group {6, 9} are simultaneously transmitted, a similar equivalent channel obtained with the formula (1) has a rank equal to 2, and two characteristic values of the 2*2 equivalent channel has a small difference and two-layered transmission may be performed. The transmission beams are grouped as shown in table 6.

TABLE 6

| First-type Resource Group No. | Included Second-type Resource (Transmission Beam) |
|---|---|
| 0 | (1, 4, 5) |
| 1 | (6, 9) |

At this time, the two groups correspond to a same receiving manner, the receiving beams {1, 3}. When the transmitting end has multiple transmission antennas or when the transmission beams are hybrid beams, when the transmitting end adopts multiple beams in one group to transmit information to the receiving end, only one layer of data can be sent. When the transmitting end uses transmission beams in different groups to send data to the receiving end, two layers of data may be sent or data may be in a transmit diversity manner. That is, when the resources in the same group are used to send information to the receiving end, the resources in the same group cannot be space division multiplexed; when the resources in different groups are used to send the information to the receiving end, the resources in different groups can be space division multiplexed; at this time, the number of first-type resource groups is equal to a maximum number of transmittable layers.

Of course, different transmission beams described above may also be represented by one or more of ports, time domain resources, frequency domain resources, sequence resources and sector resources. In short, different beams are represented by different resources in the second-type resource group. For example, one second-type resource group is CSI-RS resources, and different ports in one CSI-RS resource represent different beams.

Different receiving beams in the above implementation modes may also be represented by one or more of receiving ports, receiving sectors, receiving sequences, and receiving time-frequency resources.

In the above implementation modes, the transmission process includes one or more of: a data transmission process, a control channel transmission process and a measurement reference signal transmission process.

Specific Embodiment 3

An implementation process in the embodiment is similar to that in the specific embodiment 1. A grouping rule for first-type resource groups in step 3 is specifically described in the embodiment. In the embodiment, the M selected resources are grouped into the first-type resource groups according to signal qualities transmitted on the M selected resources or channel qualities corresponding to the M selected resources.

In a first implementation mode of the embodiment, channel qualities corresponding to resources in a same first-type resource group have a difference less than or equal to a threshold R1, and channel qualities corresponding to resources in different first-type resource groups have a difference greater than a threshold R2, where R1 or R2 is agreed by a transmitting end and a receiving end or configured by the transmitting end to the receiving end. R1 and R2 may be the same. The channel qualities may be CQIs of the channels, channel capacities or ranks of channel response matrixes corresponding to the channels.

In a second implementation mode of the embodiment, receiving signal qualities corresponding to the resources in the same first-type resource group have a difference less than or equal to a threshold r1, and receiving signal qualities corresponding to the resources in different first-type resource groups have a difference greater than a threshold r2, where r1 or r2 is agreed by the transmitting end and the receiving end or configured by the transmitting end to the receiving end. r1 and r2 may be the same. The signal quality denotes the RSRP of the signal.

After the resources are grouped in such a manner, a number of feedback bits for the channel qualities (signal qualities) corresponding to different resources in a group may be effectively reduced. For example, when the channel qualities (or signal qualities) of the resources in the group are fed back by differences, the number of feedback bits may be effectively reduced. In this case, for each group, an average channel quality (or signal quality) or a maximum channel quality (or signal quality) may be fed back, and the channel qualities of different resources in the same group are fed back by feeding back the differences. The transmitting end may obtain priorities of different groups based on the channel qualities (or signal qualities), the resources in a group with a good channel quality (or signal quality) correspond to a high priority, and the resources in a group with a poor channel quality (or signal quality) correspond to a low priority so that the transmitting end may reasonably utilize the resources to improve a resource utilization rate and resume communication with a standby link when one link is interrupted. For example, the transmitting end and the receiving end agree that resources with good channel qualities are replaced with resources with poor channel qualities only after the link is interrupted.

Specific Embodiment 4

An implementation process in the embodiment is similar to that in the specific embodiment 1. A grouping rule for first-type resource groups in step 3 is specifically described in the embodiment. In the embodiment, the M selected resources are grouped into the first-type resource groups according to TA parameters of signals transmitted on the M selected resources.

In an alternative embodiment, TA parameters used for transmitting the signal on resources in a same first-type resource group have a difference less than or equal to a threshold T1, and TA parameters used for transmitting the signal on resources in different first-type resource groups have a difference greater than a threshold T2, where T1 or T2 is agreed by a transmitting end and a receiving end or configured by the transmitting end to the receiving end or determined according to a configuration of a CP. T1 and T2 may be the same, the resources may be resources in a measurement phase and the signals transmitted on the resources are signals or references signals transmitted the resources marked in the measurement phase after the measurement phase or in a next measurement phase.

Figure 22A:
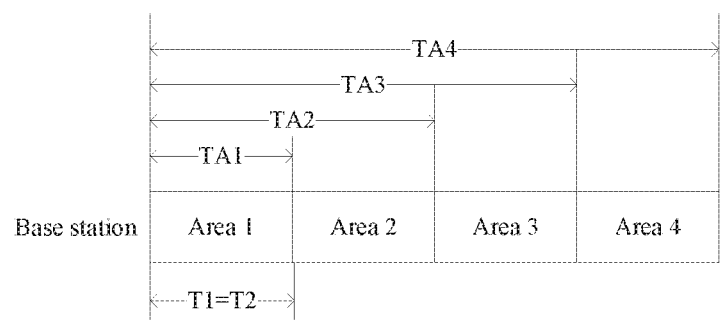
FIG. 22a is a diagram illustrating that first-type resource groups are divided according to TA information according to an embodiment of the present invention.

In a first implementation mode of the embodiment, the TA may be an advance of an uplink transmission time with respect to a corresponding downlink transmission time unit. As shown in FIG. 22a, the transmitting end Q uplink access requests to a base station by using multiple Preamble resources and/or multiple transmission beam resources. The Q uplink access requests arrive at the base station with different TA information; the receiving end (the base station) selects M uplink access requests and divides the selected M uplink access requests into four areas according to their arrival time. TA information in the same group has a difference less than or equal to T1 and TA information in different groups has a difference greater than the threshold T2, where T1=T2 in FIG. 22a, as shown in FIG. 22a. After dividing the Preamble resources, the receiving end feeds back the Preamble resources to the transmitting end and the transmitting end adjusts transmission time of signals corresponding to different groups of Preamble resources according to the TA information in a subsequent transmission phase. For example, different Preambles indicate different transmission beams and TAs may be different for different beam groups.

In a second implementation mode of the embodiment, the TA may be directly a distance of a time at which the signal arrives at the receiving end from a start position of a transmission unit of the receiving end. For example, the transmitting end and the receiving end agree that the transmitting end sends the signal at a start position of an i-th transmission unit and the TA is a distance from a start position at which the receiving end receives the signal to the start position of the i-th transmission unit.

In the above implementation modes, only one TS is fed back for each group and the transmitting end may further reasonably adjust the start position of the signal according to T1 and T2 in a transmission implementation phase. Alternatively, only group indexes are fed back and each group index corresponds to an agreed area in FIG. 22a.

Specific Embodiment 5

An implementation process in the embodiment is similar to that in the specific embodiment 1. A grouping rule for first-type resource groups in step 3 is specifically described in the embodiment. In the embodiment, the M selected resources are divided into the first-type resource groups according to CP parameters corresponding to signals transmitted on the M selected resources.

In an alternative embodiment, a CP length used for transmitting the signals on resources in a same first-type resource group is less than or equal to t1.

The CP length used for transmitting the signals on resources in different first-type resource groups is greater than t2, or the CP length used for transmitting the signals on resources in different first-type resource groups is greater than t2 and less than t3, or the CP length used for transmitting the signals on resources in different first-type resource groups is further determined according to absolute values of differences of group indexes of the different first-type resource groups corresponding to the resources and an agreed t4. t1 or t2 or t3 is agreed by a transmitting end and a receiving end or configured by the transmitting end to the receiving end. t1 and t2 may be the same, t3 is greater than t2 and t4=t1.

Figure 22B:
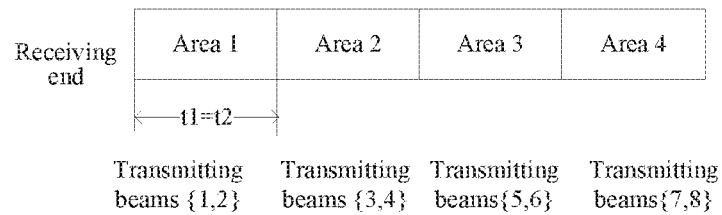
FIG. 22b is a diagram illustrating that first-type resource groups are divided according to CP information according to an embodiment of the present invention.

As shown in FIG. 22b, the receiving end determines the group index according to areas where different resources are located. For example, the resources are different measurement beams and that transmission beams {1, 2} fall into an area 1 refers to all paths of the beams fall into the area 1, that is, a start path and a multipath expansion part from the beams fall into the area 1. The receiving end feeds back to the transmitting end grouping information shown in table 7.

TABLE 7

| First-type Resource Group Index | Included Second-type Resource (Transmission Beam) |
| --- | --- |
| 0 | 1, 2 |
| 1 | 3, 4 |
| 2 | 5, 6 |
| 3 | 7, 8 |

Figure 22C:
FIG. 22c is a diagram illustrating an example 1 in which different CPs are used according to grouping information of resources in a transmission phase after feedback according to an embodiment of the present invention.
Figure 22D:
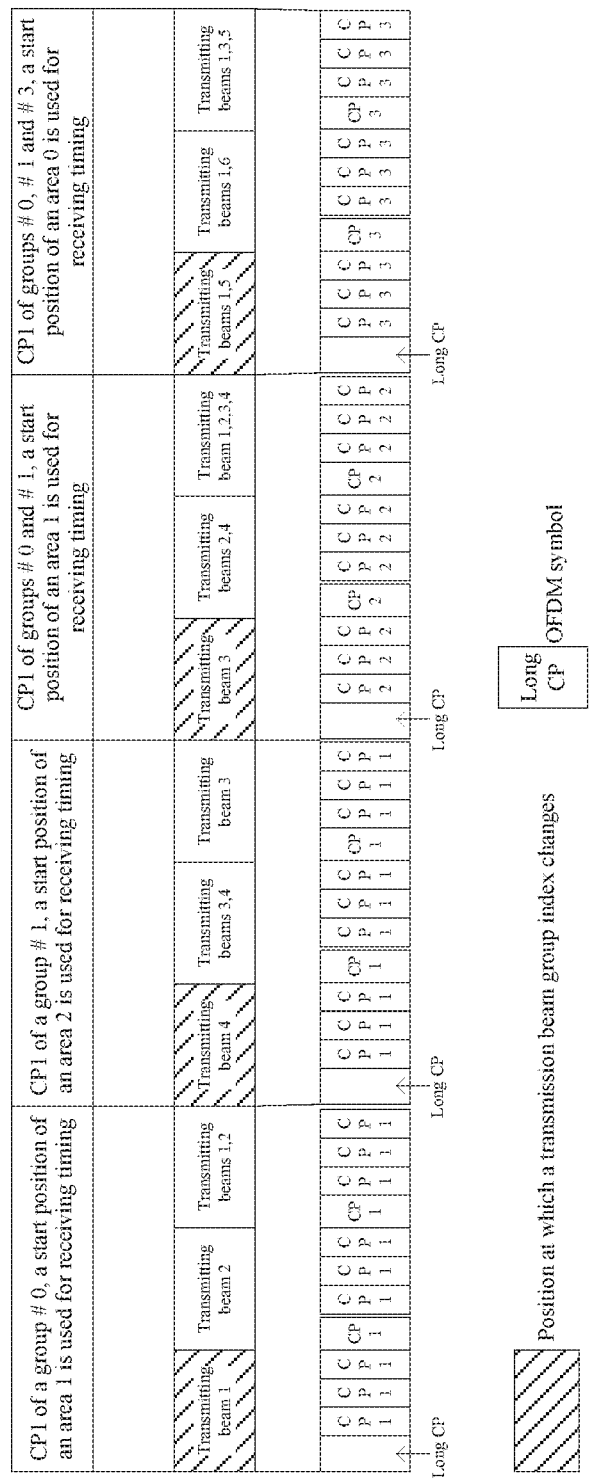
FIG. 22d is a diagram illustrating an example 2 in which different CPs are used according to grouping information of resources in a transmission phase after feedback according to an embodiment of the present invention.
Figure 22E:
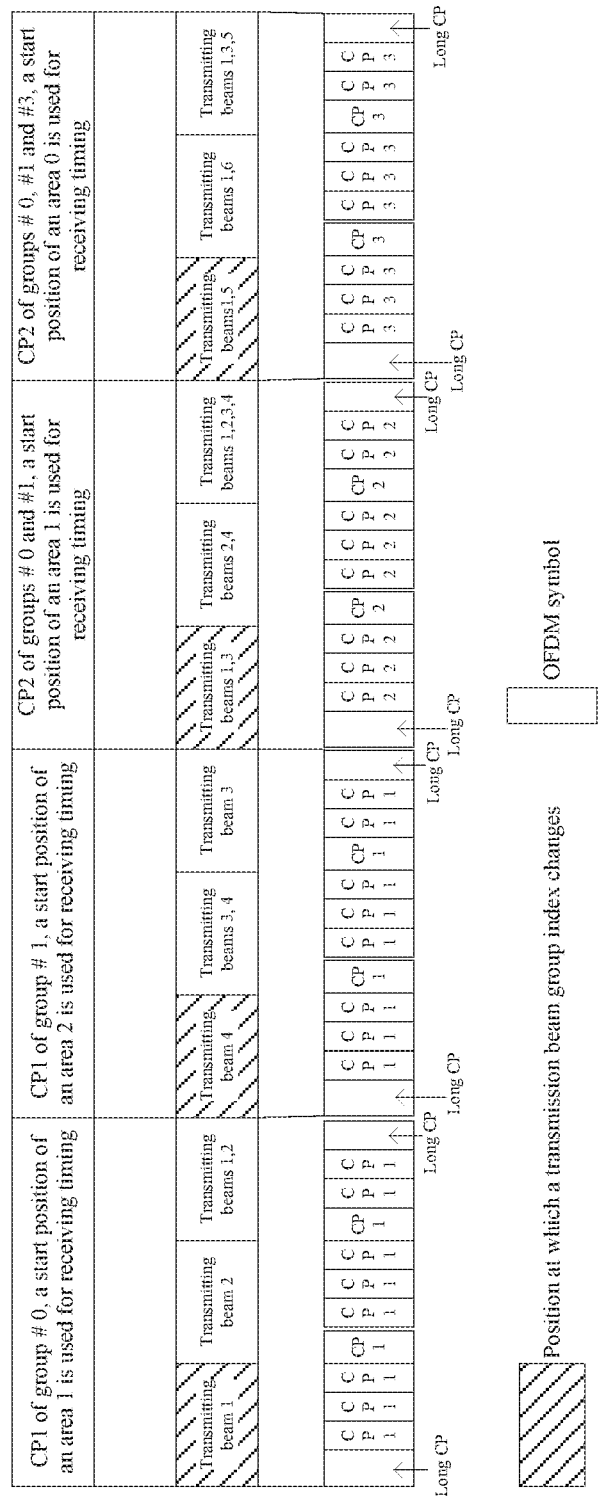
FIG. 22e is a diagram illustrating an example 3 in which different CPs are used according to grouping information of resources in a transmission phase after feedback according to an embodiment of the present invention.

In a first implementation mode, the transmitting end and the receiving end agree that in a transmission phase after feedback, if different transmission beams in the same group are transmitted at the same time instant, or the different transmission beams in the same group switch between different time units, a CP length corresponding to an OFDM symbol for information transmission is CP1 (a length of the CP1 is less than or equal to t1), and if beams in different groups are jointly transmitted at the same time instant, (x+1)×CP1 is used. In the embodiment, x is a maximum value of absolute values of the group index differences of the group in which the beams are located. For example, feedback information based on the CP length is shown in table 7 and transmission beams in the transmission phase are as shown in FIG. 22c. A long CP is used on a first OFDM symbol when a combination of transmission beams changes. At this time, when transmission beams with a same group index are switched or transmitted jointly, the CP length is unchanged and the CP1 is used. A length of the long CP is greater than a length of CP1 or the long CP is 4CP1, as shown in FIG. 22d. Alternatively, as shown in FIG. 22e, the long CP is used at both the start and end positions at which the combination of transmission beams changes.

In a first method, a receiving timing of the receiving end starts at a start position of a smallest group index in the group indexes corresponding to the transmission beams, as shown in FIG. 22c. A second method is to add a micro-synchronization signal at the beginning when an index of the combination of transmission beams changes. That is, the micro-synchronization signal is added at a beginning of a shaded portion in FIG. 22c for searching for the receiving timing at this stage. A third method is to combine the first method with the second method, that is, synchronization is performed based on the synchronization signal near the start position of the smallest group index in the group indexes, and the start position of the group index is a start position corresponding to the group obtained in a previous beam training or synchronization phase. Preferably, in each group of resources, a first resource is agreed as a synchronization resource of the group of resources, that is, a downlink timing of the group of resources is based on a signal sent on the first resource.

In a second implementation mode of the embodiment, the receiving timings of the receiving end for different transmission beams all start at a start of an area 1 in FIG. 22b, where the area 1 is a start position of a transmission unit, or the area 1 is the start position of the transmission unit obtained by the receiving end based on the synchronization signal. The different groups of resources have different CP lengths, that is, the CP lengths are determined by a maximum group index of the first-type resource groups corresponding to current scheduling resources and the CP length corresponding to the maximum group index is used. For example, if a transmission beam 1 is currently scheduled, the CP length corresponds to the area 1. If a transmission beam 3 is currently scheduled, the CP length corresponds to an area 2. The CP length corresponding to the area 2 is greater than the CP length corresponding to the area 1. If the currently scheduled transmission beams are {1, 7, 8}, the CP length corresponds to an area 4, and the CP length corresponding to the area 4 is greater than or equal to a length between the start position of the area 1 and an end position of the area 4.

Figure 22F:
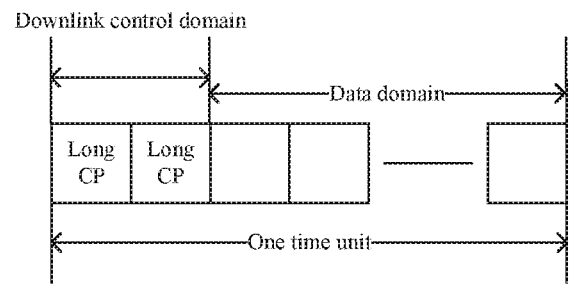
FIG. 22f is a diagram illustrating an example 4 in which different CPs are used according to grouping information of resources in a transmission phase after feedback according to an embodiment of the present invention.
Figure 22G:
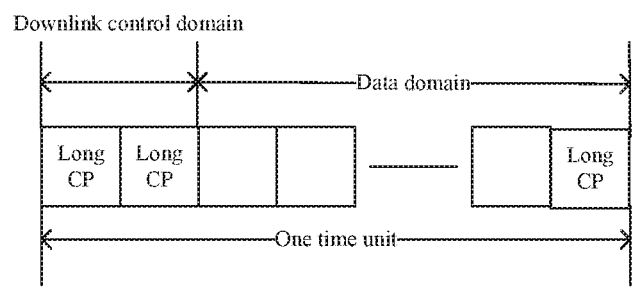
FIG. 22g is a diagram illustrating an example 5 in which different CPs are used according to grouping information of resources in a transmission phase after feedback according to an embodiment of the present invention.

In a third implementation mode of the embodiment, as shown in FIG. 22f, an OFDM symbol occupied by a start control field of one time unit adopts a fixed CP length. Preferably, the fixed CP length is a length of the long CP, and a CP length in a data domain is obtained based on group index indication information. Alternatively, as shown in FIG. 22g, the OFDM symbol occupied by the start control field of one time unit adopts the fixed CP length. Preferably, the fixed CP length is the length of the long CP, and the CP length in the data domain is obtained based on the group index indication information and a length of an end CP in the data domain is also the fixed CP length. Preferably, the fixed CP length is the length of the long CP.

Figure 22H:
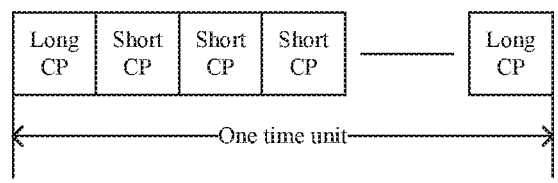
FIG. 22h is a diagram illustrating an example in which long CPs are used at beginning and end of a time unit according to an embodiment of the present invention.

In a fourth implementation mode of the embodiment, as shown in FIG. 22h, a start OFDM symbol and an end OFDM symbol of one time unit adopt the fixed CP length. Preferably, the fixed CP length is the length of the long CP. Other OFDM symbols adopt a length of a short CP. The length of the long CP is greater than a predetermined threshold, and the length of the short CP is less than or equal to the predetermined threshold.

Specific Embodiment 6

An implementation process in the embodiment is similar to that in the specific embodiment 1. A grouping rule for first-type resource groups in step 3 is specifically described in the embodiment. In the embodiment, the M selected resources are grouped into the first-type resource groups according to multiplexing manners corresponding to signals transmitted on the selected M resources.

A multiplexing manner set used for transmitting signals on resources in a same first-type resource group is a set A, and a multiplexing manner set used for transmitting the signals on resources in different first-type resource groups is a set B, where the set A is different from the set B and the set B is a true subset of the set A. For example, the set A is a combination of any one or more of time division/frequency division/code division/space division manners and the set B only includes the time division manner. Alternatively, the set A is a true subset of the set B. For example, the set A is a combination of any one or two of time division/frequency division manners and the set B is a combination of any one or more of time division/frequency division/space division manners.

The multiplexing manner set used for transmitting the signal on the resources in the same first-type resource group represents a multiplexing manner set used by a first communication node to transmit information to a second communication node with different resources in the same first-type resource group in a transmission phase after feeding back the grouping indication information.

Specific Embodiment 7

An implementation process in the embodiment is similar to that in the specific embodiment 1. A grouping rule for first-type resource groups in step 3 is specifically described in the embodiment. In the embodiment, the M selected resources are grouped into the first-type resource groups according to quasi-co-location information corresponding to signals transmitted on the selected M resources.

In an alternative embodiment, resources in a same first-type resource group correspond to same quasi-co-location information, and resources in different first-type resource groups correspond to different quasi-co-location information. Two resources being with the same quasi-co-location information refers to the "quasi co-located resources" in the existing LTE, that is, large-scale information related to a channel or signal of one resource may be derived from large-scale information related to a channel or signal of the other resource. The large-scale information includes Doppler spread, Doppler shift, an average gain and an average delay.

In an alternative embodiment, another grouping manner is that a difference between the quasi-co-location information corresponding to the resources in the same group is within an agreed range. Alternatively, the quasi-co-location information corresponding to the resources in the same group falls within the agreed range. In short, all the resources in the same group are quasi co-located.

The transmitting end may allocate QCL information according to feedback information, for example, each group needs to send at least one reference resource to acquire the QCL information of the group of resources. Preferably, the first resource in each group of resources may be agreed as a QCL reference resource of the group of resources, that is, each group needs to send at least one reference resource to acquire the QCL information of the group of resources. The information of the reference resource may be obtained according to one or more of: the first resource and index information corresponding to the group.

The QCL information or the quasi-co-location information may also be channel characteristic information or other equivalent nouns (for example, two resources with a same channel characteristic refers to that the two resources have quasi-co-beams and quasi-co-channels). The channel characteristic information includes at least one of the following information of a reference signal: Doppler spread, Doppler shift, the average gain, the average delay, average angle spread, an azimuth-of-arrival (AOA), a zenith-of-arrival (ZOA), a azimuth-of-departure (AOD) and a zenith-of-departure (ZOD). Furthermore, the above AOA/ZOA/AOD/ZOD are all average angles.

Specific Embodiment 8

In the embodiment, a transmitting end determines third-type grouping indication information and sends a demodulation reference signal to a receiving end according to the third-type grouping indication information.

In a first manner for the transmitting end to determine the third-type grouping indication information, the transmitting end and the receiving end obtain the third-type grouping indication information according to an agreed rule. In a second manner, the transmitting end receives feedback information from the receiving end, where the feedback information includes first-type grouping indication information, and the transmitting end and the receiving end agree that the first-type grouping indication information is the third-type grouping indication information.

For example, third-type groups are divided according to receiving resources, that is, resources in a same third-type resource group correspond to a same receiving manner and resources in different third-type resource groups correspond to different receiving manners. The receiving end can only generate a receiving manner corresponding to one third-type group at one time instant, and receiving manners corresponding to different groups can only be generated at different time instants. Equivalently, the first-type grouping indication information and/or the third-type grouping indication information are indication information of receiving manners of the receiving end. Preferably, one receiving manner corresponds to one set of receiving beams of the receiving end and the receiving end can only generate different receiving manners in a time division manner.

For example, in the embodiment shown in FIG. 14, the receiving end feeds back information on first-type groups shown in table 1. The transmitting end learns that the receiving end has 3 groups, that is, three different receiving manners. The demodulation reference signal is sent in a manner shown in FIG. 23a: the demodulation reference signal is transmitted three times in the time division manner so that the receiving end may blindly detect data and/or a control portion on three time division multiplexed resources using the three different receiving manners corresponding to the three groups fed back, determines the receiving manner for receiving the data and/or the control portion from the three different receiving manners to perform reception in an appropriate receiving manner in a data and/or control region. Alternatively, the transmitting end transmits the demodulation reference signal in such a manner to provide the transmitting end with sufficient scheduling flexibility. In this case, the transmitting end may freely select transmission beams, which are completely transparent to a terminal and the transmitting end may recover a link with a standby link when one of aligned transmission and receiving beam pairs is interrupted. It is also effective for one case where a receiving beam in an original transmission and receiving beam pair changes to one of the three receiving manners fed back; at this time, signals can also be efficiently received. Moreover, the above transmission manner may help the receiving end to preform receiving manner training and feed back information on receiving manners after the training to the transmitting end.

Figure 23A:
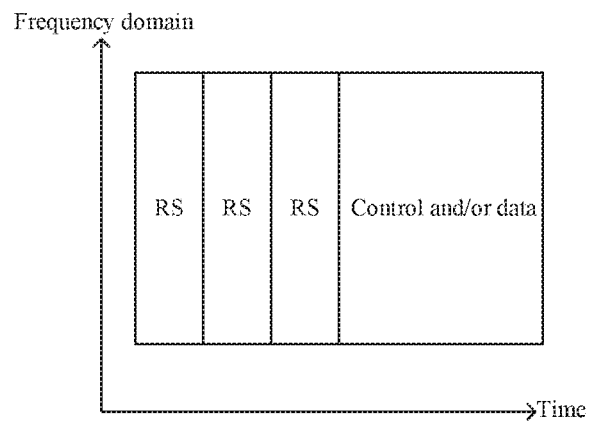
FIG. 23a is a diagram illustrating an example 1 in which a reference signal is transmitted according to a number of third-type resource groups according to an embodiment of the present invention.
Figure 23B:
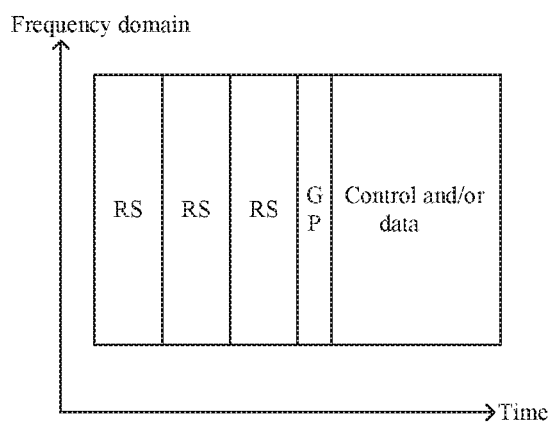
FIG. 23b is a diagram illustrating an example 2 in which a reference signal is transmitted according to a number of third-type resource groups according to an embodiment of the present invention.

In the above implementation mode, considering that a processing delay exists between an end of RS regions and a time when the receiving end detects a preferred receiving manner, a guard period (GP) may be set at the end of the RS regions, as shown in FIG. 23b and the transmitting end does not transmit valid information or transmits the reference signal in the GP region.

Figure 23C:
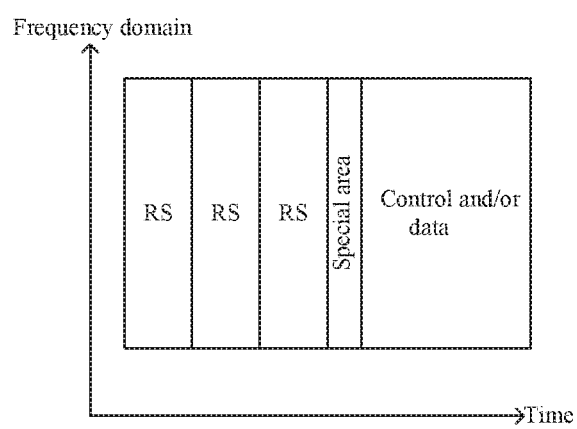
FIG. 23c is a diagram illustrating an example 3 in which a reference signal is transmitted according to a number of third-type resource groups according to an embodiment of the present invention.

In another implementation mode of the processing delay, as shown in FIG. 23c, a receiving manner in a special region of the data region may be one of the three receiving manners based on implementation modes of the receiving end. If a final receiving manner for data and/or control blindly detected by the receiving end according to the demodulation reference signal is the same as the receiving manner in the special region, a receiving signal in the data region may be processed without processing. If the final receiving manner for data and/or control blindly detected by the receiving end according to the demodulation reference signal is different from the receiving manner in the special region, a receiving portion of the special region is hollowed out and rate matching is performed in a channel decoding phase, that is, a receiving signal in the special region is discarded. Alternatively, furthermore, the receiving portion of the special region may be not hollowed out, but channel interpolation cannot be performed on the demodulation reference signal in the special region and the demodulation reference signal in the data region. Of course, if the processing delay is negligible, for example, the processing delay may be processed with a CP. The above two processing manners may be omitted and a manner in FIG. 23a is directly adopted.

Figure 23D:
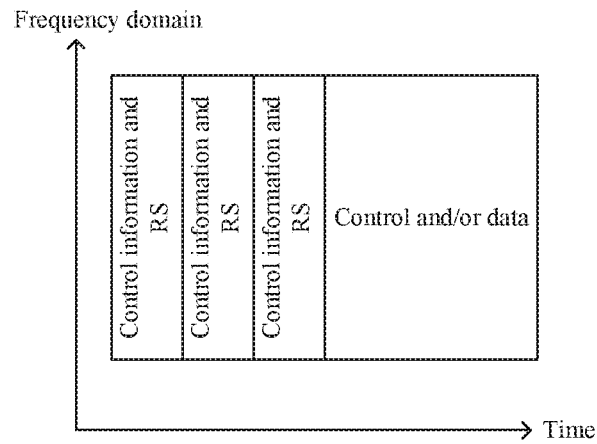
FIG. 23d is a diagram illustrating an example 1 in which a reference signal and control information are transmitted according to a number of third-type resource groups according to an embodiment of the present invention.

In the above implementation mode, the demodulation reference signal is repeatedly transmitted only for blind detection of receiving manners. As shown in FIG. 23a to FIG. 23c, one of the three time division multiplexed demodulation reference signals may be detected to be valid through the blind detection of the receiving manners and the other two time division multiplexed demodulation reference signals need to be discarded and cannot be used for subsequent demodulation of the data and/or control regions. To further enhance the method, as shown in FIG. 23d, control information and the RS may be transmitted three times in the time division manner so that when the receiving manners are blindly detected according to the RS, coverage and enhancement of the control information may be achieved. Because the final receiving manner is an optimal one among the three receiving manners and combined gains may be obtained through each pieces of time division multiplexed control information. Because the control information in the three time division multiplexed resources is the same, soft combining may be performed to achieve the coverage and enhancement of the control information and increase robustness. The processing delay in FIG. 23d may be processed in manners similar to those in FIG. 23b and FIG. 23c, or the processing delay may be negligible or unprocessed. In the manner shown in FIG. 23d, receiving manners of control channels may be blindly detected through three time division multiplexed control channels so that the transmission of the control channels may provide the transmitting end with more flexibility and the receiving manner of the subsequent data portion may be indicated by the control channels.

In the receiving manner blind detection process of the receiving manners, the number of time division transmissions of the reference signal is equal to a number of first-type resource groups which is fed back by the receiving end. In a second implementation mode of the embodiment, the number of time division transmissions of the reference signal and/or the control channel are an integer multiple of grouping times. In a third implementation mode of the embodiment, the transmission times of the reference signal and/or the control channel in the time division manner are less than or equal to the number of first-type resource groups which is fed back by the receiving end. For example, a blind detection range of the receiving manners is configured via higher-layer signaling or agreed. For example, a group index set of the first-type resource groups is shown in table 1, a current blind detection range is agreed as receiving manners of first-type resource group indexes {0, 3} and the receiving end blindly detects a receiving manner within the receiving manners of the first-type resource group indexes {0, 3}. Alternatively, transmission times N1 in the time division manner are configured by the transmitting end and the receiving end blindly detects the receiving manner by using a receiving manner in an agreed receiving manner set based on a certain rule.

The receiving manner is one or more of the following resources used for receiving signals: a receiving beam, a receiving antenna, a receiving port, a receiving precoding matrix, a receiving time resource, a receiving frequency domain resource and a receiving sequence resource.

In another implementation mode of the embodiment, the transmitting end sends the demodulation reference signal and/or the control channel according to the third-type grouping indication information only on an agreed time unit. Preferably, for a non-agreed time unit, the demodulation reference signal and/or the control channel are transmitted only on one time division multiplexed resource. The receiving end does not blindly detect the receiving manner according to the demodulation reference signal on the non-agreed time unit. Preferably, the receiving end receives the demodulation reference signal and/or control channel in a determined manner on the non-agreed time unit. Preferably, the agreed time unit is periodic.

In an optional implementation mode of the embodiment, the demodulation reference signal and the control channel are sent on the time division multiplexed resources and the receiving manner blindly detected according to the demodulation reference signal only the receiving manner of the control channel, and a receiving manner for information after the control channel is notified in the control information.

Figure 23E:
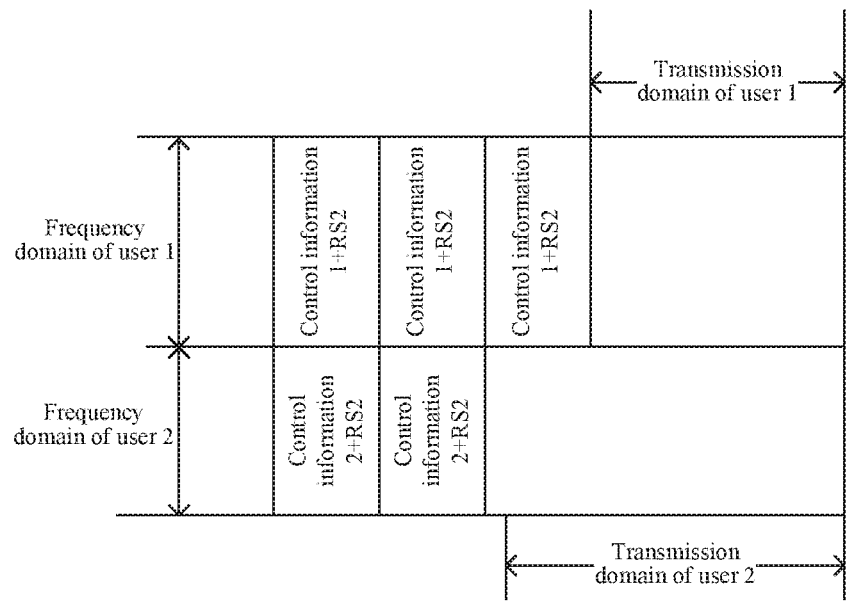
FIG. 23e is a diagram illustrating an example e in which a reference signal and control information are transmitted according to a number of third-type resource groups according to an embodiment of the present invention.

Preferably, when the third-type grouping indication information corresponding to different receiving ends includes different numbers of groups, a first implementation mode is that a frequency division multiplexing manner is better used for the different receiving ends, as shown in FIG. 23e. A second implementation mode is that the control information and the demodulation reference signal are sent on N1 time division multiplexed resources, and the receiving end is notified of N1 by signaling. A third implementation mode is to notify a start position of a transmission domain by dynamic signaling. A fourth implementation mode is to notify the start position of the transmission domain for each frequency domain resource occupied by the receiving end; at this time, the start position of the transmission domain is different for each frequency domain resource allowed to be occupied by the receiving end. A fifth implementation mode is to divide frequency domain resources occupied by the receiving end are grouped, where resources with a same start position are divided onto a same group, and a start position of each group and frequency domain resources included in each group are notified by dynamical signaling. A sixth implementation mode is that the transmission beams of the transmitting end corresponding to the different receiving ends are space division multiplexed and control information of each transmission beam occupies a full system bandwidth. In the above fourth and fifth implementation modes, the signaling may also be common dynamic signaling. The common signaling is used for notifying the start position of the whole system bandwidth resource or the start position is notified for currently scheduled frequency domain resources via the common signaling. Of course, the signaling may also be semi-static signaling.

Specific Embodiment 9

An implementation process in the embodiment is similar to that in the specific embodiment 1. The feedback manner in step 4 is specifically described, where the feedback manner is used by a receiving end to feed back indication information of the selected resources and indication information of N first-type resource groups.

Figure 24A:
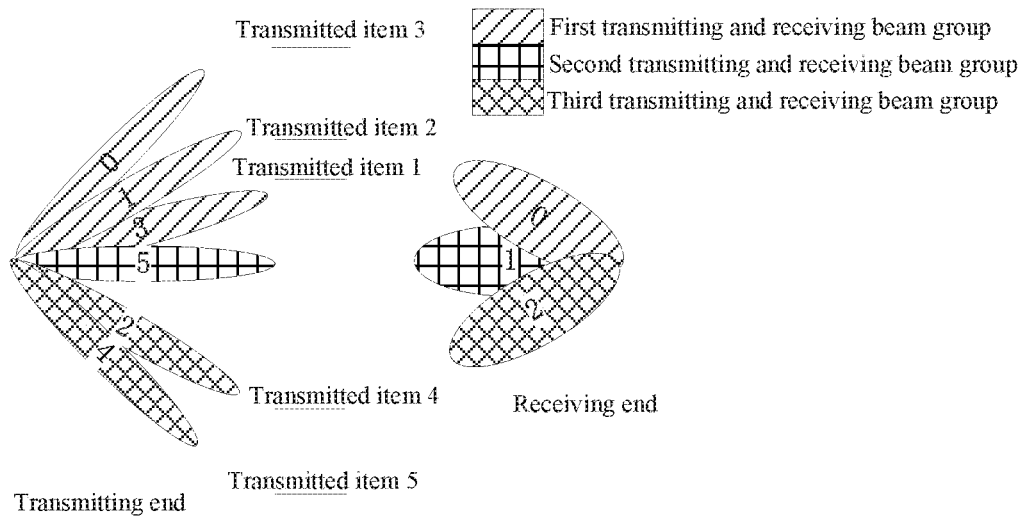
FIG. 24a is a diagram illustrating an example 4 of first-type resource groups according to an embodiment of the present invention.
Figure 24B:
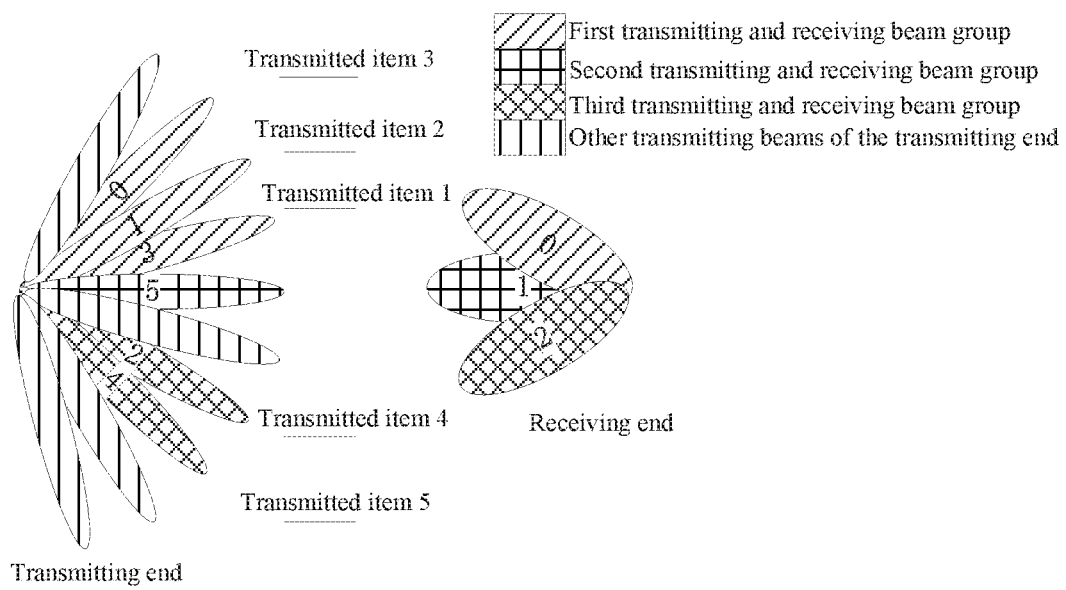
FIG. 24b is a diagram illustrating an example 5 of first-type resource groups according to an embodiment of the present invention.

As shown in FIG. 24a, there are a total of 6 pairs of transmission and receiving beams from a base station to a terminal. The 6 transmission and receiving beam pairs are transmission and receiving beam pairs which have link performance measured by the receiving end greater than a predetermined threshold in a beam training phase or a beam tracking phase. As shown in FIG. 24b, there are other transmission beams from the base station to the receiving end, such as transmission beams {6, 7, 8}, but the three beams are unable to reach the terminal or the three beams reach the terminal with a performance below the predetermined threshold.

In the embodiment, assuming that a number of transmission beam indexes is TBN and a number of receiving beam indexes is RBN, unless otherwise specified, the number of bits required for each transmission beam index in the feedback information in the embodiment is tbnn=⌈log 2 (TBN)⌉ and the number of bits required for each receiving beam index in the feedback information is rbnn=⌈log 2 (RBN)⌉. Specifically, as shown in FIG. 24a, assuming that TBN=10 and RBN=3, thus tbnn=4 and rbnn=2.

For the feedback manner of three transmission and receiving beam groups, a first feedback manner in the embodiment is that the transmitting end and the receiving end agree to feed back 6 pairs of transmission and receiving beams and the receiving end feeds back information on each transmission and receiving beam pair to the transmitting end. As shown in table 1, both the transmission beam index and the receiving beam index need to be fed back in each item, each item (transmission beam index, receiving beam index) needs 4+2=6 bits, and 6 transmission and receiving beam pairs need a total of 6×6=36 bits. The 36 feedback bits are shown in table 8. The arrangement of the feedback bits in table 8 is only an example and other arrangements are not excluded, but the feedback bits contents do not change.

TABLE 8

| Feedback Bit Index | Feedback Bit (Transmission Beam Index, Receiving Beam Index) |
| --- | --- |
| 0-5 | (0000, 00) |
| 6-11 | (0001, 00) |
| 12-17 | (0011, 00) |
| 18-23 | (0101, 01) |
| 24-29 | (0010, 10) |
| 30-35 | (0100, 10) |

For the feedback manner of the three groups, a second feedback manner in the embodiment is that the transmitting end and the receiving end agree to feed back the 3 groups of transmission and receiving beam pairs and the receiving end and the transmitting end agree on a maximum number of transmission beams included in each group such as 3. For a group without 3 transmission beams, bits are complemented for feedback and a number of bits required for the transmission beam index is tbnn=⌈log 2 (TBN+1)⌉=4. A number of the complemented bits is greater than or equal to TBN, such as 15. In this case, each transmission beam index requires 4 bits, each group needs 4×3=12 bits, and 3 groups need 3×12=36 bits. The 36 feedback bits are shown in table 9.

TABLE 9

| Feedback Bit Index | Feedback Bit | Feedback Bit Content |
| --- | --- | --- |
| 0-11 | (0000, 0001, 0011) | Transmission beam group 0 |
| 12-23 | (0101, 1111, 1111) | Complemented transmission beam group 1 |

TABLE 9-continued

| Feedback Bit Index | Feedback Bit | Feedback Bit Content |
|---|---|---|
| 24-35 | (0010, 0100, 1111) | Complemented transmission beam group 2 |

For the feedback manner of the three transmission and receiving beam groups, a third feedback manner in the embodiment is that the receiving end determines a number of groups to be fed back according to a measurement result, adds a first end symbol at an end position of each transmission beam group, and adds a second end symbol at an end position of a last group. The first and second end symbols occupy a same number of bits as each transmission beam index and the end symbols are greater than or equal to TBN, similar to the second feedback manner described above. The number of bits occupied by each transmission beam index is tbnn=⌈log 2 (TBN+2)⌉=4 and the first and second end symbols are two different values greater than or equal to TBN, for example, the first end symbol is 11 and the second end symbol is 15. Each transmission beam index needs 4 bits, 6 transmission beams need 4*6=24 bits, 3 end symbols need 4×3=12 bits, and a total of 24+12=36 bits are needed. The feedback bits are shown in table 10.

TABLE 10

| Feedback Bit Index | Feedback Bit | Feedback Bit Content |
|---|---|---|
| 0-15 | (0000, 0001, 0011, 1011) | Transmission beam group 0 + first end symbol |
| 16-23 | (0101, 1011) | Transmission beam group 1 + first end symbol |
| 24-35 | (0010, 0100, 1111) | Transmission beam group 2 + second end symbol |

For the feedback manner of the three groups, a fourth feedback manner in the embodiment is that the receiving end and the transmitting end agree to feed back three groups and add the first end symbol at the end position of each transmission beam group. The end symbol is greater than or equal to TBN. At this time, tbnn=⌈log 2 (TBN+1)⌉=4. If the end symbol is 15, each transmission beam index needs 4 bits, 6 transmission beams need 4×6=24 bits, 2 end symbols need 4×2=8 bits, a total of 24+8=32 bits are needed. The feedback bits are shown in table 11.

TABLE 11

| Feedback Bit Index | Feedback Bit | Feedback Bit Content |
|---|---|---|
| 0-15 | (0000, 0001, 0011, 1111) | Transmission beam group 0 + first end symbol |
| 16-23 | (0101, 1111) | Transmission beam group 1 + first end symbol |
| 24-31 | (0010, 0100) | Transmission beam group 2 |

For the feedback manner of the three transmission and receiving beam groups, a fifth feedback manner in the embodiment is that the receiving end and the transmitting end agree on a number of transmission beams to be fed back and feed back a start transmission beam index and an end transmission beam index for a group with more than one transmission beam. A total of 4×6+4×3=24+12=36 bits are required at this time, and the feedback bits are shown in table 12.

TABLE 12

| Feedback Bit Index | Feedback Bit | Feedback Bit Content |
|---|---|---|
| 0-3 | (0000) | Transmission beam 0 |
| 4-7 | (0001) | Transmission beam 1 |
| 8-11 | (0011) | Transmission beam 2 |
| 12-15 | (0101) | Transmission beam 3 |
| 16-19 | (0010) | Transmission beam 4 |
| 20-23 | (0100) | Transmission beam 5 |
| 24-29 | (000, 011) | (Start transmission beam index, end transmission beam index) |
| 30-35 | (100, 101) | (Start transmission beam index, end transmission beam index) |

Alternatively, as shown in table 13, only the index of the start transmission beam is fed back for the group with more than one transmission beams. A total of 4×6+2×3=24+6=30 bits are required in this scheme, and the feedback bits are shown in table 13.

TABLE 13

| Feedback Bit Index | Feedback Bit | Feedback Bit Content |
|---|---|---|
| 0-3 | (0000) | Transmission beam 0 |
| 4-7 | (0001) | Transmission beam 1 |
| 8-11 | (0011) | Transmission beam 2 |
| 12-15 | (0101) | Transmission beam 3 |
| 16-19 | (0010) | Transmission beam 4 |
| 20-23 | (0100) | Transmission beam 5 |
| 24-26 | 000 | Start transmission beam index of group 0 |
| 27-29 | 011 | Start transmission beam index of group 1 |
| 27-29 | 100 | Start transmission beam index of group 2 |

For the feedback manner of the three transmission and receiving beam groups, a sixth feedback manner in the embodiment is that the receiving end and the transmitting end agree to feed back 3 groups and $$abbnj = \left\lceil \log 2\left(\binom{TBN}{Lj}\right)\right\rceil$$

bits are needed for a j-th group, where $$\binom{x}{y}$$

denotes a number of options of selecting y numbers from x number, Lj is a number of transmission beams in the j-th group. The receiving end needs to feed back Lj of each group to the transmitting end. Assuming that a maximum number of beams in one group is 4, Lj of each group needs 2 bits. The number of bits required by the three groups is $$2\times 3 + \left\lceil \log 2\left(\binom{10}{3}\right)\right\rceil + \left\lceil \log 2\left(\binom{10}{1}\right)\right\rceil + \left\lceil \log 2\left(\binom{10}{2}\right)\right\rceil = 23 \text{ bits.}$$

A transmission manner set in the j-th group is $\{b_{i,j}-1, i=0, 1, \ldots, Lj-1\}$, where $1 \le b_{i,j} \le TBN$, $b_{i,j} < b_{i+1,j}$, a value of the $$\left\lceil \log 2\binom{TBN}{Lj}\right\rceil$$

bits is $$abbi = \sum_{i=0}^{Lj-1} \binom{TBN - b_i}{Lj - i},$$

where $$\binom{x}{y} = \begin{cases} \binom{x}{y}, & x \geq y \\ 0, & x < y \end{cases},$$

TBN is a total number of transmission manners, $j \leq N \leq -1$, and Lj is the number of transmission beams in the j-th group. Information content of 23 bits is shown in table 14.

TABLE 14

| Feedback Bit Index | Feedback Bit | Feedback Bit Content |
| --- | --- | --- |
| 0-1 | 10 | Number of transmission beams in transmission beam group 0-1 |
| 2-3 | 00 | Number of transmission beams in transmission beam group 1-1 |
| 4-5 | 01 | Number of transmission beams in transmission beam group 2-1 |
| 6-12 | (0101) | Transmission beam index set in transmission beam group 0 |
| 13-16 | (0010) | Transmission beam index set in transmission beam group 1 |
| 17-22 | (0100) | Transmission beam index set in transmission beam group 2 |

For the feedback manner of the three transmission and receiving beam groups, a seventh feedback manner in the embodiment is that the receiving end and the transmitting end agree to feed back 3 groups and each group is represented by 10 bits. 30 bits are used to represent the three groups and each of 10 bits in each group corresponds to one transmission beam, a bit value of 0 indicates that no transmission beam is included in the group, and a bit value of 1 indicates that the transmission beams are included in the group. Alternatively, the bit value of 1 indicates that no transmission beam is included in the group, and the bit value of 0 indicates that the transmission beams are included in the group. The 30 bits are shown in table 15.

TABLE 15

| Feedback Bit Index | Feedback Bit | Feedback Bit Content |
| --- | --- | --- |
| 0-9 | 1101000000 | Group with index 0 |
| 10-19 | 0000010000 | Group with index 1 |
| 20-29 | 0010100000 | Group with index 2 |

In the above implementation modes, the transmitting end and the receiving end agree on the number of groups. If the number of groups is variable, information on the number of groups needs to be further included in the feedback information.

In FIG. 24a, the intersection set of every two groups is empty. A case where the intersection set of two groups is not empty is not excluded.

Specific Embodiment 10

An implementation process in the embodiment is similar to that in the specific embodiment 1. The feedback manner in step 4 is specifically described, where the feedback manner is used by a receiving end to feed back indication information of the selected resources and indication information of N first-type resource groups.

Figures 24C, 24D:
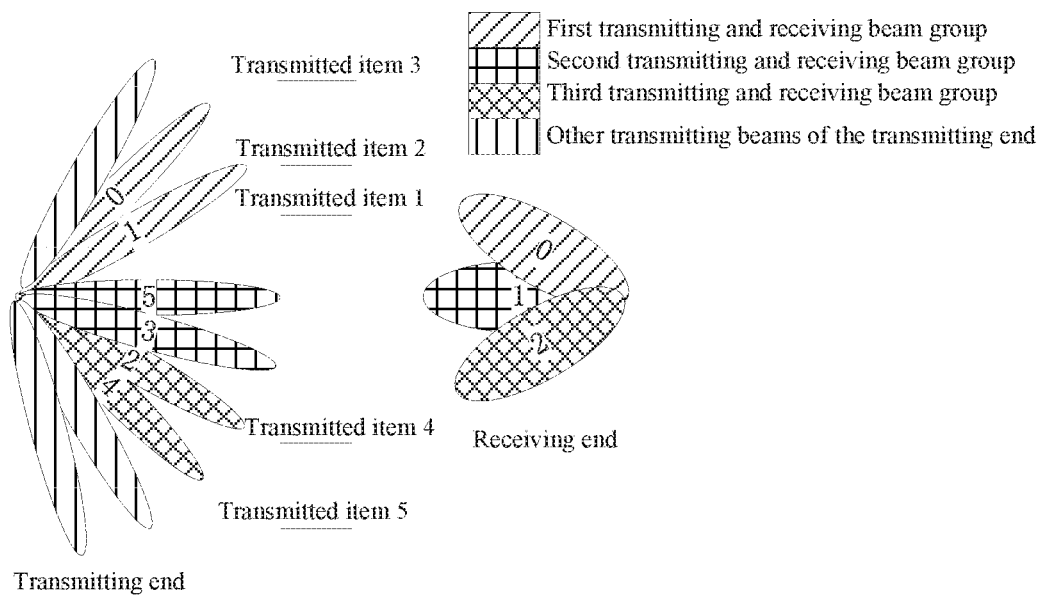
FIG. 24c is a diagram illustrating an example 6 of first-type resource groups according to an embodiment of the present invention.
FIG. 24d is a schematic diagram illustrating a signaling notification manner of second-type grouping indication information according to an embodiment of the present invention.

In the embodiment, a base station and a terminal agree that a number of transmission beams in each group is the same. For example, each group includes L transmission beams. As shown in FIG. 24c.

$$abbn = \left\lceil \log 2\left(\binom{TBN}{L}\right) \right\rceil$$

bits are needed for each group, where $$\binom{x}{y}$$

denotes a number of options of selecting y numbers from x number. As shown in FIG. 10, transmission and receiving beam pairs are shown in table 16.

TABLE 16

| Transmission and Receiving Beam Pair Index | (Transmission Beam Index, Receiving Beam Index) |
| --- | --- |
| 0 | (0, 0) |
| 1 | (1, 0) |
| 2 | (3, 1) |
| 3 | (5, 1) |
| 4 | (2, 2) |
| 5 | (4, 2) |

Each group is represented by abbi in the following formula, a transmission beam index set is $\{b_i-1, i=0, 1, \ldots, L-1\}$, $1 \leq b_i \leq TBN$ and $b_i < b_{i+1}$:

$$abbi = \sum_{i=0}^{L-1} \binom{TBN - b_i}{L - i}$$

where $$\binom{x}{y} = \begin{cases} \binom{x}{y}, & x \geq y \\ 0, & x < y \end{cases} \text{ and } \binom{x}{y}$$

denotes the number of options of selecting y numbers from x number.

As shown in table 2, in the embodiment, assuming that TBN=10 and L=2, the number of bits required for each group is $$\left\lceil \log 2\left(\binom{10}{2}\right) \right\rceil = 6$$

and the number of bits required for three groups is 3×6=18 bits.

In the above implementation modes, only indication information of the selected first-type resources and first-type resource groups is fed back. The corresponding CQI information and the like may be further fed back for each resource or each first-type resource group, which is not excluded in the present invention. Alternatively, specific CQI values are not fed back, but the resources in each first-type resource group are arranged in the order of CQI values, or the resources are arranged according to receiving performance. For example, a first resource in each group corresponds to best receiving performance, or the first resource in each group corresponds to worst receiving performance.

Specific Embodiment 11

An implementation process in the embodiment is similar to that in the specific embodiment 1. The feedback manner in step 4 is specifically described, where the feedback manner is used by a receiving end to feed back indication information of the selected resources and indication information of N first-type resource groups. The indication information of the selected resources and the indication information of N first-type resource groups are referred to as feedback information below.

In the embodiment, the number of the first-type groups and the number of resources in each first-type group may change in each feedback. The embodiment focuses on resources used by the receiving end to transmit the feedback information.

In a first implementation mode of the embodiment, a transmitting end and the receiving end agree on a maximum number of groups and a maximum number of resources in each group. The feedback resources are allocated according to a possible maximum value of the feedback information. For example, the feedback resources are PUCCHs, and the PUCCHs are allocated according to a maximum demand.

In a second implementation mode of the embodiment, the receiving end requests the feedback resources according to a practical amount of feedback information and the transmitting end allocates the corresponding feedback resources according to a quantity of feedback resources carried in request information. For example, when the receiving end determines that the current feedback information occupies 24 bits, the receiving end sends the request information to the transmitting end. The request information carries 24-bit information or information that 24 bits are within a length area. For example, the transmitting end and the receiving end agree that a number of bits in a length area 1 is within {1-15} and the number of bits in a length area 2 is within {16-30}, and the receiving end feeds back the length area 2. The transmitting end allocates the resources to the receiving end according to length-related information fed back by the receiving end, where the resources are used for transmitting the feedback information, and the receiving end sends the feedback information to the transmitting end on the allocated resources.

Figure 24E:
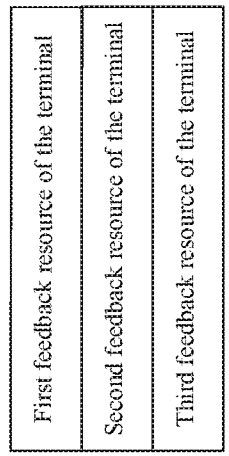
FIG. 24e is a diagram illustrating a mapping relationship between a number of first-type resource groups and feedback resources for transmitting first-type grouping indication information according to an embodiment of the present invention.

In a third implementation mode of the embodiment, the receiving end performs feedback by using multiple feedback resources, where the multiple feedback resources are allocated by the transmitting end to the receiving end. Each feedback resource has a flag at an end of the feedback resource, the flag indicates whether the first-type grouping indication information is fed back completely. If not, the receiving end continues to transmit the feedback information on subsequent feedback resources. Preferably, for example, if the number of first-type groups is 5, the feedback information is sent on 5 continuous feedback resources. The number of first-type groups is 3, and the feedback information is sent on three continuous feedback resources. The continuous feedback resources indicate that the feedback information is continuously sent on the multiple feedback resources allocated to the transmitting end. The multiple feedback resources may be discrete in time domain and are agreed by the transmitting end and the receiving end (of course, the following case is not excluded in the embodiment, higher-level feedback information is reported on some of the discontinuous PUCCH resources allocated to the receiving end are not excluded in the embodiment). As shown in FIG. 24e, the receiving end (such as the terminal) feeds back the grouping indication information on three uplink feedback resources and the grouping indication information on each feedback resource indicates whether the first-type grouping indication information is fed back completely. That is, there is a mapping relationship between the number of groups and resource information for transmitting the feedback information.

Specific Embodiment 12

In the embodiment, a transmitting end sends second-type grouping indication information as signaling information to a receiving end and the receiving end acquires a transmission parameter and/or a reception parameter corresponding to a transmission signal according to the second-type grouping indication information, and/or receives the parameter and then receives and demodulates a signal transmitted by the transmitting end. The second-type grouping indication information includes one or more of: information on a group index set, grouping manner indication information and information on resources included in a group. The group index set includes at least one group index. The second-type grouping indication information may be the signaling information transmitted by the transmitting end to the receiving end in a transmission phase after receiving the feedback information from the receiving end in the embodiment 2.

In the above implementation mode, the signaling information may be dynamic signaling information or semi-static signaling information. The transmission signal may be transmitted only for acquiring the transmission parameter and/or the reception parameter of a signal in a time unit (such as a subframe) where the signaling information is located, and the transmission signal may also be multiple time units which start from an interval Ntime0 after the time unit where the signaling information is located, where Ntime0 may be 0, indicating that the time unit where the signaling information is located is included. That is, the signaling information indicates that the transmitting end will switch the transmission parameter and/or the receiving end needs to switch the reception parameter. A switched parameter is applicable to at least one of the following transmission signals: a control channel, a data channel and a reference signal.

As shown in FIG. 24d, the second-type grouping indication information is indicated in a dynamic control domain, and the receiving end acquires data sent to the receiving end in a data domain according to the second-type grouping indication information.

The transmission parameter includes at least one of: a receiving manner for receiving the signal, an MCS set corresponding to the signal, a multiplexing manner set used by the signal, a length of a CP corresponding to the signal, a number of space division multiplexing layers used by the signal, demodulation reference signal port information used by the signal, quasi-co-located reference signal resource information corresponding to the signal, structural information corresponding to the signal. The structural information includes at least one of: a CP length of a start symbol of a time unit, an indication whether the start symbol of the time unit includes a synchronization signal and a CP length of a last symbol of the time unit. The signal is a transmission signal corresponding to the second-type grouping indication information. For example, in FIG. 24d, the transmission signal is data information of the receiving end in the data domain corresponding to the signaling information; or the transmission signal is the control channel corresponding to the signaling information; or the transmission signal is the reference signal corresponding to the signaling information, where the reference signal may be a measurement reference signal or a data demodulation reference signal.

A grouping manner includes at least one of: grouping according to a receiving resource corresponding to a resource, grouping according to a channel quality corresponding to the resource, grouping according to a recommended multiplexing manner, grouping according to a TA parameter, grouping according to a CP length, grouping according to a space division multiplexing manner, grouping according to a quasi-co-location relationship and grouping according to an uplink measurement reference signal transmitted by the receiving end. The receiving resource includes at least one of: a receiving beam, a receiving antenna, a receiving port, a receiving precoding matrix, receiving time, receiving frequency-domain resource, a receiving sector and a receiving sequence.

For example, the receiving end feeds back groups 0, 1 and 2, different groups correspond to different receiving manners, and the receiving end can only generate one receiving manner corresponding to one group at each time instant. The different groups correspond to different receiving manners, if grouping information indicates that a group index is 0, the receiving end receives the data in a receiving manner corresponding to a group 0. Equivalently, the second-type grouping indication information corresponds to receiving manner indication information or indication information of a receiving beam set.

For example, the receiving end feeds back the groups 0, 1 and 2, the different groups correspond to the different receiving manners, and the receiving end can generate receiving manners corresponding to all the groups at each time instant. The different groups correspond to the different receiving manners, if the grouping information indicates that the group index is 1 in the transmission phase after feedback, the receiving end receives the data in a receiving manner corresponding to a group 1. If the grouping information indicates a group index set {1, 2}, the receiving end receives the data in receiving manners corresponding to groups {1, 2}. For example, the groups a and 2 correspond to receiving antennas a and 2, the receiving end receives the data using the receiving antennas a and 2. Equivalently, the second-type grouping indication information corresponds to the receiving manner indication information or indication information of the receiving beam set or receiving antenna indication information.

For example, the receiving end feeds back the grouping information shown in table 7 and signals corresponding to the different groups has different arrival areas. As shown in FIG. 22b, if the grouping information indicates that the group index is 0 in the transmission phase, the transmitting end and the receiving end agree to use CP1. If the grouping information indicates that the group index set is {0, 3} in the transmission phase, the transmitting end and the receiving end agree to use 4CP1, that is, the receiving end obtains a CP length of the signal according to the grouping information.

After the transmitting end sends the second-type grouping indication information to the receiving end, the receiving end learns a quasi-co-located reference signal corresponding to the signal according to group index information, where the signal may be a demodulation reference signal or the measurement reference signal. A correspondence between the signal and the group index is established. The correspondence is agreed by the transmitting end and the receiving end. For example, one group index corresponds to one signal group which includes at least one signal. All signals in the one signal group may acquire a QCL characteristic by using resources included in the group index fed back by the receiving end. For example, a first-type group with index 0 which is fed back by the receiving end includes {measurement reference signal 0, measurement reference signal 1}, if the transmitting end indicates the group index 0 in the second-type grouping indication information, the receiving end may acquire QCL information of all signals in a signal group corresponding to the group index 0 by using the {measurement reference signal 0, measurement reference signal 1}. Specifically, the receiving end may acquire QCL information of all demodulation reference signals in a demodulation reference signal group corresponding to the group index 0 by using the {measurement reference signal 0, measurement reference signal 1} and/or the receiving end may acquire QCL information of all measurement reference signals in a measurement reference signal group (the measurement reference signal corresponds to the second-type grouping indication information) corresponding to the group index 0 by using the {measurement reference signal 0, measurement reference signal 1}.

After the transmitting end sends the second-type grouping indication information to the receiving end, the receiving end learns the demodulation reference signal port information corresponding to the signal according to the group index information. The demodulation reference signal port information includes a number of demodulation reference ports and demodulation reference ports. For example, one group index corresponds to one demodulation reference signal group and the correspondence is agreed by both parties. All demodulation reference signals in one demodulation reference signal group are quasi-co-located, and large-scale demodulation of the demodulation reference signals may be jointly obtained. Other transmission parameters and reception parameters are acquired according to the grouping information in manners as described above, which are not repeated here. Furthermore, if there are multiple grouping manners and each grouping manner corresponds to different grouping indication information. The grouping manner may be further notified in the grouping information so that the receiving end obtains the transmission parameter and/or the reception parameter by using correspondences between the group index and the transmission parameter and/or the reception parameter in a corresponding grouping manner.

The grouping information in FIG. 24d is notified and acquired by dynamic signaling. A case where the grouping information is notified by semi-static higher-layer signaling or a system message is not excluded in the present invention. Alternatively, signaling notification and agreed rules may be combined. In FIG. 24d, a position of the grouping information in the control domain is only an example and other occupation manners are not excluded in the present invention. The occupation of a data signal of the receiving end in the data domain is also only an example and other occupation manners are not excluded.

In the above implementation modes, the correspondences between the group index and the transmission parameter and/or the reception parameter are obtained through feedback information fed back by the receiving end. The feedback information includes first-type grouping indication information. The transmitting end and the receiving end obtain the correspondences by acquiring the second-type grouping indication information according to the first-type grouping indication information according to an agreed rule. A case where the correspondences between the group index and the transmission parameter and/or the reception parameter are pre-agreed by both parties is not excluded in the embodiment. Specifically, in a first manner, a correspondence between the group index and the transmission parameter and/or a correspondence between the group index and the reception parameter are obtained according to the first-type grouping indication information fed back by the receiving end. In a second manner, the transmitting end transmits the correspondences to the receiving end. In a third manner, the transmitting end obtains the correspondences according to the uplink measurement reference signal sent by the receiving end. Specifically, in a third implementation mode, the transmitting end (such as a base station) indicates the group index such as an index of the uplink measurement reference signal in the second-type grouping indication information according to groups of uplink measurement reference signals sent by the terminal. For example, the receiving end (such as the terminal) sends Nup uplink measurement reference signals (such as an SRS or other equivalent names), where N is an integer greater than or equal to 1. The transmitting end (such as the base station) sends the second-type grouping indication information to the terminal, where the second-type grouping indication information includes indexes of Mup measurement reference signals in the Nup uplink measurement reference signals, where Mup is an integer less than or equal to Nup. The terminal obtains, according to the indexes of Mup measurement reference signals, the following information: a receiving manner for receiving a signal sent by the base station and a transmission manner for transmitting a signal to the base station. For example, the signal sent by the base station is received in a receiving manner obtained according to a transmission manner of the uplink measurement reference signal, (for example, uplink and downlink reciprocity is used). The uplink measurement reference signal includes one of: an uplink demodulation reference signal, an SRS signal, an uplink CSI-RS or other equivalent names. In short, the uplink measurement reference signal is a channel measurement reference signal transmitted by the terminal to the base station.

In another implementation mode of the embodiment, the second-type grouping indication information sent by the transmitting end includes the information on the resources included in the group. The information on the resources is information on reference signals. The reference signals include one of: the demodulation reference signal and the measurement reference signal. Preferably, resources in a same group have a same channel characteristic and/or quasi-co-location information.

In an implementation mode of the embodiment, the transmitting end indicates the group index and the receiving end obtains measurement reference signal-related configuration according to the group index, for example, a port number of the measurement reference signal, a number of ports and the like are obtained according to the group index. Alternatively, the group index and the information on the resources included in the group are notified so that the receiving end may perform further beam training.

The QCL information may also be channel characteristic information or other equivalent nouns. The channel characteristic information or the QCL information includes at least one of the following information of a reference signal: Doppler spread, Doppler shift, an average gain, an average delay, average angle spread and an angle-of-arrival. Alternatively, two quasi co-located resources mean that large-scale information obtained with one resource may be used for large-scale information of the other resource. The large-scale information includes at least one of Doppler spread, Doppler shift, the average gain, the average delay, average angle spread and an angle-of-arrival.

In another implementation mode of the embodiment, the second-type grouping indication information is not notified by signaling but in a manner of being multiplexed with another signal such as notification by a sequence. For example, the second-type grouping indication information is implicitly notified through a port of the reference signal or a scrambling manner.

Specific Embodiment 13

The embodiment is similar to the specific embodiment 12. However, in the specific embodiment 12, a terminal acquires a transmission parameter and/or a reception parameter corresponding to a signal transmitted by a base station according to second-type grouping indication information transmitted by the base station. In the embodiment, the terminal obtains a transmission parameter of an uplink signal transmitted by the terminal to the base station and/or a reception parameter and/or a transmission parameter for receiving the signal transmitted by the base station according to the second-type grouping indication information transmitted by the base station.

In a first implementation mode of the embodiment, a transmitting end (such as the base station) groups downlink transmission beams according to an uplink measurement reference signal transmitted by the terminal, indicates a group index such as an index of the uplink measurement reference signal in the second-type grouping indication information. Specifically, a receiving end (such as the terminal) sends Nup uplink measurement reference signals (such as an SRS or other equivalent names), where N is an integer greater than or equal to 1. The transmitting end (such as the base station) sends the second-type grouping indication information to the terminal, where the second-type grouping indication information includes indexes of Mup measurement reference signals in the Nup uplink measurement reference signals, where Mup is an integer less than or equal to Nup. The terminal obtains, according to the indexes of Mup measurement reference signals, the following information: a receiving manner for receiving a signal sent by the base station and a transmission manner for transmitting a signal to the base station. For example, the signal sent by the base station is received in a receiving manner obtained according to a transmission manner of the uplink measurement reference signal, (for example, uplink and downlink reciprocity is used) and the signal is sent to the base station in the transmission manner of the uplink measurement reference signal. The uplink measurement reference signal includes one of: an uplink demodulation reference signal, an SRS signal, an uplink CSI-RS or other equivalent names. In short, the uplink measurement reference signal is a channel measurement reference signal transmitted by the terminal to the base station.

In a second implementation mode of the embodiment, the terminal groups measurement reference signals sent by the base station according to receiving resources, obtains information on N first-type groups, and feeds back first-type grouping indication information to the base station. According to the uplink and downlink reciprocity, the base station considers that an optimal downlink receiving beam of the terminal is an optimal uplink transmission beam and/or an optimal transmission beam of the base station corresponding to a downlink of the terminal is an optimal receiving beam used by the base station to receive the signal transmitted by the terminal in an uplink. Therefore, group index information in the second-type grouping indication information notifies the terminal of at least one of: the receiving manner for receiving the signal sent by the base station (the signal sent by the base station is received in a receiving manner corresponding to the group index) and the transmission manner for transmitting the signal to the base station (an uplink signal is transmitted to the base station in a transmission manner obtained using the uplink and downlink reciprocity according to the receiving manner corresponding to the group index).

In the embodiment, the signal sent to the base station includes: a data channel signal, a control channel signal and a reference signal such as a measurement reference signal (such as an SRS), a demodulation reference signal and a resource request reference signal.

Specific Embodiment 14

In the embodiment, a first-type resource group or a second-type resource group may be embodied in an implicit manner.

For example, the first-type resource group is associated with a process. Specifically, the process includes a channel state information (CSI) process or a CSI subprocess. One CSI process includes one or more CSI subprocesses.

The first-type resource groups are divided according to the process. Preferably, resources corresponding to resource indexes fed back in a same process belong to a same group and correspond to one Rx beam setting. A terminal may select the process and report indication information of one or more processes. Alternatively, resources corresponding to resource indexes fed back in a same process group belong to a same group and correspond to one Rx beam setting. The terminal may select the process group and report indication information of one or more process groups. The first-type resource groups are divided according to the subprocess or threads. Preferably, resources corresponding to resource indexes fed back in a same subprocess/threads belong to a same group and correspond to one Rx beam setting. The terminal may select the subprocess/threads and report indication information of one or more processes. Alternatively, resources corresponding to resource indexes fed back in a same subprocess/threads group belong to a same group and correspond to one Rx beam setting. The terminal may select the subprocess/threads group and report indication information of one or more subprocess/threads groups.

The first-type resource group is associated with a set. The set includes at least one of CSI reporting settings (a CSI reporting set), Resource settings (a resource set), CSI measurement settings (a CSI measurement set) and links (a link set). The CSI measurement set includes one or more links, each of which is used for establishing a relationship between the resource set and the CSI reporting set. Preferably, one link includes one resource set and one CSI reporting set.

Specifically, for example, one first-type resource group (or second-type resource group) correspond to one link and the terminal may select one or more links from multiple links to report the one or more links.

Figure 24F:
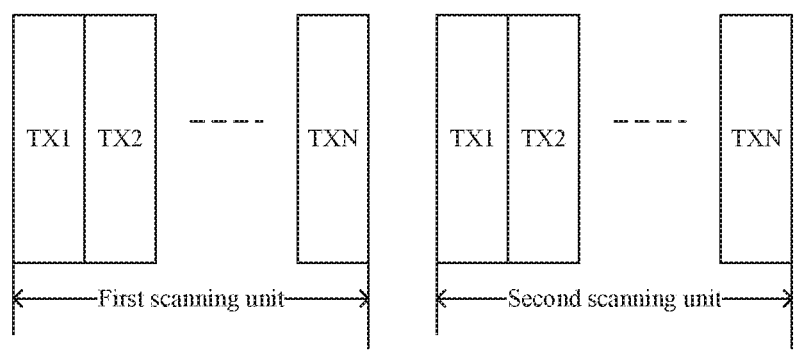
FIG. 24f is a diagram illustrating an example 1 in which a receiving resource or a receiving manner is a time domain resource according to an embodiment of the present invention.
Figure 24G:
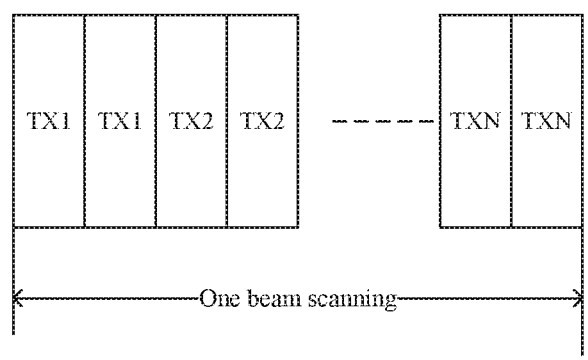
FIG. 24g is a diagram illustrating an example 2 in which a receiving resource or a receiving manner is a time domain resource according to an embodiment of the present invention.

In an optional implementation mode of the embodiment, one first-type resource group corresponds to one Rx beam setting and a base station configures multiple Rx beam settings in at least one of the above sets (the CSI reporting set, the resource set, the CSI measurement set and the link set), or the base station and the terminal agree the multiple Rx beam settings. The terminal selects one or more Rx beam settings from the multiple Rx beam settings for reporting. Specifically, for example, the base station configures one or more Rx beam settings for one RS resource and the terminal selects from the multiple Rx beam settings. Alternatively, the base station and the terminal agree that one RS resource corresponds to multiple Rx beam setting and the terminal selects from the multiple Rx beam settings. A receiving manner or a receiving resource in the embodiments of the present invention includes at least one of: a receiving beam, a receiving antenna, a receiving port, a receiving precoding matrix, receiving time, receiving frequency-domain resource, a receiving sector and a receiving sequence. A transmission manner or a transmission resource includes at least one of: a transmission beam, a transmission antenna, a transmission port, a transmission precoding matrix, transmission time, transmission frequency domain, a transmission sector and a transmission sequence. The receiving manner is the receiving time, which indicates that a transmitting end repeatedly transmits a same transmission beam multiple times so that a receiving end may search receiving beams. At this time, different receiving beams correspond to indexes in repetition times. Specifically, as shown in FIG. 24f, the transmitting end repeatedly transmits the same transmission beam twice. A first scanning unit corresponds to a first receiving manner, a second scanning unit corresponds to a second receiving manner, and the receiving end feeds back one first-type resource group for each scanning unit. Alternatively, which scanning unit is notified in the first-type resource group. Alternatively, two repetitions of the same transmission beam are considered as different logical numbers in logical beam numbers. In this case, the receiving end only needs to group logical beams, For example, 2N*x1 logical beams are formed in 2N time domain units in FIG. 24f or 2N*x1 logical beams are formed in 2N time domain units in FIG. 24g, where x1 is a number of beam ports included in each time domain unit. The transmitting end periodically transmits a measurement reference signal and the receiving end switches receiving beams at different periods. When the logical beams are numbered in a same scanning unit, the receiving end groups the logical beams according to the receiving beams.

In the embodiment, data in a transmission phase after feedback includes traffic data and/or a reference signal.

In the embodiment, it may be agreed that only one resource is included in each first-type resource group.

In the embodiment, the measurement reference signal may also be a beam reference signal (BRS), a beam refinement reference signal (BRRS) or other equivalent names. In short, the measurement reference signal is a reference signal of a measurement channel state which includes a beam state. Specific names are not intended to limit the present invention.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation mode. Based on this understanding, the solutions provided by the present invention substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the methods according to each embodiment of the present invention.

The embodiments of the present invention further provide a device for feeding back grouping indication information, a device for acquiring a signal parameter, a signal transmission device and a device for transmitting a signal parameter, which are used for implementing the above-mentioned embodiments and preferred embodiments. What has been described will not be repeated. As used below, the term "module" may be software, hardware or a combination thereof capable of implementing predetermined functions. The devices in the embodiments described below are preferably implemented by software, but implementation by hardware or by a combination of software and hardware is also possible and conceived.

Figure 25:
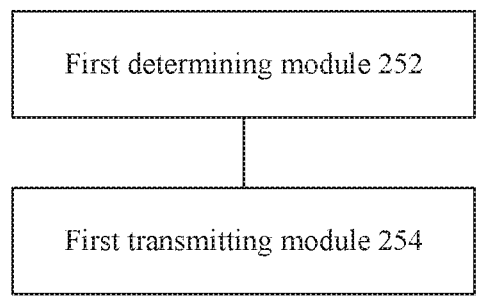
FIG. 25 is a block diagram of a device for feeding back first-type grouping indication information according to an embodiment of the present invention.

FIG. 25 is a block diagram of a device for feeding back grouping indication information according to an embodiment of the present invention. As shown in FIG. 25, the device includes a first determining module 252 and a first transmitting module 254. The device is described below.

The first determining module 252 is configured to determine M resources from a candidate resource set and divide the M resources into N first-type resource groups, where M is an integer greater than or equal to 1 and N is a positive integer less than or equal to M. The first transmitting module 254 is configured to feed back indication information for indicating the M resources and first-type grouping indication information for indicating that the M resources are divided into the N first-type resource groups to a first communication node.

In an optional embodiment, the first determining module 252 may determine the M resources from the candidate resource set in the manners described below. The candidate resource set is determined, where the candidate resource set includes Q second-type resource groups, where Q is an integer greater than or equal to 1. A transmission signal transmitted on the candidate resource set is received. The M resources are determined from the candidate resource set according to the received transmission signal.

In an optional embodiment, the Q second-type resource groups in the candidate resource set are divided according to at least one of the following resource types: a beam resource, an antenna resource, a port resource, a frequency domain resource, a transmission sequence resource and a time domain resource. In the embodiment, different beam resources may be different second-type resource groups; different port resources may be different second-type resource groups; or different time/frequency resources may be different second-type resource groups; different sequence resources may be different second-type resource groups; different beam and port resources may be different second-type resource groups; or different beam and time/frequency resources may be different second-type resource groups. Optionally, the above resources are used for at least one of: receiving/transmitting a synchronization signal, receiving/transmitting a data signal, receiving/transmitting a control signal and receiving/transmitting a pilot signal.

In an optional embodiment, the first determining module 252 may determine the M resources from the candidate resource set by determining the M resources from the candidate resource set according to a channel quality and/or a signal quality of each resource in the candidate resource set.

In an optional embodiment, at least one of the following is included: resources in a same first-type resource group belong to one or more of the Q second-type resource groups, for example, one Channel State Information-Reference Signal (CSI-RS) resource corresponds to one second-type resource group and multiple ports in the one CSI-RS resource correspond to resources included in the one second-type resource group; the resources in the same first-type resource group may be composed of ports in one or more CSI-RS resources. Preferably, different CSI-RS resources correspond to different transmission nodes and different ports in a same CSI-RS resource may correspond to different transmission beams of the transmission node. Resources in a same second-type resource group belong to one or more of the N first-type resource groups. For example, assuming that transmission beams {1, 2, 3, 4, 5} constitute the candidate resource set and each transmission beam is one second-type resource group, when the transmission beams are divided into two first-type resource groups, transmission beams {1, 2, 3} may be one first-type resource group and transmission beams {1, 4, 5} may be the other first-type resource group. In this case, a transmission beam may correspond to multiple first-type resource groups. An intersection set of different resource groups among the N first-type resource groups is not an empty set.

In an optional embodiment, the first transmitting module 254 may divide the M resources into the N first-type resource groups in at least one of the following manners: dividing the M resources into the N first-type resource groups according to receiving resources corresponding to the M resources; dividing the M resources into the N first-type resource groups according to a signal quality on each of the M resources or a channel quality corresponding to the each of the M resources; dividing the M resources into the N first-type resource groups according to a predetermined multiplexing manner; dividing the M resources into the N first-type resource groups according to a timing advance (TA) parameter; dividing the M resources into the N first-type resource groups according to a length of a cyclic prefix (CP); dividing the M resources into the N first-type resource groups according to a quasi-co-location relationship; dividing the M resources into the N first-type resource groups according to grouping configuration information; and dividing the M resources into the N first-type resource groups according to a channel characteristic. In the embodiment, the predetermined multiplexing manner may include a recommended multiplexing manner, may also include a general multiplexing manner, and may also include a space multiplexing manner.

In an optional embodiment, the first transmitting module 254 may divide the M resources into the N first-type resource groups according to the predetermined multiplexing manner by dividing the M resources into the N first-type resource groups according to the space division multiplexing manner, where resources not supporting space division multiplexing are grouped into a same first-type resource group, resources supporting the space division multiplexing are grouped into different first-type resource groups, and a number of first-type resource groups is greater than or equal to a maximum number of space division multiplexing layers; or the resources supporting the space division multiplexing are grouped into a same first-type resource group, the resources not supporting the space division multiplexing are grouped into different first-type resource groups, and a number of space division multiplexing layers of the resources in the same first-type resource group is less than or equal to a number of resources in the same first-type resource group.

In an optional embodiment, at least one of the characteristics described below is further included. Resources in a same first-type resource group have same one or more types of receiving resources, or the resources in the same first-type resource group have one or more types of receiving resources, which have a difference less than a predetermined threshold (for example, a correlation between receiving sequences is less than an agreed threshold and/or a correlation between receiving beams is less than the agreed threshold). The receiving resources include at least one of: a receiving antenna resource, a receiving port resource, a receiving weight resource, a receiving sector resource, a receiving sequence resource, a receiving time domain resource, a receiving frequency-domain resource and a receiving beam resource Channel qualities corresponding to the resources in the same first-type resource group have a difference less than or equal to a threshold R1, and channel qualities corresponding to resources in different first-type resource groups have a difference greater than a threshold R2, where R1 or R2 is pre-agreed with the first communication node (R1 or R2 may be pre-agreed by the first communication node and the second communication node) or configured by signaling from the first communication node (R1 and R2 may be the same). Receiving signal qualities corresponding to the resources in the same first-type resource group have a difference less than or equal to a threshold r1, and receiving signal qualities corresponding to the resources in different first-type resource groups have a difference greater than a threshold r2, where r1 or r2 is pre-agreed with the first communication node or configured by signaling from the first communication node (r1 and r2 may be the same). A multiplexing manner set used for transmitting signals on the resources in the same first-type resource group is a set A, and a multiplexing manner set used for transmitting the signals on the resources in different first-type resource groups is a set B, where the set B is a true subset of the set A or the set A is a true subset of the set B (the set A and the set B are different sets). TA parameters used for transmitting the signal on the resources in the same first-type resource group have a difference less than or equal to a threshold T1, and TA parameters used for transmitting the signal on the resources in different first-type resource groups have a difference greater than a threshold T2, where T1 or T2 is pre-agreed with the first communication node or configured by signaling from the first communication node or determined according to a configuration of the CP (T1 and T2 may be the same). The CP length used for transmitting the signal on the resources in the same first-type resource group is less than or equal to t1, and the CP length used for transmitting the signal on the resources in different first-type resource groups is greater than t2, where t1 or t2 is pre-agreed with the first communication node or configured by signaling from the first communication node (t1 and t2 may be the same). The resources in different first-type resource groups correspond to different CP lengths. The resources in the same first-type resource group correspond to a same CP length. Transmission signals corresponding to the resources in the same first-type resource group are not allowed to be space division multiplexed. Transmission signals corresponding to the resources in different first-type resource groups are allowed to be space division multiplexed. The number of first-type resource groups is equal to a maximum number of transmission layers in space division multiplexing. The transmission signals corresponding to the resources in the same first-type resource group are quasi-co-located. The resources in the same first-type resource group have a same channel characteristic. A channel characteristic of a resource in each of the N first-type resource groups is acquirable according to a channel characteristic of another resource in the each of the N first-type resource groups.

In an optional embodiment, at least one of the characteristics described below is included. The grouping configuration information includes at least one of: grouping restriction indication information, a threshold parameter for determining groups and a parameter for determining a grouping rule; and the grouping configuration information is configured by signaling from the first communication node or pre-agreed with the first communication node. The transmission signals corresponding to the resources in the same first-type resource group are allowed to be space division multiplexed. The transmission signals corresponding to the resources in different first-type resource groups are not allowed to be space division multiplexed. A number of space division multiplexing layers of the transmission signals corresponding to the resources in the same first-type resource group is less than or equal to a number of resources in the same first-type resource group.

In an optional embodiment, the grouping restriction indication information includes the following: a number of resources in the same first-type resource group is less than or equal to a, and the number N of first-type resource groups is less than or equal to b, where both a and b are natural numbers greater than or equal to 1; or the number of resources in the same first-type resource group is a fixed number a, and the number N of first-type resource groups is a fixed number b, where both a and b are the natural numbers greater than or equal to 1.

In an optional embodiment, the device further includes an agreeing module. The agreeing module is configured to agree with the first communication node that the N first-type resource groups have at least one of the characteristics described below. The same first-type resource group corresponds to a same set of TA parameters. The same first-type resource group corresponds to a same set of CP parameters. When different resources are transmitted simultaneously, CP lengths corresponding to the different resources are determined according to a maximum value of absolute values of differences of resource group indexes of first-type resource groups corresponding to the different resources. Different first-type resource groups correspond to different CP parameters. Resources in the same first-type resource group corresponds to a same receiving resource. Different first-type resource groups correspond to different receiving resources, and the different receiving resources are generated in a time division manner (the different receiving resources corresponding to the different first-type resource groups may be generated in the time division manner by the second communication node which may perform the steps of determining the M resources and feeding back the indication information for indicating the M resources and the first-type grouping indication information for indicating that the M resources are divided into the N first-type resource groups to the first communication node). At least one type of channel or signal state parameter corresponding to the same first-type resource group is the same. The resources in the same first-type resource group are allowed to be frequency division multiplexed and/or space division multiplexed and/or time division multiplexed (a time division multiplexing manner is preferable for the same first-type resource group). The resources in different first-type resource groups do not support frequency division multiplexing or space division multiplexing and only support time division multiplexing. The resources in the same first-type resource group correspond to a same index indication parameter.

In an optional embodiment, channel parameters being the same or signal state parameters being the same includes at least one of: rank indicators (RI) being the same; reference signal received powers (RSRP) being the same; channel quality indications (CQI) being the same; receiving signal-to-noise ratios (SNR) being the same; precoding matrix indicators (PMI) being the same; and channel reference signals (CRI) being the same, and/or a same index corresponding to the resources in the same first-type resource group includes at least one of: a receiving beam index, a receiving sector index, a receiving antenna index, a receiving sequence index, a receiving port index and a receiving beam combination index.

In an optional embodiment, the agreeing module is further configured to agree with the first communication node on the following characteristic: a capability of simultaneously generating receiving manners corresponding to all the N first-type resource groups is possessed.

In an optional embodiment, the agreeing module is further configured to agree with the first communication node that the N first-type resource groups have one of the characteristics described below. The resources in the same first-type resource group are not allowed to be space division multiplexed, the resources in different first-type resource groups are allowed to be space division multiplexed, and the maximum number of space division multiplexing layers is equal to the number of first-type resource groups. The resources in the same first-type resource group are allowed to be space division multiplexed, the resources in different first-type resource groups are not allowed to be space division multiplexed, and the number of space division multiplexing layers of the resources in the same first-type resource group is less than or equal to the number of resources in the same first-type resource group.

In an optional embodiment, at least one of the characteristics described below is included. In the first-type grouping indication information, resources in each of the N first-type resource groups are sequentially arranged according to receiving qualities of the resources. The first-type grouping indication information includes at least one of: the number of the groups, indication on resources in each of the N first-type resource groups, information on a number of resources in each of the N first-type resource groups, grouping manner indication information, group index information and information on a common parameter corresponding to each of the N first-type resource groups. The first-type grouping indication information includes a plurality of levels of groups. The first-type grouping indication information includes two levels of groups and one first-level group includes a plurality of second-level groups, where the second communication node configured to divide the M resources into the N first-type resource groups has a capability of simultaneously generating receiving resources corresponding to different first-level groups or all first-level groups and generating, in a time division manner, different receiving resources corresponding to the plurality of second-level groups in a same first-level group, or a capability of generating, in the time division manner, receiving resources corresponding to resources in the different first-level groups and simultaneously generating receiving resources correspond to different second-level groups or all second-level groups included in the same first-level group. In an optional embodiment, at least one of the characteristics described below is included.

The number of the groups information has a mapping relationship with information on resources for transmitting the indication information and the first-type grouping indication information. The information on the resources in each of the N first-type resource groups, where the information on the resources includes at least one of: index information of the resources in the candidate resource set and CQI information corresponding to each of the resources. The common parameter corresponding to each of the N first-type resource groups includes at least one of the following parameters: a CP length corresponding to each of the N first-type resource groups, a PMI corresponding to each of the N first-type resource groups, an RI corresponding to each of the N first-type resource groups, a CQI corresponding to each of the N first-type resource groups, a TA parameter corresponding to each of the N first-type resource groups, a quasi-co-location parameter corresponding to each of the N first-type resource groups, and a receiving resource corresponding to each of the N first-type resource groups. A resource index set of resources in a j-th first-type resource group in the first-type grouping indication information is $\{b_{i,j}-1, i=0, 1, \ldots, Lj-1\}$, where $1 \leq b_{i,j} \leq TBN$, $b_{i,j} < b_{i+1,j}$, the resource index set is denoted with $$\left\lceil \log 2 \binom{TBN}{Lj} \right\rceil$$

bits, a value of the $$\left\lceil \log 2 \binom{TBN}{Lj} \right\rceil$$

bits is $$abbi = \sum_{i=0}^{Lj-1} \binom{TBN-b_i}{Lj-i},$$

where $$\binom{x}{y} = \begin{cases} \binom{x}{y}, & x \geq y \\ 0, & x < y \end{cases},$$

TBN is a total number of resources in the candidate resource set, $0 \leq j \leq N-1$, N is a number of first-type resource groups, Lj is a number of resources in the j-th first-type resource group and $$\binom{A}{B}$$

denotes a number of different combinations of selecting B numbers from A number.

In an optional embodiment, N satisfies one of the following characteristics: N is a first agreed value; and N is less than or equal to N_max, where N_max is a second agreed value (which may a value agreed by the first communication node and the second communication node).

In an optional embodiment, the device further includes a feedback module. The feedback is configured to feed back a maximum number of simultaneously generatable different receiving resources corresponding to different first-type resource groups to the first communication node.

In an optional embodiment, the resources in the candidate resource set are used for at least one of: receiving and/or transmitting the synchronization signal; receiving and/or transmitting the data signal; receiving and/or transmitting the control signal; and receiving and/or transmitting the pilot signal.

In an optional embodiment, different first-type resource groups include a same number of resources or different numbers of resources.

In an optional embodiment, one of the characteristics described below is included. The resources in the same first-type resource group are not allowed to be space division multiplexed and the resources in different first-type resource groups are allowed to be space division multiplexed. The resources in the same first-type resource group are allowed to be space division multiplexed and the resources in different first-type resource groups are not allowed to be space division multiplexed.

In an optional embodiment, one of the characteristics described below is included. A maximum number of space division multiplexing layers available to the resources in the same first-type resource group is less than or equal to a maximum number of space division multiplexing layers available to the resources in different first-type resource groups. The maximum number of space division multiplexing layers available to the resources in the same first-type resource group is greater than or equal to the maximum number of space division multiplexing layers available to the resources in different first-type resource groups. The maximum number of space division multiplexing layers available to the resources in the same first-type resource group is less than the maximum number of space division multiplexing layers available to the resources in different first-type resource groups. The maximum number of space division multiplexing layers available to the resources in the same first-type resource group is greater than the maximum number of space division multiplexing layers available to the resources in different first-type resource groups.

In an optional embodiment, one of the characteristics described below is included. The resources in the same first-type resource group support simultaneous reception. The resources in different first-type resource groups do not support simultaneous reception. The resources in the same first-type resource group support simultaneous reception and the resources in different first-type resource groups do not support simultaneous reception. The resources in the same first-type resource group support simultaneous reception and the resources in different first-type resource groups support simultaneous reception.

In an optional embodiment, the device included one of the manners described below. The resources in different first-type resource groups do not support simultaneous reception. The resources in the same first-type resource group do not support simultaneous reception. The resources in different first-type resource groups support simultaneous reception and the resources in the same first-type resource group do not support simultaneous reception. The resources in different first-type resource groups support simultaneous reception and the resources in the same first-type resource group support simultaneous reception.

In an optional embodiment, the device includes at least one of the following manners: the N first-type resource groups are associated with a channel measurement related process; and the N first-type resource groups are associated with a channel measurement related set.

In an optional embodiment, the channel measurement related process is a channel state information (CSI) process; and the channel measurement related set includes at least one of a CSI reporting set (CSI reporting settings), a resource set (Resource settings), a CSI measurement set (CSI measurement settings), a link set (link settings), and a reference signal (RS) set (RS settings), where the CSI measurement set includes one or more links, each of which is used for establishing a relationship between the resource set and the CSI reporting set.

Figure 26:
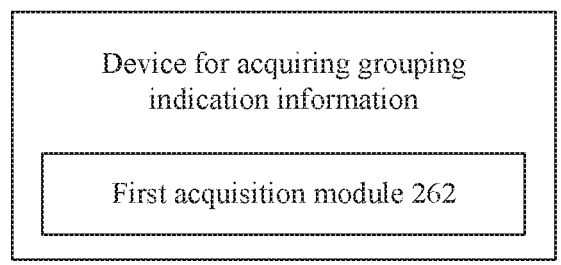
FIG. 26 is a block diagram of a device for acquiring second-type grouping indication information according to an embodiment of the present invention.

FIG. 26 is a block diagram of a device for acquiring grouping indication information according to an embodiment of the present invention. As shown in FIG. 26, the device includes a first acquisition module 262. The device is described below.

The first acquisition module 262 is configured to acquire second-type grouping indication information. The second-type grouping indication information includes at least one of: information on a group index set, grouping manner indication information, information on resources in a group, where the group index set includes at least one group index.

In an alternative embodiment, the device further includes a first processing module. The first processing module is configured to determine a transmission parameter and/or a reception parameter of a signal corresponding to the second-type grouping indication information according to the second-type grouping indication information.

In an alternative embodiment, the signal includes at least one of a control channel signal, a data channel signal and a reference signal.

In an alternative embodiment, the first acquisition module 262 may acquire the second-type grouping indication information in at least one of the manners described below. The second-type grouping indication information is acquired according to a rule agreed with the first communication node. Semi-static signaling is received and the second-type grouping indication information is acquired from the semi-static signaling. Dynamic signaling is received and the second-type grouping indication information is acquired from the dynamic signaling. A system message is received and the second-type grouping indication information is acquired from the system message.

In an alternative embodiment, the first acquisition module 262 may determine the transmission parameter and/or the reception parameter of the signal corresponding to the second-type grouping indication information in the manners described below. A correspondence pre-agreed with the first communication node is determined. The correspondence is a correspondence between the second-type grouping indication information and the transmission parameter and/or the reception parameter. The transmission parameter and/or the reception parameter are determined according to the correspondence and the second-type grouping indication information.

In an alternative embodiment, the correspondence between the second-type grouping indication information and the transmission parameter and/or the reception parameter is included in first-type grouping indication information fed back to a first communication node.

In an alternative embodiment, the transmission parameter includes at least one of: an MCS set corresponding to the signal, a multiplexing manner used by the signal, a length of a cyclic prefix (CP) corresponding to the signal, a number of space division multiplexing layers used by the signal, demodulation reference signal port information used by the signal, quasi-co-located reference signal resource information corresponding to the signal, structural information corresponding to the signal, a channel characteristic reference signal corresponding to the signal and a transmission manner corresponding to the signal; where the structural information includes at least one of: a CP length of a start symbol of a time unit, information indicating whether the start symbol of the time unit includes a synchronization signal, and a CP length of a last symbol of the time unit; and/or the reception parameter includes a receiving resource for receiving the signal. Optionally, the receiving resource includes at least one of: a receiving port, a receiving antenna, a receiving beam, a receiving precoding weight, receiving time, receiving frequency-domain resource, a receiving sector and a receiving sequence.

In an alternative embodiment, a grouping manner indicated by the second-type grouping indication information includes at least one of: grouping according to a receiving resource corresponding to each of resources in a candidate resource set, grouping according to a channel quality corresponding to each of the resources in the candidate resource set, grouping according to a predetermined multiplexing manner, grouping according to a timing advance (TA) parameter, grouping according to a cyclic prefix (CP) length, grouping according to a space division multiplexing manner, grouping according to a quasi-co-location relationship, grouping according to a transmitted measurement reference signal, and grouping according to a channel characteristic.

In an alternative embodiment, the receiving resource includes at least one of: the receiving beam, the receiving antenna, the receiving port, a receiving precoding matrix, the receiving time, the receiving frequency-domain resource, the receiving sector and the receiving sequence.

In alternative embodiment, the information on the resources in the group includes resource information of the reference signal. The reference signal includes at least one of: a demodulation reference signal and a measurement reference signal.

In an alternative embodiment, resources in a same group have a same channel characteristic and/or quasi-co-location information.

In an alternative embodiment, a correspondence exists between the at least one group index and port information of the measurement reference signal transmitted by a second communication node. The second communication node acquires the second-type grouping information.

Figure 27:
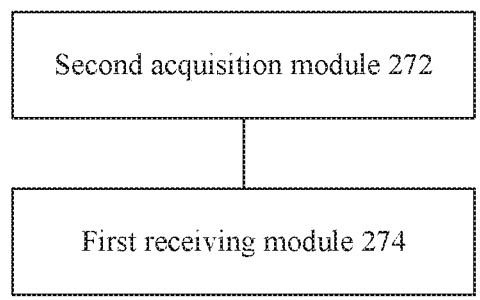
FIG. 27 is a block diagram of a signal receiving device according to an embodiment of the present invention.

FIG. 27 is a block diagram of a signal receiving device according to an embodiment of the present invention. As shown in FIG. 27, the device includes a second acquisition module 272 and a first receiving module 274. The device is described below.

The second acquisition module 272 is configured to acquire third-type grouping indication information. The first receiving module 274 is connected to the second acquisition module 272 and configured to receive a demodulation reference signal and/or a control channel according to the third-type grouping indication information.

In an alternative embodiment, the third-type grouping indication information includes at least one of: the number of the groups, indication on resources in each group, information on a number of resources in each group, grouping manner indication information and group index information.

In an alternative embodiment, the second acquisition module 272 may acquire the third-type grouping indication information in at least one of the manners described below. Feedback information is acquired according to a signal transmitted by a first communication node, where the feedback information includes the third-type grouping indication information. A second communication node may receive the signal transmitted by the first communication node, acquire the feedback information and feed back the feedback information to the first communication node. The third-type grouping indication information is acquired according to a rule agreed with the first communication node. Signaling information is received, where the signaling information includes the third-type grouping indication information. The receiving the signaling information may include receiving the third-type grouping indication information transmitted by semi-static signaling, receiving the third-type grouping indication information transmitted by dynamic signaling, and receiving the third-type grouping indication information transmitted through a system message.

In an alternative embodiment, the first receiving module may receive the demodulation reference signal and/or the control channel in the manner described below. According to the third-type grouping indication information, the demodulation reference signal and/or the control channel are received on time division multiplexed N1 resources, where N1=x×N or N1 is less than or equal to N, where N1 is an integer greater than 0, N is a number of third-type groups included in the third-type grouping indication information and x is an integer greater than or equal to 1.

In an alternative embodiment, the demodulation reference signal and/or the control channel are received on the N1 resources for transmitting the demodulation reference signal by using a receiving resource in a receiving resource set. One or more receiving resources are selected from the receiving resource set according to a certain rule, and data and/or a control signal and/or a reference signal subsequent to the demodulation reference signal are received according to the selected one or more receiving resources.

In an alternative embodiment, the device further includes a second processing module. The second processing module is configured to obtain the receiving resource set in at least one of the manners described below. The receiving resource set includes receiving resources corresponding to all groups indicated by the third-type grouping indication information. The receiving resource set includes receiving resources corresponding to N2 group indexes agreed with the first communication node, where N2 is an integer greater than or equal to 1. The receiving resource set is determined by acquiring signaling indication information.

In an optional embodiment, the receiving resource includes at least one of: a receiving beam, a receiving antenna, a receiving port, a receiving precoding matrix, receiving time, receiving frequency-domain resource, a receiving sector and a receiving sequence.

In an alternative embodiment, the second processing module is further configured to acquire x and/or N1 before the demodulation reference signal and/or the control channel are received on the time division multiplexed N1 resources according to the third-type grouping indication information.

In an alternative embodiment, the second processing module may acquire x and/or N1 in at least one of the manners described below. x and/or N1 are acquired in a manner agreed with the first communication node. x and/or N1 are acquired in a semi-static signaling configuration manner. x and/or N1 are acquired in a dynamic signaling configuration manner.

In an alternative embodiment, the first receiving module 274 may receive the demodulation reference signal and/or the control channel in the manner described below. The demodulation reference signal and/or the control channel are received on an agreed time unit according to the third-type grouping indication information, and the demodulation reference signal and/or the control channel are received on only one time division multiplexed resource on a non-agreed time unit.

Figure 28:
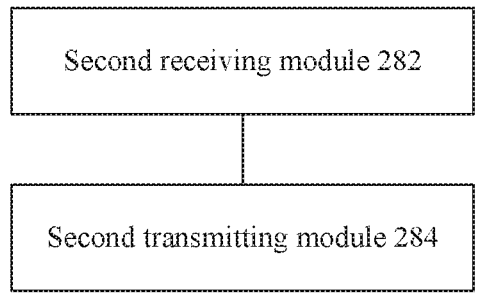
FIG. 28 is a block diagram of a device for receiving feedback information according to an embodiment of the present invention.

FIG. 28 is a block diagram of a device for receiving feedback information according to an embodiment of the present invention. As shown in FIG. 28, the device includes a second receiving module 282 and a second transmitting module 284. The device is described below.

The second receiving module 282 is configured to receive the feedback information from a second communication node. The feedback information includes indication information for indicating M resources selected by the second communication node and first-type grouping indication information for indicating that the second communication node divides the M resources into N first-type resource groups. The second transmitting module 284 is connected to the second receiving module 282 and configured to perform resource scheduling and/or signal transmission according to the feedback information. Both N and M are integers, N is less than or equal to M, and the M resources are selected from a candidate resource set.

In an alternative embodiment, the device further includes a third processing module. The third processing module is configured to perform, before the feedback information is received from the second communication node, at least one of the operations described below. Signals corresponding to all or part of resources in the candidate resource set are transmitted to the second communication node. Information for determining the first-type grouping indication information is transmitted to the second communication node, where the information includes at least one of: grouping restriction indication information, a parameter for determining a grouping rule, a threshold parameter for determining groups, configuration indication information of the candidate resource set and grouping manner indication information.

A number of resources in a same first-type resource group is less than or equal to a, and a number N of first-type resource groups is less than or equal to b; or the number of resources in the same first-type resource group is a fixed number a, and the number N of first-type resource groups is a fixed number b where both a and b are natural numbers greater than or equal to 1.

In an alternative embodiment, a grouping manner indicated by the first-type grouping indication information includes at least one of: grouping according to a receiving resource corresponding to each resource; grouping according to a channel quality corresponding to each resource; grouping according to a predetermined multiplexing manner; grouping according to a timing advance (TA) parameter; grouping according to a cyclic prefix (CP) length; grouping according to a space division multiplexing manner; and grouping according to a quasi-co-location relationship.

In an alternative embodiment, the grouping according to a predetermined multiplexing manner includes the grouping according to a space division multiplexing manner.

In an alternative embodiment, the receiving resource includes at least one of: a receiving beam, a receiving antenna, a receiving port, a receiving precoding matrix, receiving time, receiving frequency-domain resource, a receiving sector and a receiving sequence.

In an alternative embodiment, the N first-type resource groups have at least one of the characteristics described below. A same first-type resource group corresponds to a same TA. Different first-type resource groups correspond to different TAs. Resources in the same first-type resource group are allowed to be scheduled in a same time unit. All or part of the resources in the same first-type resource group are allowed to be scheduled in the same time unit. The different first-type resource groups are scheduled in different time units and not schedulable in the same time unit. A multiplexing manner set of the resources in the same first-type resource group is a set A, and a multiplexing manner set of resources in the different first-type resource groups is a set B, where the set B is a true subset of the set A or the set A is a true subset of the set B. The resources in the same first-type resource group are not allowed to be space division multiplexed in the same time unit, the resources in the different first-type resource groups are allowed to be space division multiplexed in the same time unit, where a number of space division multiplexing layers is less than or equal to the number of first-type resource groups. A first CP length is adopted when the resources in the same first-type resource group are simultaneously scheduled in the same time unit or switched between different time units. A second CP length is adopted when the resources in the different first-type resource groups are scheduled in the same time unit. When scheduled resources switch between the different first-type resource groups or combination of first-type resource groups, a switching start orthogonal frequency division multiplexing (OFDM) symbol uses a third CP length, and/or a switching start position has a synchronization signal used for a reception timing of the second communication node, and/or a last OFDM symbol before switching uses the third CP length. The same first-type resource group has a same quasi-co-location and all the resources in the same first-type resource group share a quasi-co-located reference signal.

In an alternative embodiment, the resources in the same first-type resource group are allowed to be space division multiplexed in a same time unit, where the number of space division multiplexing layers is less than or equal to a number of resources in the first-type resource group; and the resources in different first-type resource groups are not allowed to be space division multiplexed in the same time unit; and/or CP lengths corresponding to the resources in different first-type resource groups scheduled in the same time unit is obtained according to differences of resource group indexes of the different first-type resource groups where the resources are located.

In an alternative embodiment, the third CP length is greater than the first CP length and the second CP length.

In an alternative embodiment, one of the characteristics described below is included. The resources in the same first-type resource group are not space division multiplexed and the resources in different first-type resource groups are space division multiplexed. The resources in the same first-type resource group are space division multiplexed and the resources in different first-type resource groups are not space division multiplexed.

In an alternative embodiment, one of the characteristics described below is included. A maximum number of space division multiplexing layers available to the resources in the same first-type resource group is less than or equal to a maximum number of space division multiplexing layers available to the resources in different first-type resource groups. The maximum number of space division multiplexing layers available to the resources in the same first-type resource group is greater than or equal to the maximum number of space division multiplexing layers available to the resources in different first-type resource groups. The maximum number of space division multiplexing layers available to the resources in the same first-type resource group is less than the maximum number of space division multiplexing layers available to the resources in different first-type resource groups. The maximum number of space division multiplexing layers available to the resources in the same first-type resource group is greater than the maximum number of space division multiplexing layers available to the resources in different first-type resource groups.

In an alternative embodiment, the device further includes agreeing with the second communication node on one of the characteristics described below. The second communication node is capable of simultaneously receiving the resources in the same first-type resource group. The second communication node is incapable of simultaneously receiving the resources in different first-type resource groups. The second communication node is capable of simultaneously receiving the resources in the same first-type resource group and the second communication node is incapable of simultaneously receiving the resources in different first-type resource groups. The second communication node is capable of simultaneously receiving the resources in the same first-type resource group and the second communication node is capable of simultaneously receiving the resources in different first-type resource groups.

In an alternative embodiment, the device further includes agreeing with the second communication node on one of the characteristics described below. The second communication node is capable of simultaneously receiving the resources in different first-type resource groups. The second communication node is incapable of simultaneously receiving the resources in the same first-type resource group. The second communication node is capable of simultaneously receiving the resources in different first-type resource groups and the second communication node is incapable of simultaneously receiving the resources in the same first-type resource group. The second communication node is capable of simultaneously receiving the resources in different first-type resource groups and the second communication node is capable of simultaneously receiving the resources in the same first-type resource group.

In an alternative embodiment, the device includes at least one of the following manners: the N first-type resource groups are associated with a channel measurement related process; and the N first-type resource groups are associated with a channel measurement related set.

In an alternative embodiment, the channel measurement related process is a channel state information (CSI) process; and the channel measurement related set includes at least one of a CSI reporting set (CSI reporting settings), a resource set (Resource settings), a CSI measurement set (CSI measurement settings), a link set (link settings), and a reference signal (RS) set (RS settings), where the CSI measurement set includes one or more links, each of which is used for establishing a relationship between the resource set and the CSI reporting set.

Figure 29:
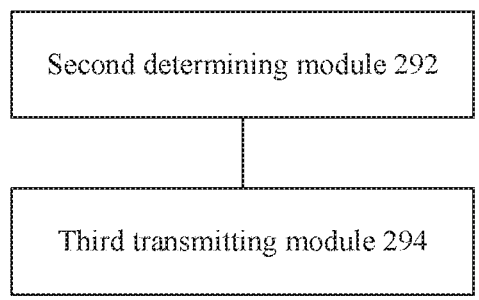
FIG. 29 a block diagram of a device for notifying second-type grouping indication information according to an embodiment of the present invention.

FIG. 29 is a block diagram of a device for notifying grouping indication information according to an embodiment of the present invention. As shown in FIG. 29, the device includes a second determining module 292 and a third transmitting module 294. The device is described below.

The second determining module 292 is configured to determine second-type grouping indication information. The third transmitting module 294 is connected to the second determining module 292 and configured to notify a second communication node of the second-type grouping indication information. The second-type grouping indication information includes at least one of: information on a group index set, grouping manner indication information, information on resources in a group, where the group index set includes at least one group index.

In an optional embodiment, the third transmitting module 294 may notify the second communication node of the second-type grouping indication information in at least one of the manners described below. The second-type grouping indication information is agreed with the second communication node. The second-type grouping indication information is transmitted to the second communication node by semi-static signaling. The second-type grouping indication information is transmitted to the second communication node by dynamic signaling. The second-type grouping indication information is transmitted to the second communication node through a system message.

In an alternative embodiment, the second-type grouping indication information is used by the second communication node to determine a transmission parameter and/or a reception parameter of a signal corresponding to the second-type grouping indication information.

In an alternative embodiment, the transmission parameter includes at least one of: an MCS set corresponding to the signal, a multiplexing manner used by the signal, a length of a cyclic prefix (CP) corresponding to the signal, a number of space division multiplexing layers used by the signal, demodulation reference signal port information used by the signal, quasi-co-located reference signal resource information corresponding to the signal, structural information corresponding to the signal, a channel characteristic reference signal corresponding to the signal and a transmission manner corresponding to the signal. The structural information includes at least one of: a CP length of a start symbol of a time unit, information indicating whether the start symbol of the time unit includes a synchronization signal, and a CP length of a last symbol of the time unit. The reception parameter includes a receiving resource for receiving the signal. Optionally, the receiving resource includes at least one of: a receiving port, a receiving antenna, a receiving beam, a receiving precoding weight, receiving time, receiving frequency-domain resource, a receiving sector and a receiving sequence.

In an alternative embodiment, the signal includes at least one of a data channel signal, a control channel signal and a reference signal.

In an alternative embodiment, the device further includes a fourth processing module. The fourth processing module is configured to determine, before the second-type grouping indication information is transmitted to the second communication node, a correspondence between the second-type grouping indication information and a parameter, where the parameter includes the transmission parameter and/or the reception parameter.

In an alternative embodiment, the fourth processing module may determine the correspondence between the second-type grouping indication information and the transmission parameter and/or the reception parameter in at least one of the manners described below. The correspondence between the second-type grouping indication information and the parameter is determined in an agreed manner with the second communication node. The correspondence between the second-type grouping indication information and the parameter is determined by receiving first-type grouping indication information fed back by the second communication node. The correspondence is transmitted to the second communication node.

In an alternative embodiment, the manner in which the correspondence between the second-type grouping indication information and the parameter is determined in the agreed manner with the second communication node includes obtaining the correspondence between the second-type grouping indication information and the parameter according to a measurement reference signal transmitted by the second communication node.

In an alternative embodiment, the first-type grouping indication information includes at least one of: a number of the first-type resource groups, indication on the resources in each group, information on a number of resources in each group, grouping manner indication information, group index information and information on a common parameter corresponding to each group.

In an alternative embodiment, the common parameter corresponding to each group includes at least one of the following parameters: a CP length corresponding to each group, a precoding matrix indicator (PMI) corresponding to each group, a rank indicator (RI) corresponding to each group, a channel quality indication (CQI) corresponding to each group, a timing advance (TA) parameter corresponding to each group, a quasi-co-location parameter corresponding to each group, and a receiving resource corresponding to each group.

In an alternative embodiment, a grouping manner indicated by the second-type grouping indication information includes at least one of: grouping according to a receiving resource corresponding to a transmission resource, grouping according to a channel quality corresponding to the transmission resource, grouping according to a predetermined multiplexing manner, grouping according to the timing advance (TA) parameter, grouping according to a cyclic prefix (CP) length, grouping according to a space division multiplexing manner, grouping according to a quasi-co-location relationship, grouping according to a measurement reference signal transmitted by the second communication node, and grouping according to a channel characteristic. The transmission resource includes at least one of: a transmission beam resource, a transmission antenna resource, a transmission port resource, a transmission frequency domain resource, a transmission sequence resource and a transmission time domain resource.

In an alternative embodiment, the receiving resource includes at least one of: a receiving beam, a receiving antenna, a receiving port, a receiving precoding matrix, receiving time, receiving frequency-domain resource, a receiving sector and a receiving sequence.

In an alternative embodiment, the information on the resources in the group includes resource information of the reference signal. The reference signal includes at least one of: a demodulation reference signal and a measurement reference signal.

In an alternative embodiment, resources in a same group have a same channel characteristic and/or quasi-co-location information.

In an alternative embodiment, a correspondence exists between the at least one group index and port information of the measurement reference signal transmitted by the second communication node.

Figure 30:
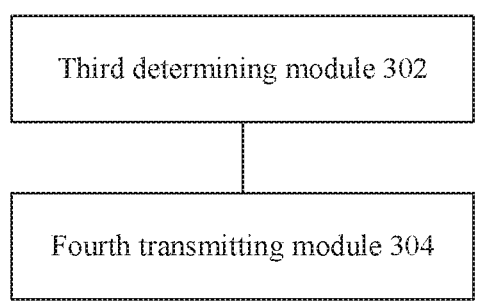
FIG. 30 is a block diagram of a signal transmission device according to an embodiment of the present invention.

FIG. 30 is a block diagram of a signal transmission device according to an embodiment of the present invention. As shown in FIG. 30, the device includes a third determining module 302 and a fourth transmitting module 304. The device is described below.

The third determining module 302 is configured to determine third-type grouping indication information. The fourth transmitting module 304 is connected to the third determining module 302 and configured to transmit a demodulation reference signal and/or a control channel according to the third-type grouping indication information.

In an alternative embodiment, the third-type grouping indication information includes at least one of: the number of the first-type resource groups, indication on the resources in each of the N first-type resource groups, information on a number of resources in each group, grouping manner indication information and group index information.

In an alternative embodiment, the third determining module 302 may determine the third-type grouping indication information in at least one of the manners described below. The third-type grouping indication information is determined according to first-type grouping indication information received from a second communication node. The third-type grouping indication information is determined according to a rule agreed with the second communication node.

In an alternative embodiment, the fourth transmitting module 304 may transmit the demodulation reference signal and/or the control channel in the manner described below. According to the third-type grouping indication information, the demodulation reference signal and/or the control channel are transmitted on time division multiplexed N1 resources, where N1=x×N or N1 is less than or equal to N, where N1 is an integer greater than 0, N is a number of groups included in the third-type grouping indication information and x is an integer greater than or equal to 1.

In an alternative embodiment, the device further includes a fifth processing module. The fifth processing module is configured to configure x and/or N1 for the second communication node before the demodulation reference signal and/or the control channel are transmitted according to the third-type grouping indication information.

In an alternative embodiment, the fifth processing module may notify the second communication node of x and/or N1 in at least one of the manners described below. The second communication node is notified of x and/or N1 in an agreed manner with the second communication node. The second communication node is notified of x and/or N1 by semi-static signaling. The second communication node is notified of x and/or N1 by dynamic signaling.

In an alternative embodiment, the demodulation reference signal is transmitted on the N1 resources in a same transmission manner, where a transmission manner of the demodulation reference signal includes at least one of: a transmission beam, a transmission port, a transmission antenna, a transmission precoding matrix and a transmission frequency domain resource.

In an alternative embodiment, the demodulation reference signal and/or the control channel transmitted on the N1 resources have a same transmission manner as data and/or a control signal and/or a reference signal transmitted subsequent to the demodulation reference signal and/or the control channel. The transmission manner of the demodulation reference signal includes at least one of: the transmission beam, the transmission port, the transmission antenna, the transmission precoding matrix and the transmission frequency domain resource.

In an alternative embodiment, the fourth transmitting module 304 may transmit the demodulation reference signal and/or the control channel in the manner described below. The demodulation reference signal and/or the control channel are transmitted on an agreed time unit according to the third-type grouping indication information, and the demodulation reference signal and/or the control channel are transmitted on only one time division multiplexed resource on a non-agreed time unit.

It is to be noted that the various modules described above may be implemented by software or hardware. Implementation by hardware may, but may not necessarily, be performed in the following manner: the various modules described above are located in a same processor, or the various modules described above are located in their respective processors in any combination form.

An embodiment of the present invention further provides a storage medium. Optionally, in the embodiment, the storage medium may be configured to store program codes for executing the steps described above.

In an alternative embodiment, in the embodiment, the storage medium may include, but is not limited to, a USB flash disk, a ROM, a RAM, a mobile hard disk, a magnetic disk, an optical disk or another medium capable of storing the program codes.

In an alternative embodiment, in the embodiment, a processor executes the steps described above according to the program codes stored in the storage medium.

In an alternative embodiment, for specific examples in the embodiment, reference may be made to the examples described in the above-mentioned embodiments and optional implementation modes, and repetition will not be made herein. In the embodiments described above, the receiving end may group transmission resources and transmit feedback to the transmitting end, the resources in the same group have certain common characteristics, and the resources in different groups have different characteristics; limited feedback information is used to provide the transmitting end with more information so that the transmitting end has the improved scheduling flexibility and can reasonably and effectively manage the resources. In this way, the transmitting end may obtain information on receiving beams corresponding to each transmission beam group of the receiving end so that the transmitting end flexibly adjusts transmission beams, that is, the transmission beams are transparent to the receiving end, thereby improving the scheduling flexibility of a base station. Furthermore, considering that a number of receiving beams is generally less than a number of transmission beams in downlink communications, a number of bits occupied by notifying the information on the receiving beams is less than a number of bits occupied by notifying the transmission beams in control signaling in data transmission. Furthermore, considering different characteristics of the transmission beams such as arrival time, quasi-co-location and a correlation, the resources are grouped according to these characteristics so that the transmitting end preforms reasonable and effective management and scheduling on the resources according to grouping information.

Apparently, it should be understood by those skilled in the art that each of the above-mentioned modules or steps of the present invention may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present invention is not limited to any specific combination of hardware and software.

The above are only preferred embodiments of the present invention and are not intended to limit the present invention. For those skilled in the art, the present invention may have various modifications and variations. Any modifications, equivalent substitutions, improvements and the like made within the spirit and principle of the present invention should fall within the scope of the present invention.

INDUSTRIAL APPLICABILITY

As described above, the method and device for feeding back grouping indication information and the method and device acquiring grouping indication information have the following benefits. The receiving end groups transmission resources and feedbacks the grouping information to the transmitting end. The resources in the same group have certain common characteristics, and the resources in different groups have different characteristics. Using limited feedback information, more information is provided to the transmitting end, so that the transmitting end has the improved scheduling flexibility and can reasonably and effectively manage the resources. Therefore, the present invention may solve the problem in the existing art that the transmission beams and/or receiving beams cannot be reasonably and flexibly managed and scheduled, and achieve the flexibly managing and scheduling the transmission beams.

What is claimed is:

1. A method for feeding back grouping indication information, applied to a terminal device, comprising:
   determining a candidate resource set, wherein the candidate resource set comprises Q second-type resource groups, wherein Q is an integer greater than or equal to 1;
   receiving a signal transmitted on a resource of the candidate resource set, wherein the signal is transmitted by a base station;
   selecting M resources from the candidate resource set according to the received signal; and dividing the M resources into N first-type resource groups based on the received signal, wherein M is an integer greater than 1 and N is a positive integer less than or equal to M; and
   feeding back first-type grouping indication information for indicating that the M resources are divided into the N first-type resource groups to the base station, wherein the first-type grouping indication information comprises indication on resources in each first-type resource group of the N first-type resource groups, wherein the indication on resources in each first-type resource group of the N first-type resource groups comprises an index of each resource of each first-type resource group of the N first-type resource groups;
   wherein each first-type resource group of the N first-type resource groups corresponds to one receiving beam at the terminal device, or corresponds to one receiving beam combination at the terminal device of one time instance;
   wherein a resource in the candidate resource set comprises a resource of the signal, comprising following resource types: a transmission port resource, a transmission sequence resource and a transmission time domain resource.

2. The method of claim 1, wherein,
in the first-type grouping indication information, resources in each of the N first-type resource groups are sequentially arranged according to receiving qualities of the resources.

3. The method of claim 1, wherein the dividing the M resources into N first-type resource groups comprises:
dividing the M resources into the N first-type resource groups according to grouping information which comprises at least one of: grouping restriction indication information or configuration indication information of the candidate resource set, wherein the grouping information is configured by the base station through signaling or pre-agreed with the base station.

4. The method of claim 1, wherein:
the first-type grouping indication information further comprises at least one of: a number of the first-type resource groups, information on a number of resources in each of the N first-type resource groups, grouping manner indication information, group index information or information on a common parameter corresponding to each of the N first-type resource groups.

5. The method of claim 1, wherein: resources in a same first-type resource group belong to more than one groups of the Q second-type resource groups.

6. The method of claim 1, wherein, N is larger than 1.

7. The method of claim 1, wherein the signal comprises a synchronization signal.

8. The method of claim 1, comprising at least one of the following:
different resources in the candidate resource set correspond to different transmission beams of the base station;
different first-type resource groups comprise a same number of resources; or
different first-type resources groups correspond to different receiving beams of the terminal device at different time instances.

9. A terminal device, comprising: an antenna and a processor, wherein the processor is configured to execute at least one program to implement a method for feeding back grouping indication information, wherein the method for feeding back grouping indication information comprises:
determining a candidate resource set, wherein the candidate resource set comprises Q second-type resource groups, wherein Q is an integer greater than or equal to 1;
receiving a signal transmitted on a resource of the candidate resource set, wherein the signal is transmitted by a base station;
selecting M resources from the candidate resource set according to the received signal; and dividing the M resources into N first-type resource groups based on the received signal, wherein M is an integer greater than 1 and N is a positive integer less than or equal to M; and
feeding back first-type grouping indication information for indicating that the M resources are divided into the N first-type resource groups to the base station, wherein the first-type grouping indication information comprises indication on resources in each first-type resource group of the N first-type resource groups, wherein the indication on resources in each first-type resource group of the N first-type resource groups comprises an index of each resource of each first-type resource group of the N first-type resource groups;
wherein each first-type resource group of the N first-type resource groups corresponds to one receiving beam at the terminal device, or corresponds to one receiving beam combination at the terminal device of one time instance;
wherein a resource in the candidate resource set comprises a resource of the signal, comprising following resource types: a transmission antenna resource, a transmission port resource, a transmission sequence resource and a transmission time domain resource.

10. The terminal device according to claim 9, wherein:
in the first-type grouping indication information, resources in each of the N first-type resource groups are sequentially arranged according to receiving qualities of the resources.

11. The terminal device of claim 9, wherein the signal comprises a synchronization signal.

12. The terminal device of claim 9, comprising at least one of the following:
different resources in the candidate resource set correspond to different transmission beams of the base station;
different first-type resource groups comprise a same number of resources; or
different first-type resources groups correspond to different receiving beams of the terminal device at different time instances.

13. The terminal device of claim 9, wherein the dividing the M resources into N first-type resource groups comprises:
dividing the M resources into the N first-type resource groups according to grouping information which comprises at least one of: grouping restriction indication information or configuration indication information of the candidate resource set, wherein the grouping information is configured by the base station through signaling or pre-agreed with the base station.

14. The terminal device of claim 9, wherein:
resources in a same first-type resource group belong to more than one groups of the Q second-type resource groups.

15. A method for receiving feedback information, applied to a base station, comprising:
receiving feedback information from a terminal device, wherein the feedback information comprises first-type grouping indication information for indicating that the terminal device divides the M resources into N first-type resource groups, wherein the first-type grouping indication information comprises indication on resources in each first-type resource group of the N first-type resource groups, wherein the indication on resources in each first-type resource group of the N first-type resource groups comprises an index of each resource of each first-type resource group of the N first-type resource groups; and
performing resource scheduling and/or signal transmission according to the feedback information;
wherein each first-type resource group of the N first-type resource groups corresponds to one receiving beam at the terminal device, or corresponds to one receiving beam combination at the terminal device of one time instance;
wherein both N and M are integers, N is less than or equal to M, and the M resources are selected from a candidate resource set comprising Q second-type resource groups, wherein Q is an integer greater than or equal to 1;

wherein a resource in the candidate resource set comprises a resource of a signal transmitted on the resource of the candidate resource set, comprising following resource types: a transmission port resource, a transmission sequence resource and a transmission time domain resource.

16. The method of claim 15, wherein,
in the first-type grouping indication information, resources in each of the N first-type resource groups are sequentially arranged according to receiving qualities of the resources.

17. The method of claim 15, wherein,
resources in a same first-type resource group belong to more than one groups of the Q second-type resource groups.

18. A base station, comprising: an antenna and a processor, wherein the processor is configured to execute at least one program to implement the method of claim 15.

19. The method of claim 15, comprising at least one of the following:
different resources in the candidate resource set correspond to different transmission beams of the base station;
the signal comprises a synchronization signal;
different first-type resource groups comprise a same number of resources; or
different first-type resources groups correspond to different receiving beams of the terminal device at different time instances.

20. The method of claim 15, further comprising:
configuring or pre-agreeing grouping information for indicating that the terminal device divides the M resources into N first-type resource groups, wherein the grouping information comprises at least one of: grouping restriction indication information or configuration indication information of the candidate resource set.

* * * * *